United States Patent [19]

Kamada et al.

[11] Patent Number: 5,414,474
[45] Date of Patent: May 9, 1995

[54] MOVING BODY RECOGNITION APPARATUS

[75] Inventors: Hiroshi Kamada; Morito Shiohara; Yoshiyuki Ohta, all of Kawasaki; Hideki Yanagishita, Kanagawa, all of Japan

[73] Assignee: Fujitsu Limited, Kawasaki, Japan

[21] Appl. No.: 26,685

[22] Filed: Mar. 4, 1993

[30] Foreign Application Priority Data

| Mar. 4, 1992 | [JP] | Japan | 4-047238 |
| Mar. 4, 1992 | [JP] | Japan | 4-047239 |
| Mar. 5, 1992 | [JP] | Japan | 4-048449 |

[51] Int. Cl.⁶ .................................. H04N 7/137
[52] U.S. Cl. ................................. 348/700; 348/169; 348/135; 382/190; 382/296
[58] Field of Search ............. 348/169, 170, 171, 172, 348/135, 136, 141, 113, 116, 50, 26, 155, 700, 699; 382/44, 1; H04N 7/137

[56] References Cited

U.S. PATENT DOCUMENTS

| 4,829,446 | 5/1989 | Draney | 382/44 |
| 4,858,157 | 8/1989 | Murai et al. | 382/1 |
| 4,887,223 | 12/1989 | Christian | 382/1 |
| 4,930,088 | 5/1990 | Horiguchi | 382/44 |
| 5,274,453 | 12/1993 | Maeda | 348/700 |

*Primary Examiner*—Howard W. Britton
*Assistant Examiner*—Vu Le
*Attorney, Agent, or Firm*—Staas & Halsey

[57] ABSTRACT

Apparatus which recognizes a shape and movement of a moving body based on position data of feature points in an image of the moving body in an orthogonal projection image of the moving body. The moving body recognition apparatus includes a feature point position normalization unit for providing normalized coordinates of a feature point by determining an image capture plane of the moving body as the XY plane, a direction in which an orthogonal projection image of a rotation axis of the moving body formed on the image capture plane as the Y axis and a direction of an image capture operation as a Z axis perpendicular to the XY plane and a rotation axis calculation unit for calculating the angle between the axis of rotation of the moving body and the Y axis.

39 Claims, 80 Drawing Sheets

FIG. 12

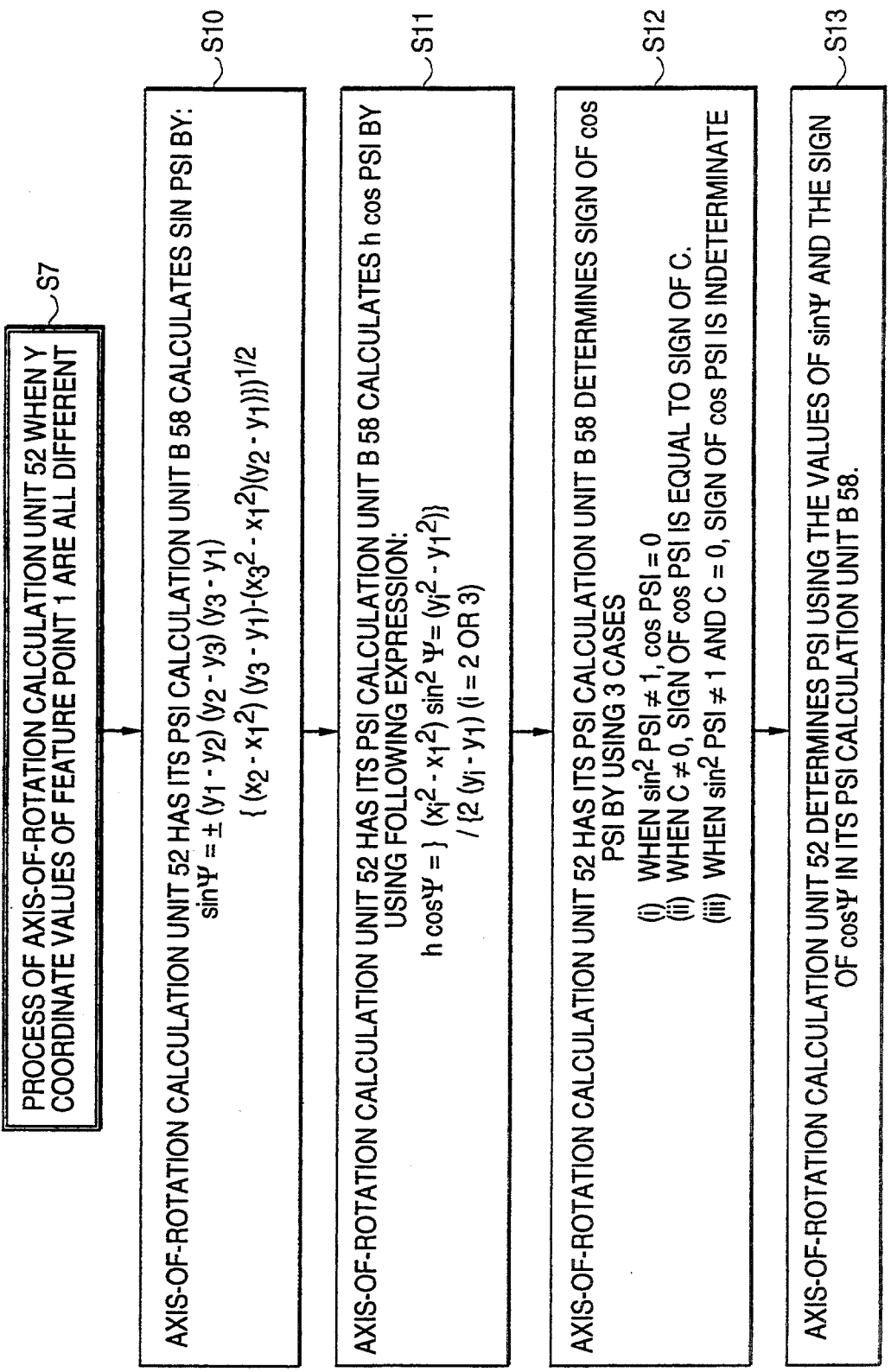

S7 — PROCESS OF AXIS-OF-ROTATION CALCULATION UNIT 52 WHEN Y COORDINATE VALUES OF FEATURE POINT 1 ARE ALL DIFFERENT

S10 — AXIS-OF-ROTATION CALCULATION UNIT 52 HAS ITS PSI CALCULATION UNIT B 58 CALCULATES SIN PSI BY:
$$\sin\Psi = \pm (y_1 - y_2)(y_2 - y_3)(y_3 - y_1) \{(x_2 - x_1^2)(y_3 - y_1) - (x_3^2 - x_1^2)(y_2 - y_1)\})^{1/2}$$

S11 — AXIS-OF-ROTATION CALCULATION UNIT 52 HAS ITS PSI CALCULATION UNIT B 58 CALCULATES h cos PSI BY USING FOLLOWING EXPRESSION:
$$h\cos\Psi = \{(x_i^2 - x_1^2)\sin^2\Psi = (y_i^2 - y_1^2)\} / \{2(y_i - y_1)\} \quad (i = 2 \text{ OR } 3)$$

S12 — AXIS-OF-ROTATION CALCULATION UNIT 52 HAS ITS PSI CALCULATION UNIT B 58 DETERMINES SIGN OF cos PSI BY USING 3 CASES
(i) WHEN $\sin^2\Psi \neq 1$, cos PSI = 0
(ii) WHEN C ≠ 0, SIGN OF cos PSI IS EQUAL TO SIGN OF C.
(iii) WHEN $\sin^2\Psi \neq 1$ AND C = 0, SIGN OF cos PSI IS INDETERMINATE S13 — AXIS-OF-ROTATION CALCULATION UNIT 52 DETERMINES PSI USING THE VALUES OF sinΨ AND THE SIGN OF cosΨ IN ITS PSI CALCULATION UNIT B 58.

FIG. 14

S7 — PROCESS OF THE ROTATION ANGLE CALCULATION UNIT WHERE Y COORDINATE OF THE FEATURE POINT 1 ARE ALL DIFFERENT

↓

S20 — AXIS-OF-ROTATION CALCULATION UNIT 52 CALCULATES C BY EXPRESSIONS
$$C = \{(x_2^2 - x_1^2)(y_3^2 - y_1^2) - (y_2^2 - y_1^2)\} / 2 \{(x_2^2 - x_1^2) x(y-y) - (x-x)(y-y)\}$$
(WHERE $C = H \cos PSI$)

↓

S21 — AXIS-OF-ROTATION CALCULATION UNIT 52 CALCULATES sin PSI BY EXPRESSION
$$\sin PSI = \pm (\{2(y_k - y_1) C - (y_k^2 - y_1^2)\} / (x_k^2 - x_1^2))^{1/2}$$
(WHERE $|x_k| \ne |x_1|$ ($k = 2, 3$))

↓

S22 — AXIS-OF-ROTATION CALCULATION UNIT 52 DETERMINES THE SIGN OF cos PSI AS FOLLOWS
(i) WHEN $\sin^2 PSI = 1$, $\cos PSI = 0$
(ii) WHEN $h \cos PSI \ne 0$, THE SIGN OF cos PSI IS DETERMINED TO BE THE SIGN OF $h \cos PSI$
(iii) WHEN $\sin^2 PSI \ne 1$ AND $\cos PSI = 0$, SIGN OF cos PSI NOT DETERMINED

↓

S23 — AXIS-OF-ROTATION CALCULATION UNIT 52 OBTAINS THE VALUE OF PSI BASED ON THE CALCULATION VALUE OF sin PSI AND THE SIGN VALUE OF cos PSI

FIG. 32A

| α | 0 | ... | π/2 | ... | π | ... | 3/2π | ... | 2π |
|---|---|---|---|---|---|---|---|---|---|
| $U_{11}$ | + | + | 0 | - | - | - | 0 | + | |
| $U_{21}$ | 0 | - | - | - | 0 | + | + | + | |

FIG. 32B

| β | 0 | ... | π/2 | ... | π | ... | 3/2π | ... | 2π |
|---|---|---|---|---|---|---|---|---|---|
| $U_{11}$ | + | + | 0 | - | - | - | 0 | + | |
| $U_{21}$ | 0 | - | - | - | 0 | + | + | + | |

FIG. 33A

| $(n-m+1)/2$ | $r_{12}$ |
|---|---|
| ODD NUMBER | + |
| EVEN NUMBER | − |

FIG. 33B

| n | m | CONDITION | | | $r_{12}$ |
|---|---|---|---|---|---|
| 0 | 0 | $u_{11}$ | < | $v_{11}$ | + |
| 1 | 1 | $u_{11}$ | > | $v_{11}$ | − |
| 2 | 2 | $u_{11}$ | < | $v_{11}$ | + |
| 3 | 3 | $u_{11}$ | > | $v_{11}$ | − |
| 0 | 2 | $|u_{11}|$ | < | $|v_{11}|$ | + |
| 2 | 0 | $|u_{11}|$ | > | $|v_{11}|$ | − |
| 1 | 3 | $|u_{11}|$ | < | $|v_{11}|$ | + |
| 3 | 1 | $|u_{11}|$ | > | $|v_{11}|$ | − |

$$\begin{bmatrix} x' \\ y' \\ z' \end{bmatrix} = \begin{bmatrix} 1 & 0 & 0 \\ 0 & \cos(-\psi) & -\sin(-\psi) \\ 0 & \sin(-\psi) & \cos(-\psi) \end{bmatrix} \begin{bmatrix} x \\ y \\ z \end{bmatrix}$$

MOVING BODY RECOGNITION APPARATUS

BACKGROUND OF THE INVENTION

1. Field of the Invention

This invention pertains to a moving body recognition system for enabling a computer to analyze the movement of an object based on an image e.g. captured by a television camera, and more particularly to a moving body recognition apparatus for recognizing the shape (the coordinate of a feature point) and movement (rotation) of an object moving on a plane coupled with a rotation.

2Description of the Related Arts

A moving body recognition apparatus is for recognizing an object by digitally processing image signals of an externally moving object captured by a television camera. Moving body recognition apparatuses are used widely, e.g. for an FA (factory automation) inspection, an automatic monitoring device, and a visual sensor for an automatically operated vehicle, generally as devices capable of processing visual information as with a human being.

A moving body recognition apparatus generally recognizes the shape of a moving body and its relative movement, when an image input unit of a moving body recognition apparatus is moving in relation to the object. That is, even if an object is not actually moving, when an image input unit of a moving body recognition apparatus moves, the moving body recognition apparatus recognizes the shape of the object standing still and the movement of the image input unit. For example, in a case of a visual sensor for an automatically operated vehicle, its image input unit is loaded on top of the vehicle, and the moving body recognition apparatus recognizes the environment in which the vehicle is running.

A moving body recognition apparatus must be compact and responsive, since their uses are wide spread. Compactness is critical, especially when a moving body recognition apparatus is loaded on a vehicle in its application to a visual sensor of an automatically operated vehicle. Responsiveness is crucial, because a realtime processing similar to a human vision is required.

A conventional moving body recognition device captures an object by two [2] image input units. By establishing the correspondences between feature points of an object in the two [2] images captured by the two [2] image input units, the shape of the object is captured at every certain instant in time for observation by applying a principle of a triangulation, and then the movement of the object is calculated.

FIG. 1 shows a concept of a conventional moving body recognition apparatus.

In FIG. 1, 1 is an object and a black blot represents a feature point. Feature points represent particular positions of an object, such as peaks, peripheral points and pattern points in case of the presence of a pattern and color boundaries.

A first image input unit 2 and a second image input unit 3 each comprise a television camera. A moving body recognition unit 4 receives two [2] images from the first image input unit 2 and the second image input unit 3. The moving body recognition unit 4 detects feature points of an object 1 from the two [2] images. By matching the same feature point between the two [2] images, the position of a feature point is calculated by applying a principle of a triangulation.

The moving body recognition unit 4 calculates the movement of a feature point and the object 1 from a shift of the feature point in a time series. The moving body recognition apparatus has a recognition result output unit 5 output the position and movement of a feature point and the movement of an object.

FIG. 2 shows a configuration of a conventional moving body recognition apparatus.

Parts shown in FIG. 2 which are the same as those shown in FIG. 1 have the same numbers.

Feature point 1 extraction unit 10 extracts a feature point from an image inputted from the first image input unit 2 and supplies it to a feature point correspondence unit 12. Likewise, a second feature point extraction unit 11 extracts a feature point from an image inputted from the second image input unit 3 and supplies it to the feature point correspondence unit 12. The feature point correspondence unit 12 matches the same feature points from among the feature points extracted from feature point 1 extraction unit and the second feature point extraction unit 11.

A feature point position calculation unit 13 obtains the positions of feature points by relating the positions of the matched feature points with the positions of the first image input unit 2 and the second image input unit 3, and stores the result in a feature point position storage unit 14. The positions of feature points at plural instants in time for observation stored in the feature point position storage unit 14 are sent to an object movement calculation unit 15, which calculates the movement of an object and stores the result in an object movement storage unit 16.

However, a conventional moving body recognition apparatus as explained in the description of FIGS. 1 and 2 have the following problems.

(a) Because two [2] feature point extraction units need to individually extract feature points from two [2] images captured respectively by two [2] image input units, the process load for extracting a feature point is twice as much as that by using a single television camera.

(b) An additional process of matching feature points from two [2] images captured differently is required. The feature point correspondence unit 12 is required as shown in FIG. 2. Because the positions of two [2] image input units are different, they capture the object 1 differently. This makes it difficult to match feature points of the object 1. The closer the positions of the two [2] image input units 2 and 3, the easier it is to establish correspondences between feature points of the object 1, but the less accurate a recognition of the shape of the object 1 becomes. If, on the other hand, the two [2] image input units 2 and 3 are spaced apart for improving the precision in recognizing the object 1, the feature point correspondence unit 12 would require a large processing time for searching for corresponding feature points.

Typically, processing in (b) is impossible for a conventional moving body recognition apparatus, when a feature point of the object 1 captured by one [1] of the two [2] image input units 2 and 3 cannot be captured by the other, in which case no correspondence between those feature points can be established.

FIG. 3 shows an example in which a conventional moving body recognition apparatus fails to establish correspondences between feature points captured by different image input units.

The object 1 has two [2] feature points, for instance. However, there is a case in which both the first image input unit 2 and the second image input unit 3 can capture only one [1] of the two [2] feature points.

SUMMARY OF THE INVENTION

This invention aims at providing a moving body recognition apparatus capable of recognizing a moving body by using a single image input unit. That is, this invention aims at recognizing the shape and movement of an object from the position data of plural feature points obtained by the images of an object captured at plural instants in time whether the images are captured by a television camera from a direction perpendicular to the axis of rotation of the object or from a direction oblique to the axis of rotation.

BRIEF DESCRIPTION OF THE DRAWINGS

One of ordinary skill in the art can easily understand additional features and objects of this invention from the description of the preferred embodiments and some of the attached drawings. In the drawings:

FIG. 12 is a second flowchart of processes executed in the first embodiment;

FIG. 14 is a flowchart of other processes by an axis-of-rotation calculation unit executed when the Y coordinate values of feature point 1 captured at three [3] instants in time are different;

FIGS. 32A and 32B is an explanatory chart illustrating a method for determining the range of $\alpha$ and $\beta$ when the shape of an object has a right angle;

FIGS. 33A and 33B is an explanatory chart illustrating a method for determining the direction of a rotation represented by a rotation matrix R when the shape of an object has a right angle;

DETAILED DESCRIPTION OF THE PREFERRED EMBODIMENTS

This invention enables the shape and movement of an object to be recognized from the position data of plural feature points obtained by the images of an object captured at plural instants in time whether the images are captured by a television camera from a direction perpendicular to the axis of rotation of the object or from a direction oblique to the axis of rotation.

For recognizing a moving body, the image plane of a television camera is captured e.g. as an XY plane, and the optical axis of a television camera is defined as a Z axis. A depression angle PSI is defined as an angle formed between the axis of rotation of an object and the Y axis. By using the result of recognizing the depression angle PSI, the shape of an object, i.e. the coordinate values of feature points, and the movement of an object, i.e. the rotation around the axis of rotation, are recognized.

A First Embodiment

In the description of a first embodiment of this invention where FIGS. 4 through 7 are cross-referenced, a moving body recognition apparatus is explained with an emphasis on the recognition of the depression angle PSI.

Figure 5:
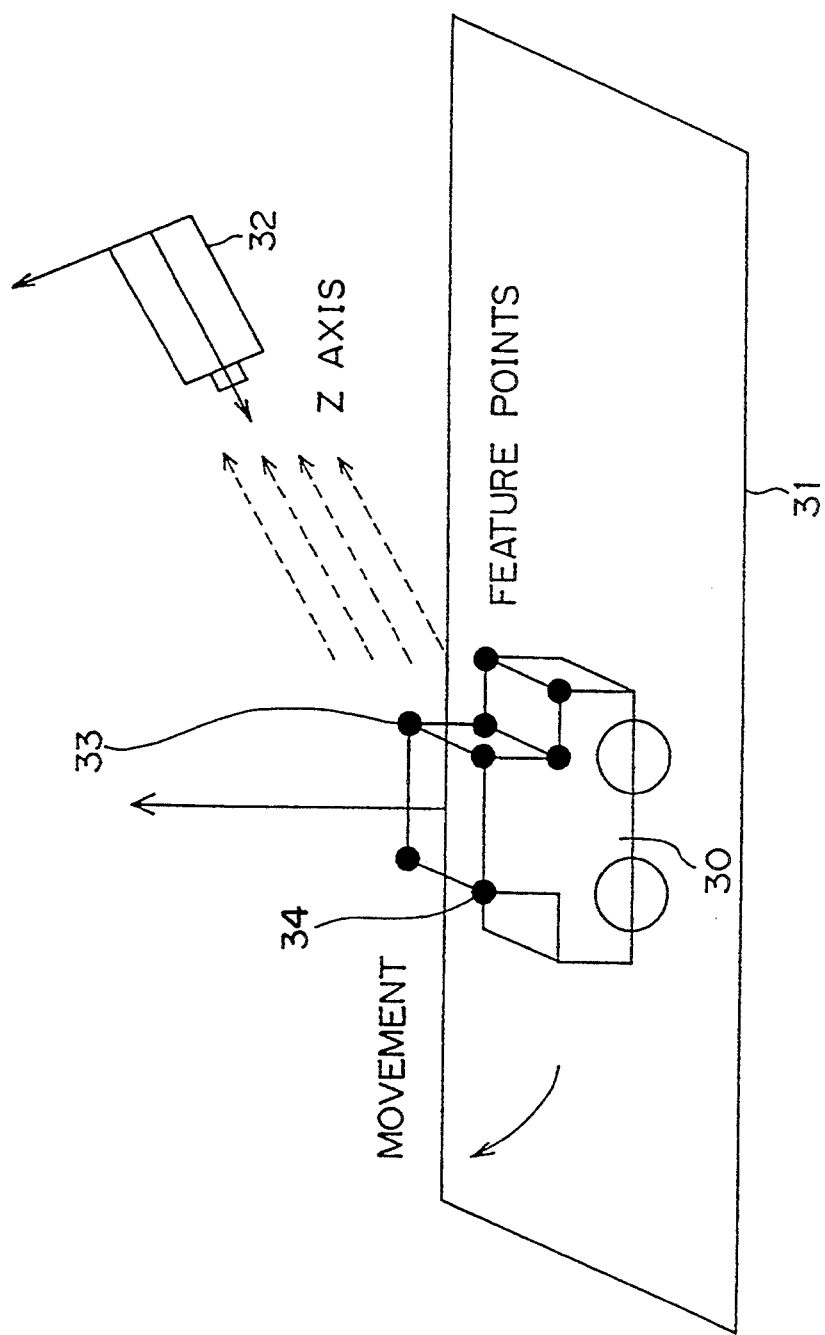
FIG. 5 is the conceptional view of an image input for use in the first embodiment.

FIG. 5 is the conceptional view of an image input for use in the first embodiment.

30 is an object for recognition (a moving body), where a black blot represents a feature point. 31 is a plane on which the object 30 moves. 33 is feature point 0, and 34 is feature point 1. 32 is an image capturing device, whose image capturing plane is defined as an XY plane with the X axis set parallel to the plane 31 and the Z axis set perpendicular to the XY plane (in the direction of the optical axis of the image capturing device 32).

An image input unit (the image capturing device 32) of this invention generally captures an object from an oblique direction with a depression angle. Because the object 30 moves on the plane 31, its axis of rotation always points to a direction perpendicular to the plane 31. Therefore, the angle (the depression angle PSI) formed between the axis of rotation of the object 30 and the Y axis is constant.

It should be noted that this invention deals with a moving body whose axis of rotation does not change, and that a moving body "on a plane" represents a mere example.

Also, this invention assumes an approximation that light beams from a moving body input parallelly into the image input unit. For instance, the plane is a highway, the moving body is a motor vehicle running on the highway, and the image input unit is a television camera fixed to a roadside or a particular motor vehicle.

Figure 6A:
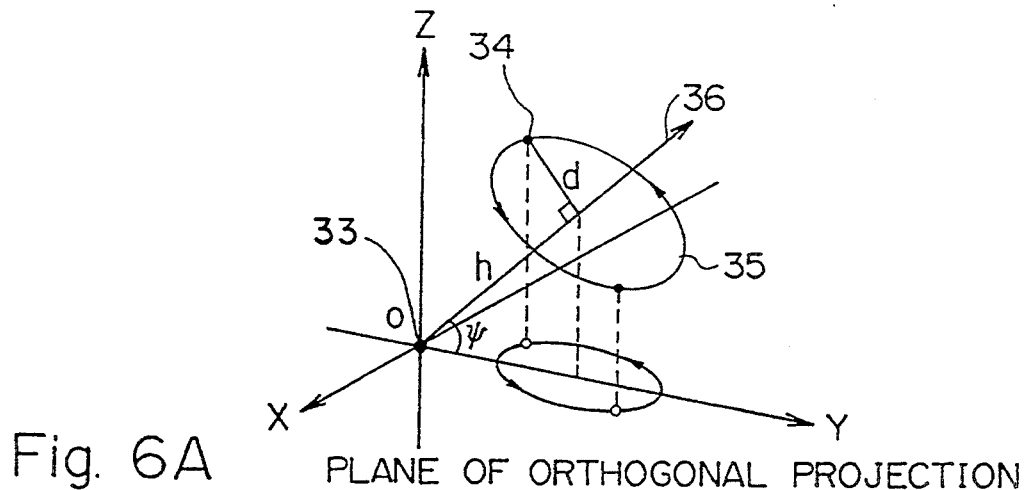
FIGS. 6A to 6C is a first explanatory chart illustrating the principle for calculating a depression angle PSI for use in the first embodiment.
Figure 6B:
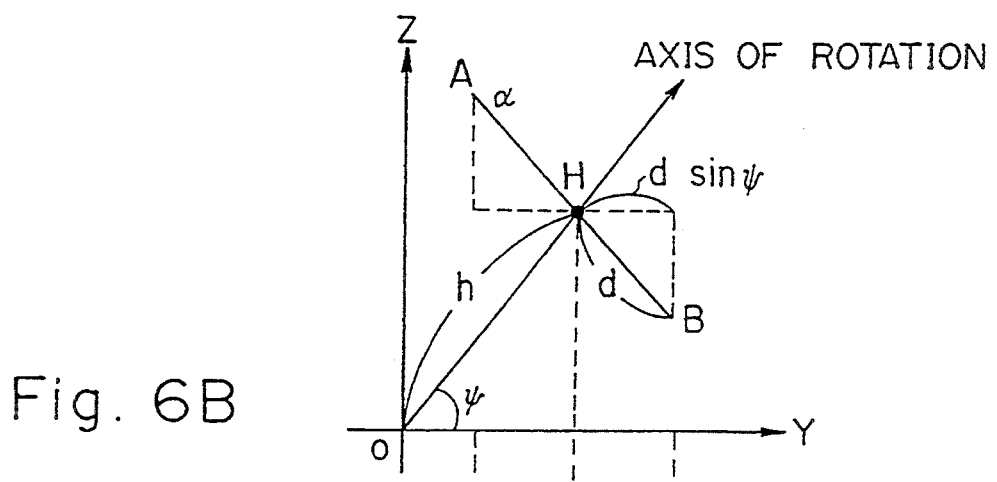
Figure 6C:
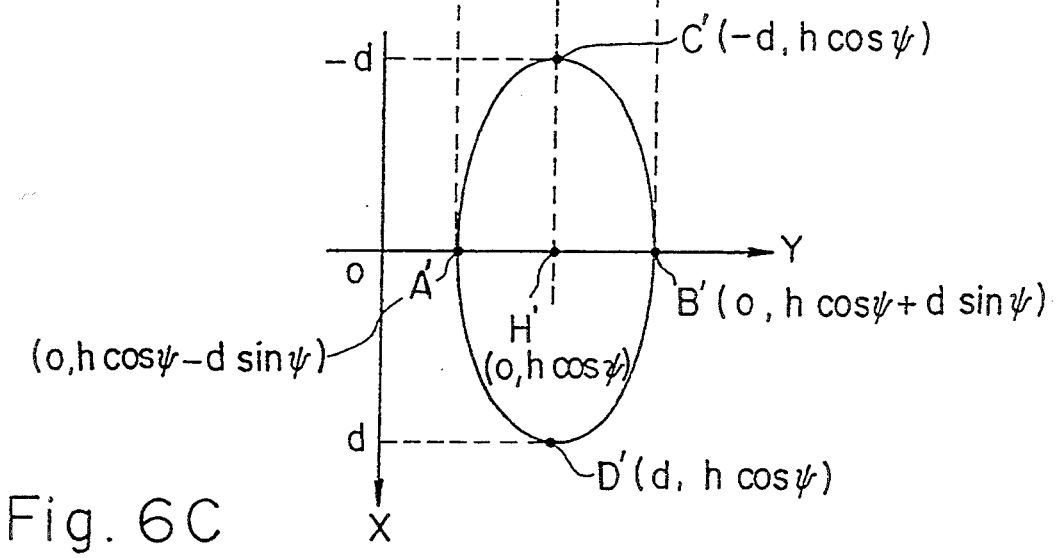

FIG. 6 is a first explanatory chart illustrating the principle for calculating a depression angle PSI for use in the first embodiment.

Part (a) illustrates the locus of an object, which is obtained as the locus of feature point 1 in a normalized coordinate system where feature point 0 falls on the origin.

Part (b) illustrates an orthogonal projection of the locus of the object on the XZ plane.

Part (c) illustrates an orthogonal projection of the locus of the object on the XY plane, which forms an ellipse.

In part (a), the XY plane represents the observation plane (image capturing plane), which is an orthogonally projecting plane on which the image of the object 30 is captured. The Z axis is perpendicular to the XY plane and matches the direction of the optical axis of the image capturing device 32. 33 is feature point 0 on which the coordinate origin 0 falls. 34 is feature point 1 expressed as (x, y, z). 35 is an $\alpha$ plane, representing the plane of rotation of feature point 1 34 when feature point 0 33 falls on the coordinate origin. 36 is an axis of rotation. The axis of rotation can be placed on an arbitrary point. Because it is assumed to be on feature point 0 33, the axis of rotation 36 is on the XZ plane.

In part (b), H is defined as the point where the perpendicular line from feature point 1 34 to the axis of rotation crosses the axis of rotation. The distance between the first feature pint 34 and point H is defined is as d, and the distance between feature point 0 33 (the coordinate origin) and point H is defined as h. The angle formed between the axis of rotation and the Y axis is defined as a depression angle PSI.

In part (c), segments A'B' and C'D' are axes of the ellipse obtained by orthogonally projecting on the XY plane the circular locus of feature point 1 34 on the $\alpha$ plane 35, where H' is the center of the ellipse.

The respective coordinate values of A', B', C', D' and H' are (0, h cos PSI−d sin PSI), (0, h cos PSI+d sin PSI), (−d, h cos PSI), (d, h cos PSI) and (0, h cos PSI).

Figure 7A:
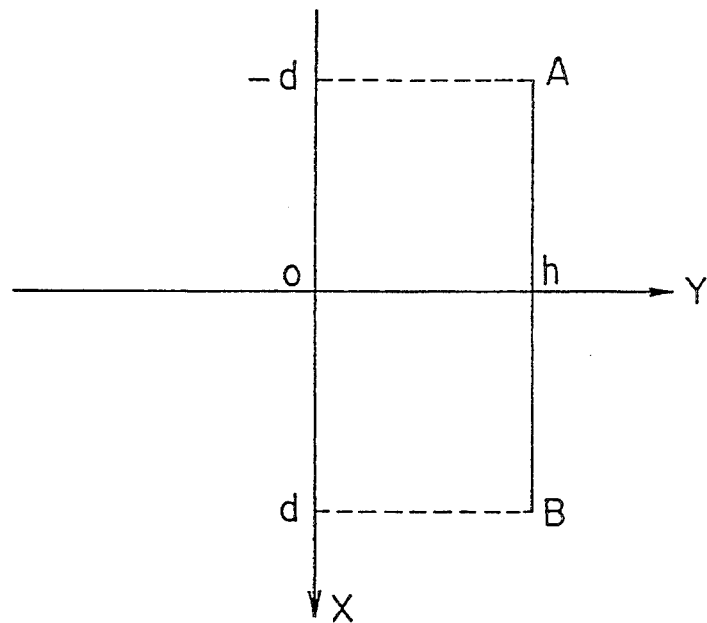
FIG. 7A and 7B is a second explanatory chart illustrating the principle for calculating the depression angle PSI for use in the first embodiment.
Figure 7B:
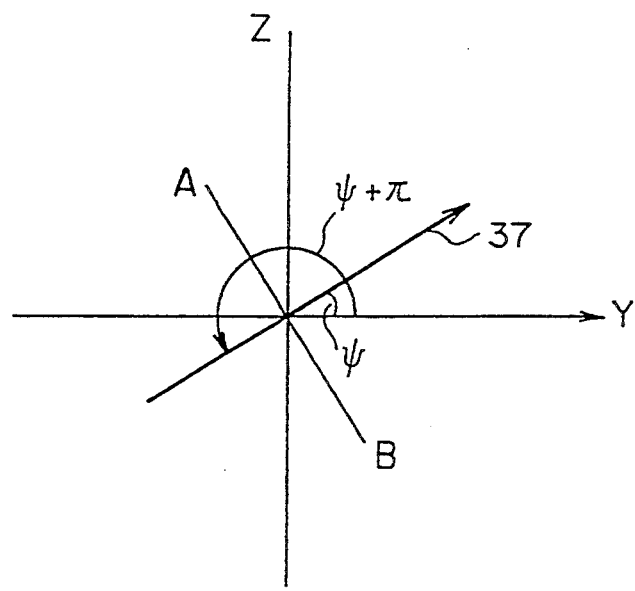

FIG. 7 is a second explanatory chart illustrating the principle for calculating the depression angle PSI for use in the first embodiment.

Part (a) shows an orthogonal projection on the XZ plane when PSI=n $\pi$, where n is an integer.

A segment AB represents an orthogonal projection of the locus of feature point 1 one the $\alpha$ plane 35.

Part (b) shows an orthogonal projection on the YZ plane when h=0.

A segment AB represents an orthogonal projection of the locus of feature point 1 one the $\alpha$ plane 35 when h=0. 37 is an axis of rotation.

The principle of a recognition by depression angle is explained below by further referring to FIGS. 6 and 7.

Assume here that the coordinate value $(x_i, y_i, z_i)$ represents feature point 1 at an i-th instants of time where i=1, 2, 3.

A case is considered in which two [2] feature points are observed on an orthogonally projecting plane.

(1) PSI cannot be determined from the coordinate value of feature point 1 observed at one [1] instant in time only.

(2) When the coordinate values of feature point 1 observed at two [2] instants in time are available,
 (A) When Y coordinate values are the same but the absolute X coordinate values are different, the depression angle PSI is obtained as follows.

The orthogonal projection of the $\alpha$ plane 35 on which feature point rotates is a segment of $y=(-1)^n h$ (where $-d \leq X \leq d$) when PSI=n $\pi$ (where n is an integer). (Refer to part (a) of FIG. 7.)

Therefore, the case where the Y coordinate values are the same but the absolute values of the X coordinate values are different represents a case in which PSI=n $\pi$. (When PSI $\pm$n $\pi$, because the orthogonal projection of the locus of feature point one the $\alpha$ plane 35 is an ellipse which is symmetric against the Y axis, if the Y coordinate values are the same, the absolute X coordinate values are the same.)

Accordingly, when the Y coordinate values are the same while the absolute X coordinate values are different, it is determined that PSI=n $\pi$.

Also, PSI=0 when the Y coordinate value is not less than zero [0], and PSI=$\pi$ when the Y coordinate value is less than 0.

(B) When the Y coordinate values are the same and the absolute X coordinate values are the same, the observations at two [2] instants in time degenerate into an observation at one [1] instant in time, and PSI is indeterminate. The reason therefor is set out below.

The orthogonal projection of feature point is symmetric against the Y axis. Hence, regardless of the depression angle PSI, a coordinate point (−x, y) is necessarily observed if a coordinate point (x, y) is observed. Consequently, the observations of two [2] coordinate points (x, y) and (−x, y) are the same as the observation of one [1] coordinate point (x, y) only. The relative position of feature point on (x, y) can be considered for any depression angle PSI. As such, the information obtained from an observation at just one [1] instant in time is not sufficient to determine the depression angle PSI.

This can also be illustrated by mathematical expressions. As described earlier, the graphic obtained by projecting the locus of feature point on the XY plane is an ellipse when $PSI \pm n\pi$.

Substituting $a=d$ and $b=d \sin PSI$ into the generic expression of an ellipse $x^2/a^2 + y^2/b^2 = 1$, and by parallelly displacing the ellipse by $h \cos PSI$ in the direction of the Y axis, the graphic is expressed as $$x^2 + (y - h \cos PSI)^2 / \sin^2 PSI = d^2 \quad (1)$$

When $PSI = n\pi$, on the other hand, $y = (-1)^n h$ (where $-d \leq x \leq d$). (Refer to part (a) of FIG. 7.) (x, y) and $(-x, y)$ are solutions in both cases. In addition, even if it is known that $PSI \pm n\pi$, because the substitution of $(-x, y)$ into the above mathematical expression (1) produces nothing but the same mathematical expression (1), PSI is indeterminate.

What is described above is that data on the two [2] coordinate points (x, y) and $(-x, y)$ observed at two [2] instants in time are not anything more than data on the one [1] coordinate point (x, y) observed at one [1] instant in time.

(C) Because a case in which the Y coordinate values are different represents a case in which $PSI \pm n\pi$ (where n is an integer), the above mathematical expression (1) is valid, and only two [2] equations can be obtained in the case of observations at two [2] instants in time. Whereas there are three [3] unknowns, which are (PSI, h, d), the depression angle PSI remains indeterminate.

(3) When three [3] instants in time are observed, (A) When there are two [2] instants in time at which the Y coordinate values are the same but the absolute X coordinate values are different, as with the above case of (2)(A), $PSI = 0$ if the Y coordinate value is not less than zero [0], and $PSI = \pi$ if the Y coordinate value is less than zero [0]. (This means that the Y coordinate values are the same at three [3] instants in time.)

(B) When the Y coordinate values at not less than two [2] instants in time are the same but the absolute X coordinate values are all the same, the observations degenerate into a case in which observations are not at more than two [2] instants in time, which is identical to the above case of (2)(B), and the depression angle PSI remains indeterminate.

(C) A case is considered in which the Y coordinate values at three [3] instants in time are all different.

Because the Y coordinate values at three [3] instants in time are different, $PSI \pm n\pi$ (where n is an integer). Substituting $c = h \cos PSI$ into $$x_i^2 + (y_i - h \cos PSI)^2 / \sin^2 PSI = d^2 \quad (2)$$

for orthogonal projecting $(x_i, y_i, z_i)$ at three [3] instants in time, where $i = 1, 2, 3$, $$x_i^2 + (y_i - c)^2 / \sin^2 PSI = d^2 \quad (3)$$

is obtained. By substituting $x_1, x_2, x_3, y_1, y_2$ and $y_3$ into expressions (2) and (3) thereby eliminating d, $$x_i^2 + (y_i - c)^2 / \sin^2 PSI = x_1^2 + (y_1 - c)^2 / \sin^2 PSI$$

for $X_1$, $x_i$ (i=2, 3), and $y_1$, $y_i$ (i=2, 3). Therefore, $$c = h \cos PSI = \{(x_i^2 - x_1^2) \sin^2 PSI + (y_i^2 - y_1^2)\} / \{2(y_i - y_1)\} \quad (4)$$

Further substituting $x_2$ and $x_3$ into expression (4) thereby eliminating c, $$\{(x_2^2 - x_1^2) \sin^2 PSI + (y_2^2 - y_1^2)\}(y_3 - y_1) = \{(x_3^2 - x_1^2) \sin^2 PSI + (y_3^2 - y_1^2)\}(y_2 - y_1)$$

Thus, $$\{(x_2^2 - x_1^2)(y_3 - y_1)(x_3^2 - x_1^2) - (y_2 - y_1)\} \sin^2 PSI = (y_1 - y_2)(y_2 - y^3)(y_3 - y_1).$$

Because the value of the right side is not zero [0], the coefficient of the left side cannot be zero [0]. As such, $$\sin^2 PSI = (y_1 - y_2)(y_2 - y_3)(y_3 - y_1)/\{(x_2^2 - x_1^2)(-y_3 - y_1) - (x_3^2 - x_1^2)(y_2 - y_1)\} \quad (5)$$

By rewriting the denominator on the right side, $$\sin^2 PSI = (y_1 - y_2)(y_2 - y_3)(y_3 - y_1)/\{x_1^2(y_2 - y_3) + x_2^2(-y_3 - y_1) + x_3^2(y_1 - y_2)\} \quad (6)$$

Because the value of $\sin^2 PSI$ alone is not sufficient to distinguish $\pm PSI$ from $\pm(PSI + \pi)$, the sign of cos PSI needs to be determined.

The sign of cos PSI is calculated from $c = h \cos PSI$ as follows:

(A) When $\sin^2 PSI = 1$, $\cos PSI = 0$.

(B) When $c \pm 0$, (when $h \pm 0$ and $\sin^2 PSI \pm 1$), because $h > 0$, the sign of cos PSI can be determined by the sign of c.

(C) When $\sin^2 PSI \pm 1$ and $c = 0$, because $h = 0$, the sign of cos PSI is indeterminate. In this case, as is evident from part (b) of FIG. 7, two [2] solutions of PSI and $PSI + \pi$ are obtained.

The following theorem represents the case in which the Y coordinate values are all different at three [3] instants in time for observations.

[Theorem 1]

When the Y coordinate values at three [3] instants in time are all different, the following expression determines PSI.

$$\sin PSI = \pm [(y_1 - y_2)(y_2 - y_3)(y_3 - y_1)/\{(x_2^2 - x_1^2)(y_3 - y_1) - (x_3^2 - x_1^2)(y_2 - y_1)\}]^{\frac{1}{2}} \quad (5')$$

When c is written as $h \cos PSI$, by using $$c = h \cos PSI = \{(x_i^2 - x_1^2) \sin^2 PSI + (y_i^2 - y_1^2)\} / \{2(y_i - y_1)\} \quad (4)$$

the sign of cos PSI is determined for each of the following three [3] cases (A), (B) and (C).

(A) When $\sin^2 PSI \pm 1$, $\cos PSI = 0$.

(B) When $c \pm 0$, the sign of cos PSI is equal to the sign of c.

(C) When $\sin^2 PSI \pm 1$ and $c = 0$, the sign of cos PSI can be either positive or negative.

There are other methods for calculating PSI than the one mentioned above. Here, as an example of the above calculating method, the basic setup of the first embodiment is explained with reference to FIG. 4. Another method of calculating PSI will be described later.

Figure 1:
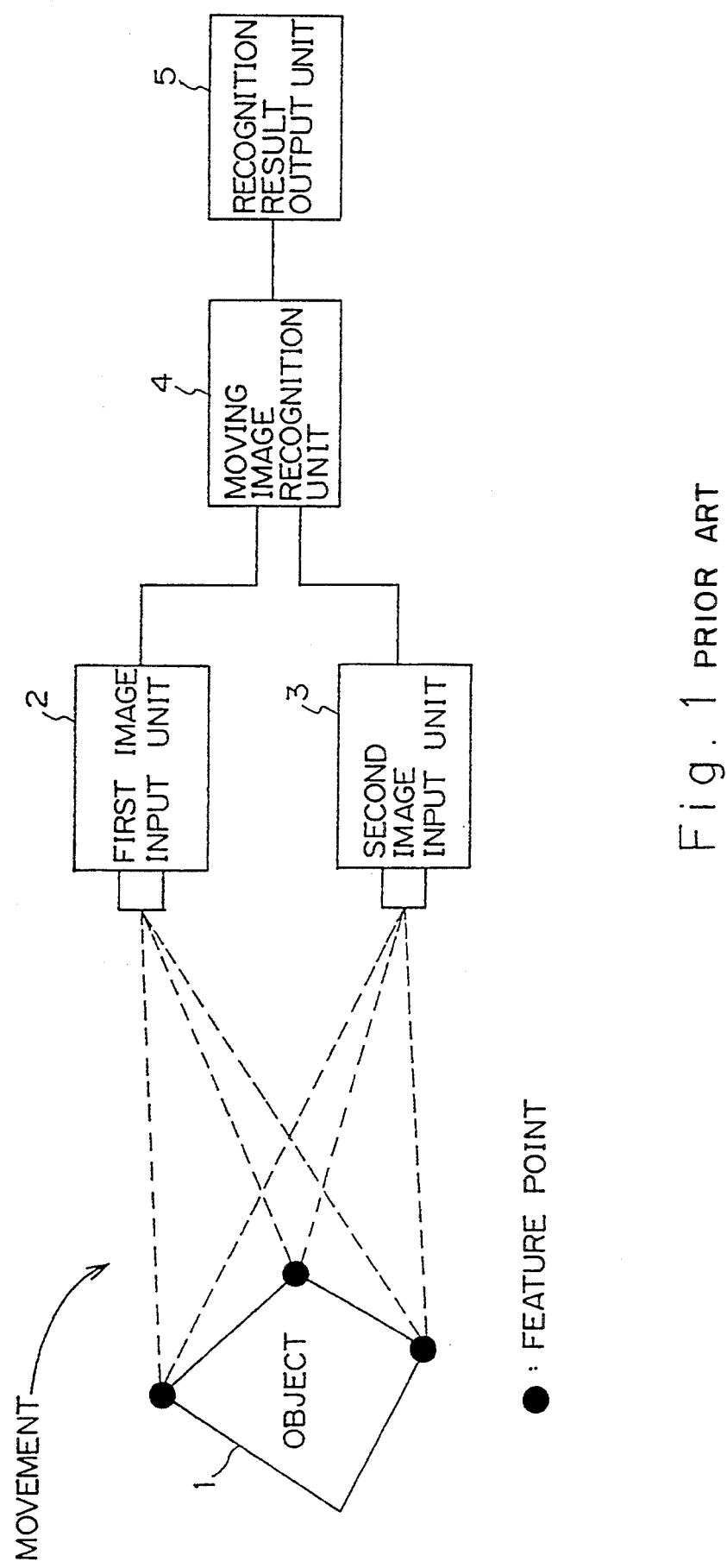
FIG. 1 shows a concept of a conventional moving body recognition apparatus.
Figure 2:
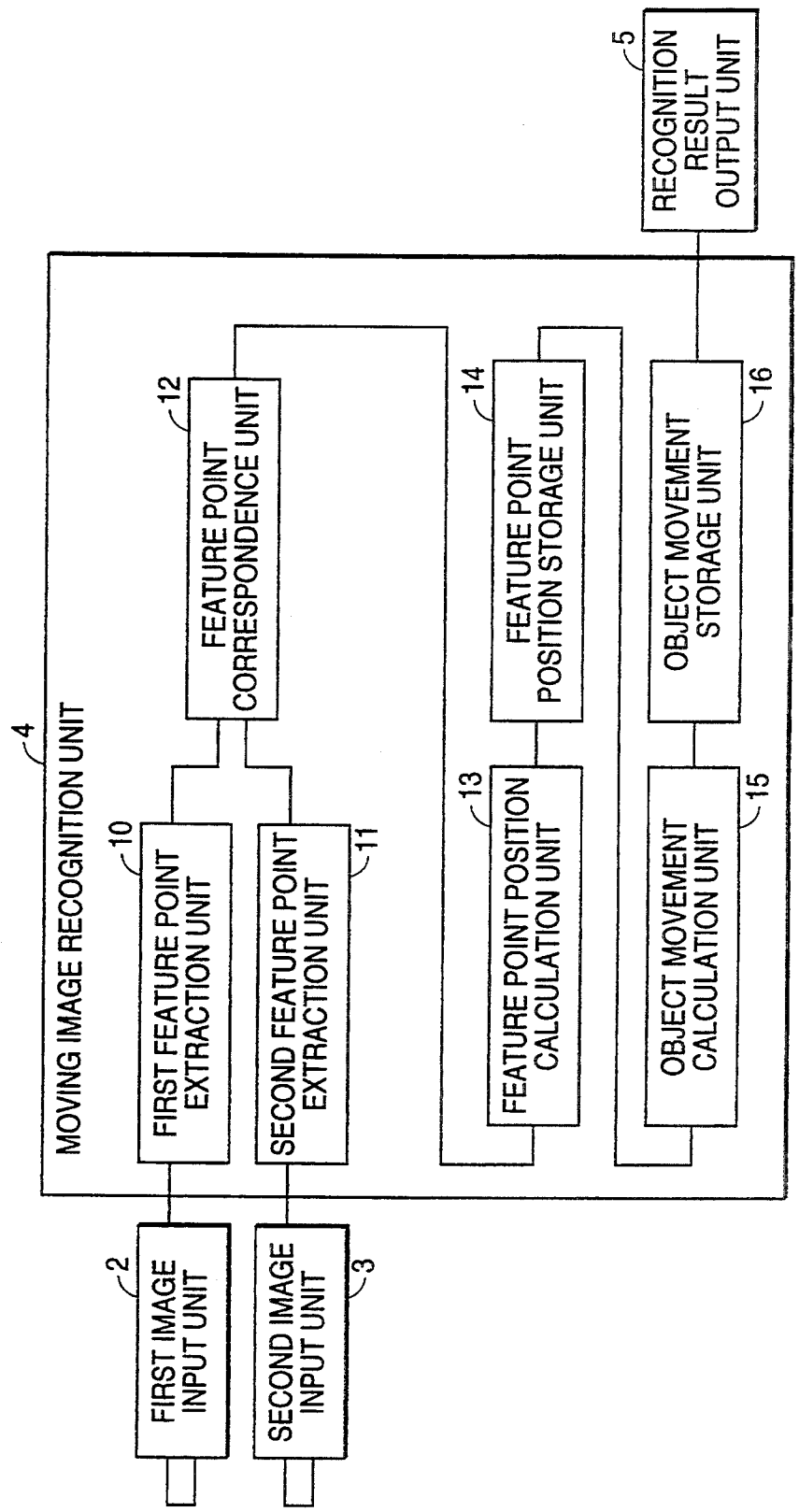
FIG. 2 shows a configuration of a moving body recognition unit of a conventional moving body recognition apparatus.
Figure 3:
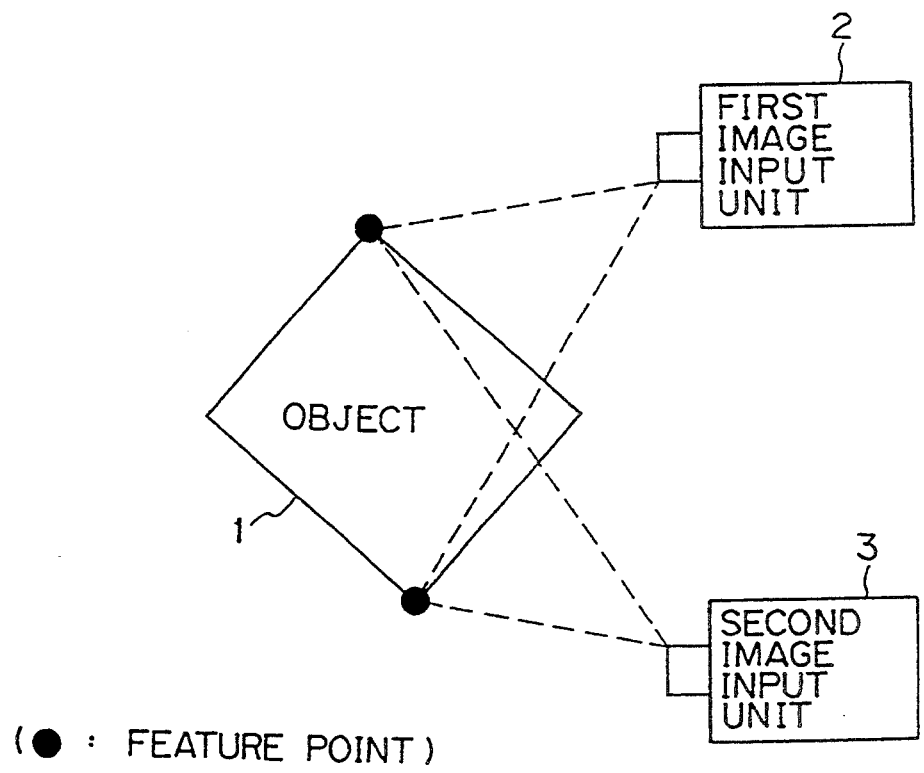
FIG. 3 shows an example in which a conventional moving body recognition apparatus fails to establish correspondences between feature points captured by different image input units.
Figure 4:
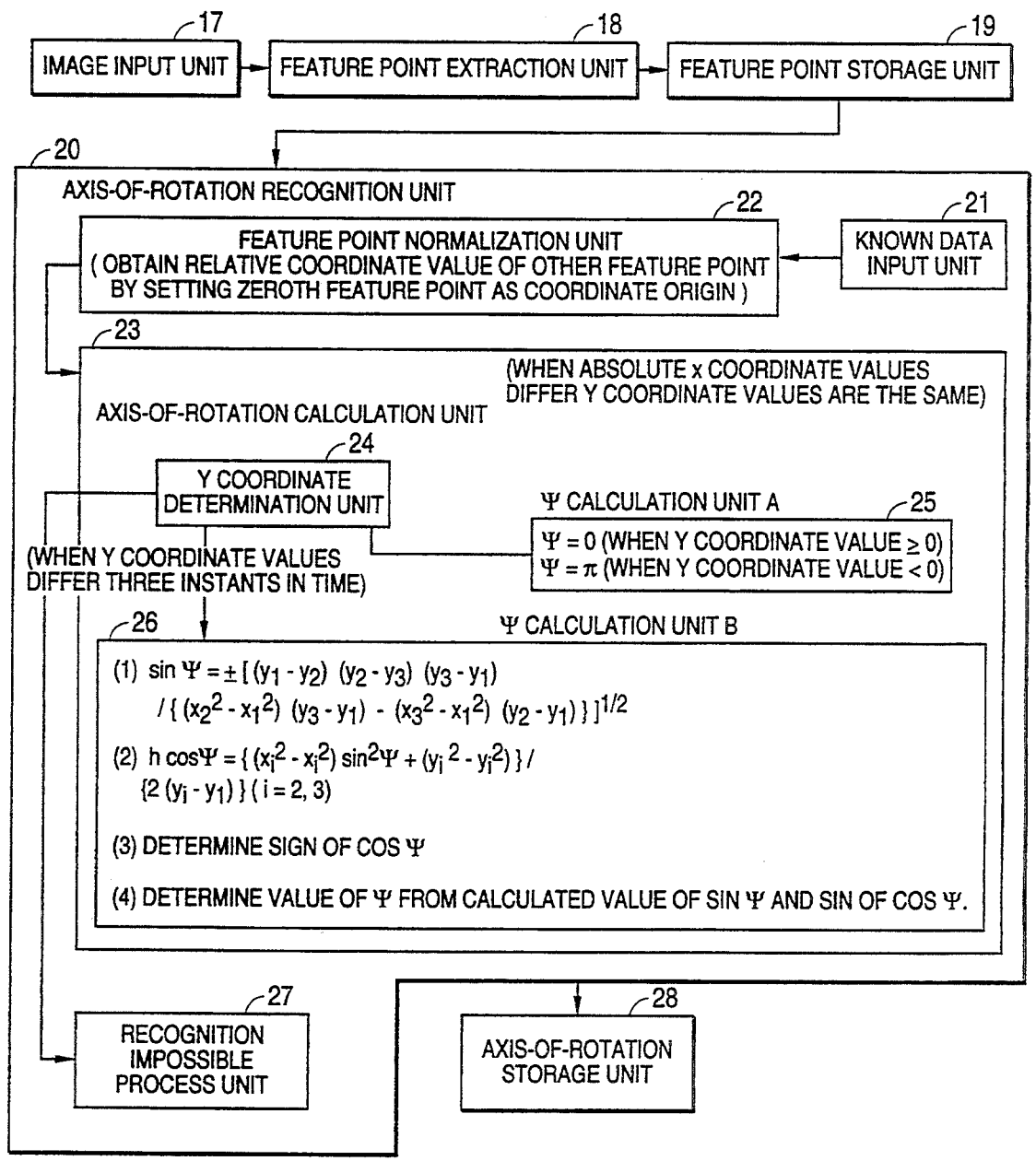
FIG. 4 is a block diagram showing a basic setup of a first embodiment.

FIG. 4 is a block diagram showing the basic setup of a first embodiment.

17 is an image input unit whose image capturing plane is defined as the XY plane with the X axis set parallel to the plane on which an object moves. (That is, the orthogonal projection of the axis of rotation of a feature point is in the direction of the Y axis.) 18 is a feature point extraction unit, 19 is a feature point storage unit, and 20 is an axis-of-rotation recognition unit for calculating PSI. 21 is a known data input unit for inputting known data (such as on the range and sign of depression angle PSI) about an object. 22 is a feature point position normalization unit for normalizing a feature point position by putting one [1] of plural feature points on the coordinate origin and by calculating the relative coordinate values of other feature points.

23 is an axis-of-rotation calculation unit for calculating PSI based on the X and Y coordinate values. 24 is a Y coordinate value determination unit for calculating whether the Y coordinate values are equal or not. 25 is a PSI calculation unit A for calculating the depression angle PSI when the Y coordinate values observed at two [2] instants in time are the same but the absolute X coordinate values are different. 26 is a PSI calculation unit B for calculating the depression angle PSI when the Y coordinate values observed at three [3] instants in time are different. 27 is a recognition impossible determination unit for executing a recognition impossible process when PSI cannot be recognized.

28 is an axis-of-rotation storage unit for storing the value of PSI obtained by the axis-of-rotation calculation unit 23.

Operations of the basic setup shown in FIG. 4 are set forth below.

The image input unit 17 receives the image of an object. The feature point extraction unit 18 extracts feature points from an inputted image. The feature point storage unit 19 stores the coordinate value of an extracted feature point on the image plane.

The known data input unit 21 receives known data about an object such as the range of the depression angle PSI. The known data input unit 21 sends to the feature point position normalization unit 22 the direction of an axis of rotation on the image plane.

The feature point position normalization unit 22 receives from the feature point storage unit 19 the position data of feature points on the image plane.

The feature point position normalization unit 22 stores the position of feature point 0 on the image plane. Then, it sets the XY rectangular coordinate system, such that the direction of the axis of rotation on the plane matches the Y axis direction, by putting a particular feature point 0 on the coordinate origin where the X and Y coordinate axes meet, thus obtaining the relative coordinate positions of other feature points as against feature point 0. The XY rectangular coordinate system displaces parallelly at every instants in time for observation such that the position of feature point 0 on the image plane matches the coordinate origin.

The axis-of-rotation calculation unit 23 calculates the depression angle PSI.

When the Y coordinate value determination unit 24 determines that the same Y coordinate value but different absolute X coordinate value have been observed at two [2] instants in time, the axis-of-rotation calculation unit 52 has PSI calculation unit A 57 obtain PSI=0 (when the Y coordinate value is not less than zero [0],) and PSI=$\pi$ (when the Y coordinate value is less than zero [0],).

When an object is observed only at two [2] instants in time, and if none of the above cases apply, the axis-of-rotation calculation unit 23 notifies the recognition impossible determination unit 27 of a recognition disablement. Then, the recognition impossible determination unit 27 executes a recognition impossible process.

When the Y coordinate values at three [3] instants in time are all different, the depression angle PSI is calculated according the above theorem 1, whose value the axis-of-rotation storage unit 28 stores.

In this manner, the depression angle PSI is calculated in the first embodiment. Based on the calculated result, the shape of the moving body, i.e. the coordinate values of the feature points, and its movement, i.e. the rotation of the moving body, are recognized. Second and third embodiments exhibit other methods for recognizing the shape and movement of a moving body. Here, a further discussion of a method for recognizing a depression angle PSI in the first embodiment continues.

Figure 8:
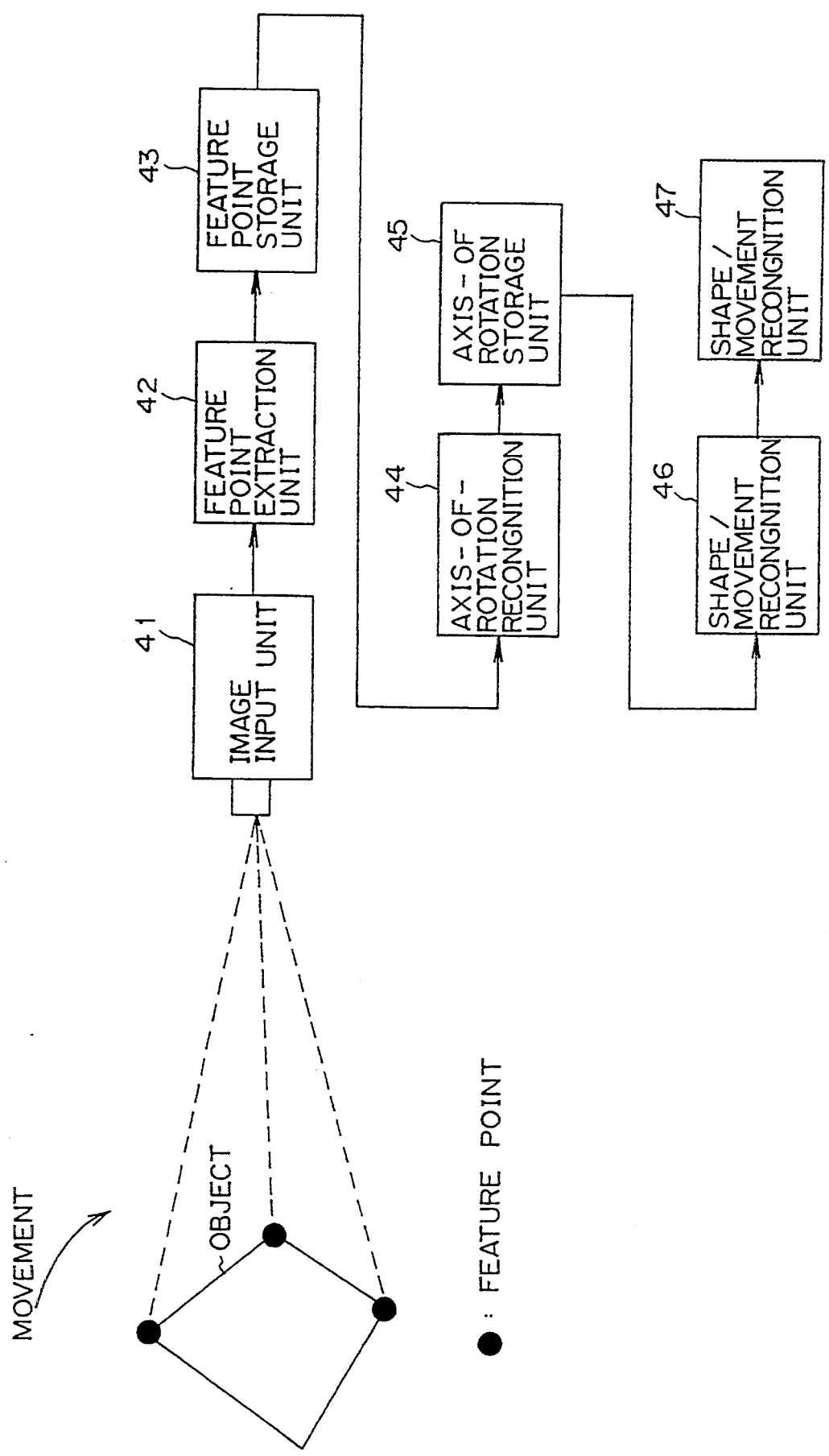
FIG. 8 shows a configuration of a moving body recognition apparatus pursuant to the first embodiment.

FIG. 8 shows a configuration of a moving body recognition apparatus pursuant to the first embodiment.

40 is an object (where a black blot represents a feature point). 41 is an image input unit. 42 is a feature point extraction unit. 43 is a feature point storage unit. 44 is an axis-of-rotation recognition unit, which corresponds to the axis-of-rotation recognition unit 20 shown in FIG. 4. 45 is an axis-of-rotation storage unit. 46 is a shape/movement recognition unit for calculating the shape and movement of the object 40 from the depression angle PSI and orthogonal projections of plural feature points at plural instants in time. 47 is a shape/movement storage unit for storing the shape (the position in a three-dimensional coordinate system) and movement (the volume of rotation) of the object 40.

Figure 9:
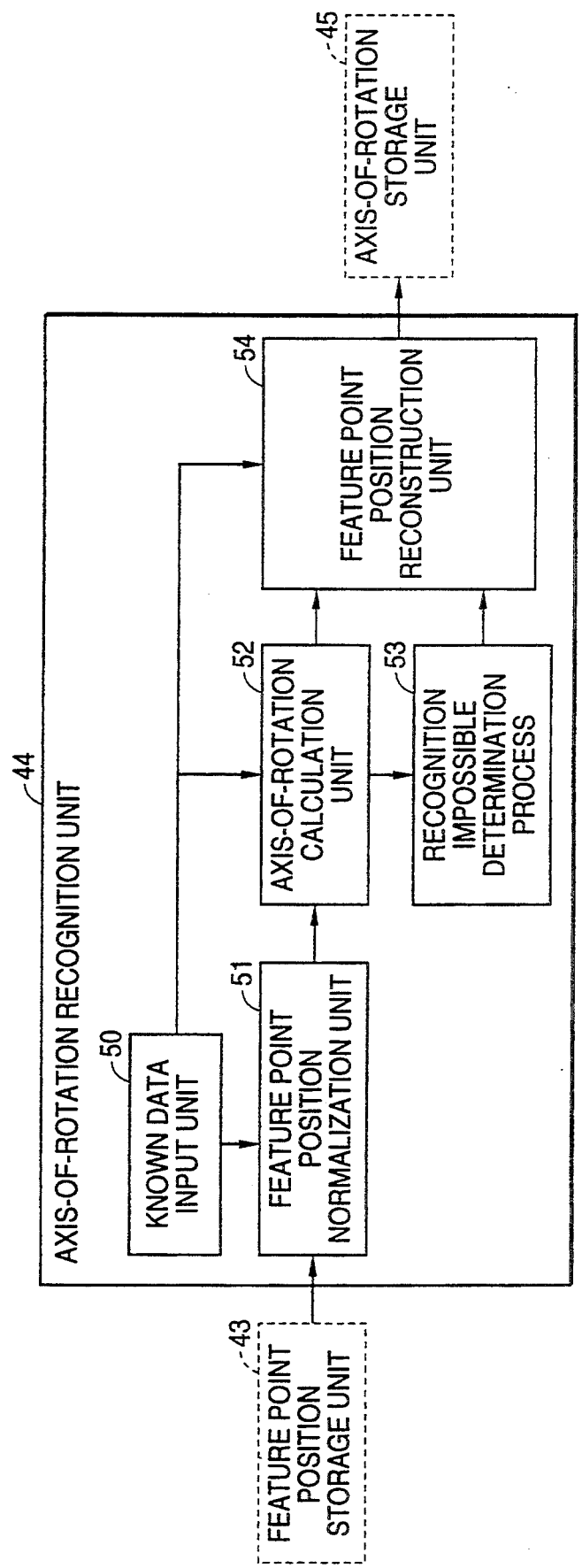
FIG. 9 shows a configuration of an axis-of-rotation recognition unit pursuant to the first embodiment.

FIG. 9 shows a configuration of an axis-of-rotation recognition unit pursuant to the first embodiment.

Parts shown in FIG. 9 that are the same as those shown in FIG. 8 have the same numbers, such as the feature point storage unit 43, the axis-of-rotation storage unit 45.

50 is a known data input unit. 52 is an axis-of-rotation calculation unit. 53 is a recognition impossible determination unit for executing a recognition impossible process when the depression angle PSI cannot be recognized. 54 is a feature point position reconstruction unit for storing in the axis-of-rotation storage unit 45 the on-screen coordinate value of feature point 0 and the direction of the axis of rotation passing through feature point 0 sent from the axis-of-rotation calculation unit 52 in relation to the image capturing system.

Figure 10:
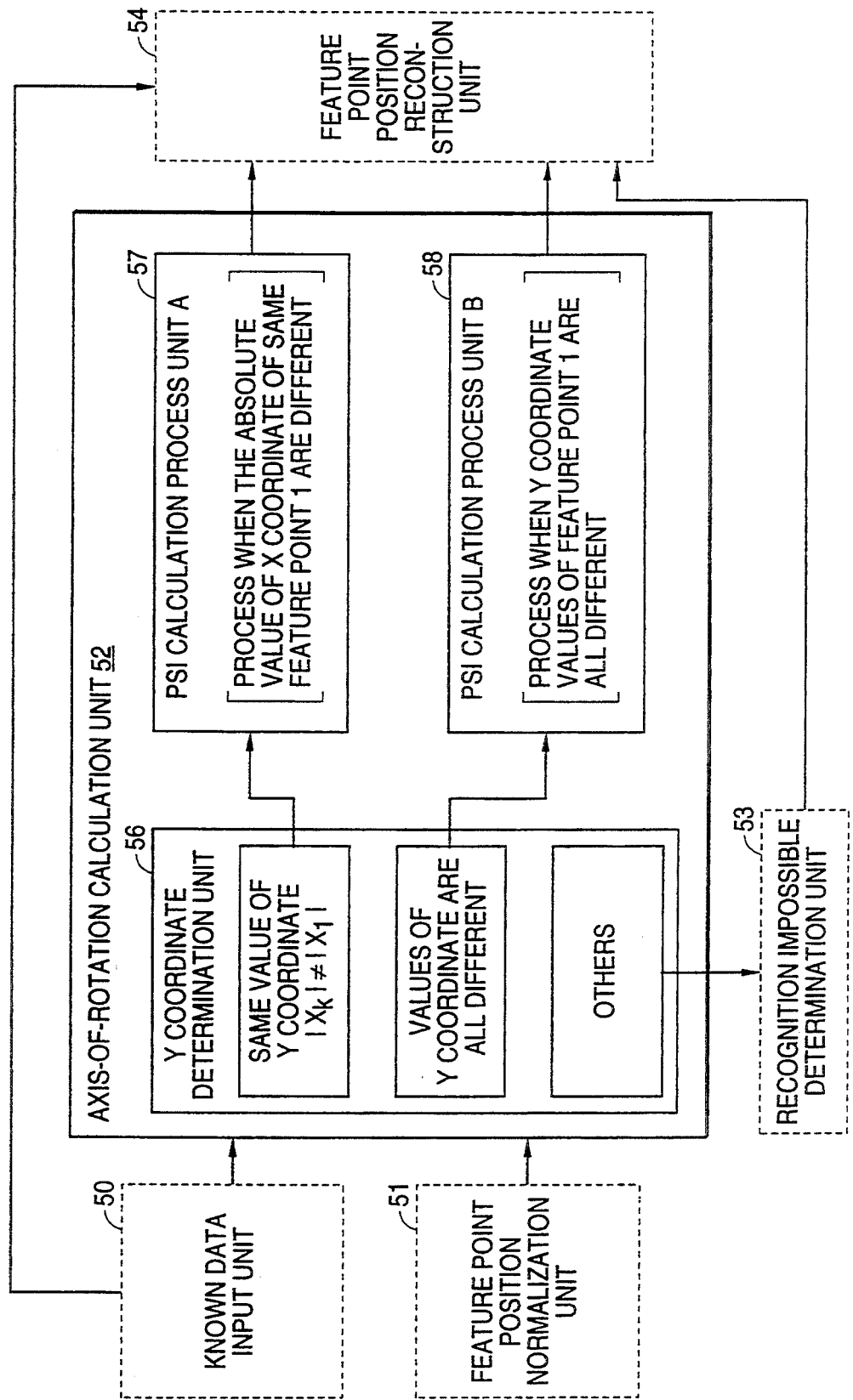
FIG. 10 shows a configuration of the axis-of-rotation calculation unit pursuant to the first embodiment.

FIG. 10 shows a configuration of an axis-of-rotation calculation unit pursuant to the first embodiment.

Parts shown in FIG. 10 that are the same as those shown in FIG. 9 have the same numbers, such as the known data input unit 50, the feature point position normalization unit 51, the axis-of-rotation calculation unit 52, the recognition impossible determination unit and the feature point position reconstruction unit 54.

56 is a Y coordinate value determination unit for observing the X and Y coordinate values of feature point at two [2] or three [3] instants in time, thereby determining a first case in which Y coordinate values are the same at two [2] instants in time whilst their absolute X coordinate values are different, a second case in which Y coordinate values at three [3] instants in time are different, and a third case which represents all others that the first and second cases.

57 is a PSI calculation unit A for performing processes when the Y coordinate values are the same whilst the X coordinate value of feature point is different.

58 is a PSI calculation unit B for performing processes when the Y coordinate values of feature point are all different at three [3] instants in time.

Figure 11:
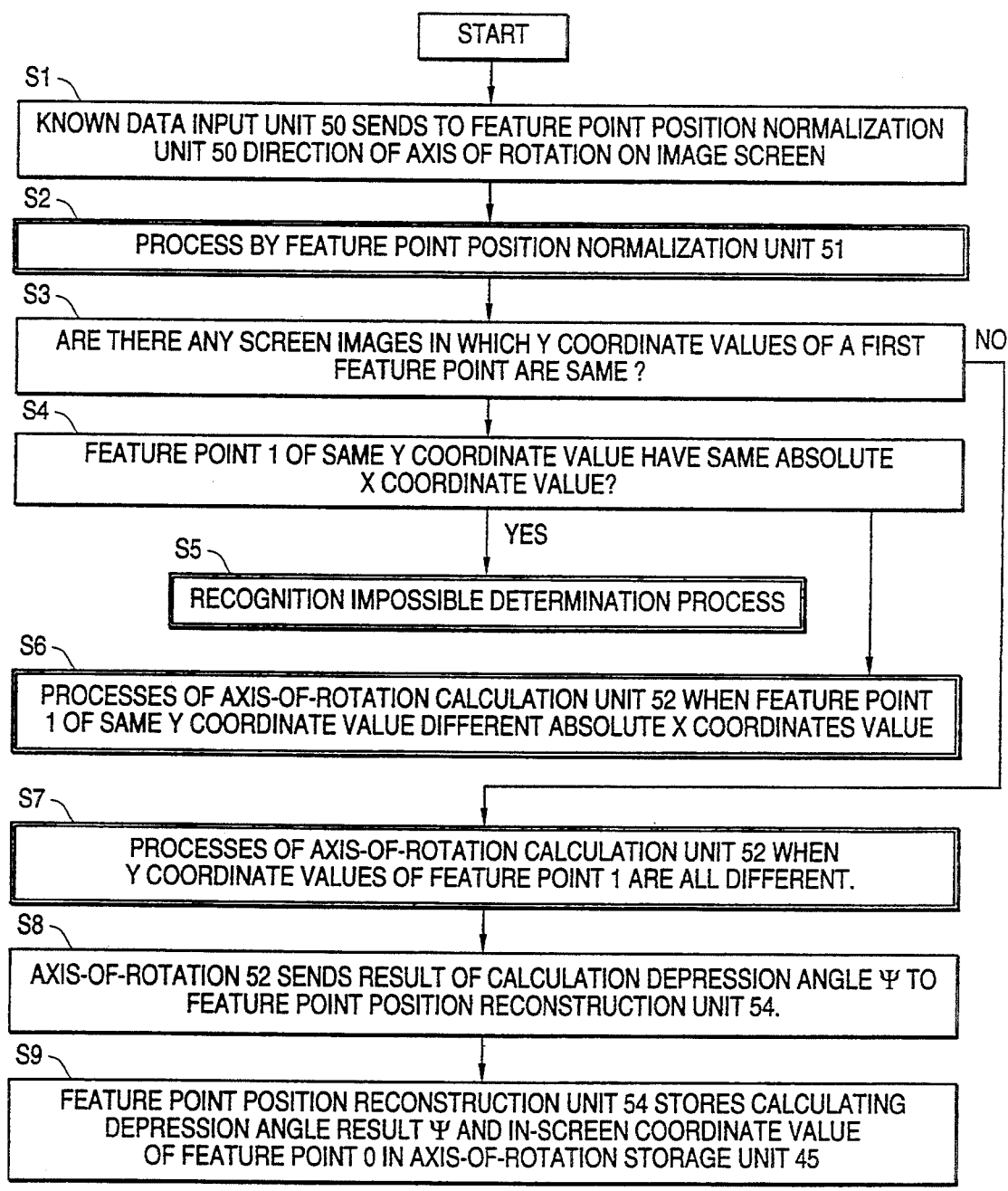
FIG. 11 is a first flowchart of processes executed in the first embodiment.

FIG. 11 is a first flowchart of processes executed in the first embodiment.

FIG. 12 is a second flowchart of processes executed in the first embodiment.

Figure 13:
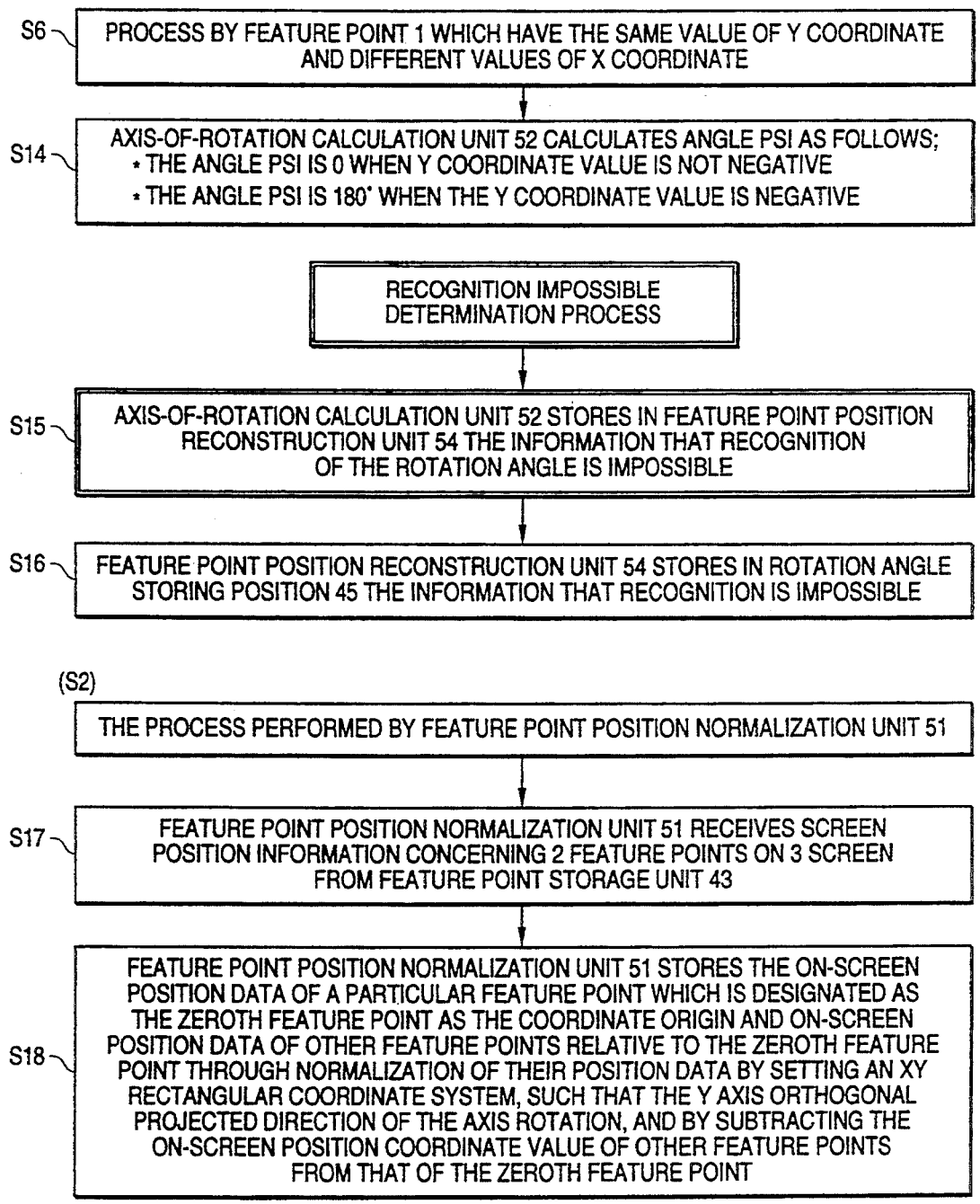
FIG. 13 is a third flowchart of processes executed in the first embodiment.

FIG. 13 is a third flowchart of processes executed in the first embodiment.

The flow of processes executed by the axis-of-rotation calculation unit 52 and other components in the axis-of-rotation recognition unit 44 is explained below according to the steps shown in FIGS. 11, 12 and 13 with reference to FIGS. 9 and 10.

S1: The known data input unit 50 sends to the feature point position normalization unit 51 the direction of the axis of rotation on the image screen, after having set the XY coordinate system of the image capturing plane such that the orthogonally projection of the axis of rotation points the Y axis direction.

S2: The axis-of-rotation recognition unit 44 has the feature point position normalization unit 51 perform its process. (Refer to FIG. 13.)

[Processes executed by the feature point position normalization unit 51]

S17: The axis-of-rotation recognition unit 44 has the feature point position normalization unit 51 receive from the feature point position storage unit 43 the on-screen position data of two [2] feature points at three [3] instants in time.

S18: The axis-of-rotation recognition unit 44 has the feature point position normalization unit 51 store the on-screen position data of a particular feature point which is designated as feature point 0 set as the coordinate origin and on-screen position data of other feature points relative to feature point 0 by normalizing their position data in an XY rectangular coordinate system, such that the Y axis matches the on-screen direction of the axis of rotation, i.e. the orthogonally projected direction of the axis of rotation, and by subtracting the on-screen position coordinate values of the other feature points from that of feature point 0.

The Y coordinate value determination unit 56 executes its process from S3.

[Processes by the Y coordinate value determination unit 56]

S3: The axis-of-rotation calculation unit 52 has the Y coordinate value determination unit 56 determine whether there are screen images having the same Y coordinate values of feature point 1. A positive determination invokes S4, and a negative determination invokes S7.

[Processes by the PSI calculation unit B 58]

More specifically, when it is determined in S3 that the Y coordinate values of feature point observed at three [3] instants in time are all different, the axis-of-rotation recognition unit 44 has the axis-of-rotation calculation unit 52 perform the corresponding process in S7 by activating the PSI calculation unit B 58. (Refer to FIG. 12.)

S10: The axis-of-rotation calculation unit 52 has its PSI calculation unit B 58 calculate sin PSI by using the following expression:

$$\sin PSI = \pm [(y_1-y_2)(y_2-y_3)(y_3-y_1)/\{(x_2^2-x_1^2)(y_3-y_1)-(x_3^2-x_1^2)(y_2-y_1)\}]^{\frac{1}{2}}$$

S11: The axis-of-rotation calculation unit 52 has its PSI calculation unit B 58 calculate h cos PSI by using the following expression:

$$h \cos PSI = \{(x_i^2-x_1^2)\sin^2 PSI + (y_i^2-y_1^2)\}/\{2(y_i-y_1)\} \text{ (where } i=2 \text{ or } 3)$$

S12: The axis-of-rotation calculation unit 52 has its PSI calculation unit B 58 determine the sign of cos PSI by the following procedures.

(A) When $\sin^2 PSI = 1$, cos PSI=0.

(B) When $c \pm 0$, the sign of cos PSI is equal to the sign of c.

(C) When $\sin^2 PSI \pm 1$ and c=0, the sign of cos PSI is indeterminate. The axis-of-rotation calculation unit 52 has its PSI calculation unit B 58 return to the y coordinate value determination unit 56 h=0, PSI and PSI+$\pi$ for an output to the recognition impossible determination unit 53.

S13: The axis-of-rotation calculation unit 52 has its PSI calculation unit B 58 obtain the value of PSI from the calculated value of sin PSI and the sign of cos PSI. For case (C) in S12, PSI and PSI+$\pi$ are set as solutions.

[Processes by the PSI calculation unit A 57]

When the absolute X coordinate values of feature point 1 having the same Y coordinate value are different in S4, the axis-of-rotation calculation unit 52 has its PSI calculation unit A 57 calculate the value of PSI from the calculated value of sin PSI and the sign of cos PSI. (Refer to FIG. 13.)

S14: The axis-of-rotation calculation unit 52 has its PSI calculation unit A 57 obtain the value of the depression angle PSI to be zero [0], when the Y coordinate value is not negative and as $\pi$ otherwise.

[Processes by the recognition impossible determination unit 53]

If the absolute X coordinate values of feature points 1 having the same Y coordinate value are the same, the recognition impossible determination unit 53 executes its a recognition impossible process in S5. (Refer to FIG. 13.)

S15: The axis-of-rotation calculation unit 52 stores in the feature point position reconstruction unit 54 data that it is impossible to recognize the axis of rotation.

S16: The feature point position reconstruction unit 54 stores in the axis-of-rotation storage unit 45 data that it is impossible to recognize the axis of rotation.

Also, in S10, sin PSI may be calculated by using the above described expression $$\sin PSI = \pm [(y_1-y_2)(y_2-y_3)(y_3-y_1)/\{(x_1^2-x_1^2)(y_3-y_1)-(x_3^2-x_1^2)(y_2-y_1)\}]^{\frac{1}{2}}$$

Also, in S11, either an expression $$h \cos PSI = \{(x_2^2-x_1^2)(y_3^2-y_1^2)-(x_3^2-x_1^2)(y_2^2-y_1^2)\}/2\{(x_2^2-x_1^2)(y_3-y_1)-(x_3^2-x_1^2)(y_2-y_1)\}$$

or another expression $$c = h \cos PSI$$
$$= \{x_1^2(y_2^2 - y_3^2) + x_2^2(y_3^2 - y_1^2) + x_3^2(y_1^2 - y_2^2)\}/$$
$$2\{x_1^2(y_2 - y_3) + x_2^2(y_3 - y_1) + x_3^2(y_1 - y_2)\}$$

may be used for calculating h cos PSI. This calculating method is different from the one explained in the description of FIG. 4. Described below are the transformations for obtaining these expressions.

Because the Y coordinate values are not constant, $PSI \pm n\pi$ (where n is an integer).

Substituting $c \equiv h \cos PSI$ into $$x_i^2 + (y_i - h \cos PSI)^2/\sin^2 PSI = d^2 \quad (2)$$

for orthogonal projections $(x_i, y_i, z_i)$ at three [3] instants in time (i=1, 2, 3), $$x_i^2 + (y_i - c)^2/\sin^2 PSI = d^2 \quad (3)$$

is obtained.

By eliminating d, $$x_i^2 + (y_i - c)^2/\sin^2 PSI = x_1^2 + (y_1 - c)^2/\sin^2 PSI$$

is obtained for $x_i$, $x_i$ (i=2, 3), and $y_1$, $y_i$ (i=2, 3).

Therefore, $$\{-2c(y_i - y_1) + (y_i^2 - y_1^2)\}/\sin^2 PSI = -(x_i^2 - x_1^2)$$

Accordingly, $$(x_i^2 - x_1^2)\sin^2 PSI = 2c(y_i - y_1) - (y_i^2 - y_1^2) \quad (7)$$

Because the Y coordinate values at three [3] instants in time are all different, there are k (=2, 3) satisfying $|X_k| \pm |x_1|$. For those k, $$\sin PSI = \pm[2c(y_k - y_1) - (y_k^2 - y_1^2)]/\{(x_k^2 - x_1^2)\}^{\frac{1}{2}} \quad (8)$$

When sin PSI is eliminated by substituting $x_2$ and $x_3$ into expression (7), $$(x_2^2 - x_1^2)\{-2c(y_3 - y_1) + (y_3^2 - y_1^2)\} =$$
$$(x_3^2 - x_1^2)\{-2c(y_2 - y_1) + (y_2^2 - y_1^2)\}$$

Hence, $$2c\{(x_2^2 - x_1^2)(y_3 - y_1) - (x_3^2 - x_1^2)(y_2 - y_1)\} =$$
$$(x_2^2 - x_1^2)(y_3^2 - y_1^2) - (x_3^2 - x_1^2)(y_2^2 - y_1^2) \quad (9)$$

Therefore, $$2c\{x_1^2(y_2 - y_3) + x_2^2(y_3 - y_1) + x_3^2(y_1 - y_2)\} =$$
$$x_1^2(y_3^2 - y_2^2) + x_2^2(y_3^2 - y_1^2) + x_3^2(y_1^2 - y_2^2) \quad (10)$$

Because the value of coefficient c cannot be zero [0], (as will be described later)

$$c = \{(x_2^2 - x_1^2)(y_3^2 - y_1^2) - (x_3^2 - x_1^2)(y_2^2 - y_1^2)\}/$$
$$2\{(x_2^2 - x_1^2)(y_3 - y_1) - (x_3^2 - x_1^2)(y_2 - y_1)\} \quad (11)$$

Because $c \equiv h \cos PSI$, the sign of cos PSI can be determined by an analysis similar to the illustration of theorem 1.

When $c \neq 0$, the sign of cos PSI can be determined. One [1] solution of the depression angle PSI can be obtained as a mirror image inversion against the orthogonally projecting plane from expression (8).

The reason why the value of coefficient C in expression (9) is not zero [0], is as follows. By using $x_i^2 = d^2 - (y_i - c)^2/\sin^2 PSI$, which is a transformation of expression (2), $$x_i^2 - x_1^2 = -\{(y_i - c)^2 - (y_1 - c)^2\}/\sin^2 PSI$$
$$= -(y_i - y_1)(y_i + y_1 - 2c)/\sin^2 PSI$$

Accordingly, $$(x_2^2 - x_1^2)(y_3 - y_1) - (x_3^2 - x_1^2)(y_2 - y_1) =$$

$$-(1/\sin^2 PSI)\{(y_2 - y_1)(y_2 + y_1 - 2c)(y_3 - y_1) -$$

$$(y_3 - y_1)(y_3 + y_1 - 2c)(y_2 - y_1)\} =$$

$$(1/\sin^2 PSI)(y_1 - y_2)(y_2 - y_3)(y_3 - y_1) \neq 0$$

The above is summarized as theorem 2.

[Theorem 2]

When the Y coordinate values at three [3] instants in time are all different, the depression angle PSI is obtained by the following procedure.

For k (=2, 3) satisfying $|x_k| \pm |x_1|$, $$\sin PSI = \pm[2c(y_k - y_1) - (y_k^2 - y_1^2)]/\{(x_k^2 - x_1^2)\}^{\frac{1}{2}}$$

where the value of c is obtained as $$c = h \cos PSI \quad (11)$$
$$= \{(x_2^2 - x_1^2)(y_3^2 - y_1^2) - (x_3^2 - x_1^2)(y_2^2 - y_1^2)\}/$$
$$2\{(x_2^2 - x_1^2)(y_3 - y_1) - (x_3^2 - x_1^2)(y_2 - y_1)\}$$

Here, the sign of cos PSI is determined as follows.
(A) When $\sin^2 PSI = 1$, cos PSI = 0.
(B) When $c \neq 0$, the sign of cos PSI is equal to the sign of c.
(C) When $\sin^2 PSI \pm 1$ and c = 0, the sign of cos PSI is indeterminate.

The depression angle PSI can be obtained through the set expressions for operations at each step of the "processes of the PSI calculation unit B 58 in the axis-of-rotation calculation unit 52 when the Y coordinate values of a feature point are all different" based on theorem 2.

FIG. 14 is an flowchart of other processes by the axis-of-rotation calculation unit executed when the Y coordinate values of feature point captured at three [3] instants in time are different.

More specifically, it shows the flow of processes executed by the PSI calculation unit B 58.

S20: The axis-of-rotation calculation unit 52 calculates c by expression (11), which is $$c = h \cos PSI \quad (11)$$
$$= \{(x_2^2 - x_1^2)(y_3^2 - y_1^2) - (x_3^2 - x_1^2)(y_2^2 - y_1^2)\}/$$
$$2\{(x_2^2 - x_1^2)(y_3 - y_1) - (x_3^2 - x_1^2)(y_2 - y_1)\}$$

S21: For k (=2, 3) satisfying $|x_k| \pm |x_1|$, the axis-of-rotation calculation unit 52 calculates sin PSI by the following expression, $$\sin PSI = \pm 2c(y_k - y_1) - (y_k^2 - y_1^2)/\{(x_k^2 - x_1^2)\}^{\frac{1}{2}}$$

S22: The axis-of-rotation calculation unit 52 determines the sign of cos PSI by the following procedures.

(A) When $\sin^2 PSI=1$, $\cos PSI=0$.
(B) When $c \pm 0$, the sign of $\cos PSI$ is equal to the sign of c.
(C) When $\sin^2 PSI \pm 1$ and $c=0$, the sign of $\cos PSI$ is indeterminate.

S23: The axis-of-rotation calculation unit 52 determines the value of PSI from the calculated value of sin PSI and the sign of cos PSI. (For case (C) in S22 in which the sign of cos PSI is indeterminate, PSI and PSI+$\pi$ are both adopted as solutions.)

Also, the next expression transformed from expression (11) can be used in S20.

$$c = h \cos PSI \quad (12)$$
$$= \{x_1^2(y_2^2 - y_3^2) + x_2^2(y_3^2 - y_1^2) + x_3^2(y_1 - y_3)\}/$$
$$2\{x_1^2(y_2 - y_3) + x_2^2(y_3 - y_1) + x_3^2(y_1^2 - y_2^2)\}$$

The processes shown in FIG. 14 show only the case of expression (11).

Further, when the depression angle PSI is obtained from the two [2] values of sin PSI, there are two [2] solutions forming mirror image inversions, such as two [2] solutions represented by $\pm$ in expressions (5') and (8). These correspond to a case in which an object is looked down from an obliquely upward position and a case in which an object is looked up from an obliquely downward position. Consequently, an advance input from the known data input unit 50 of data on the relative position between the image input unit 41 and the object 40 enables only one [1] solution to be selected.

The known data input unit 50 may supply such data to either one of or both of the axis-of-rotation calculation unit 52 and the feature point position reconstruction unit 54 for the selection of one [1] solution.

Figure 15:
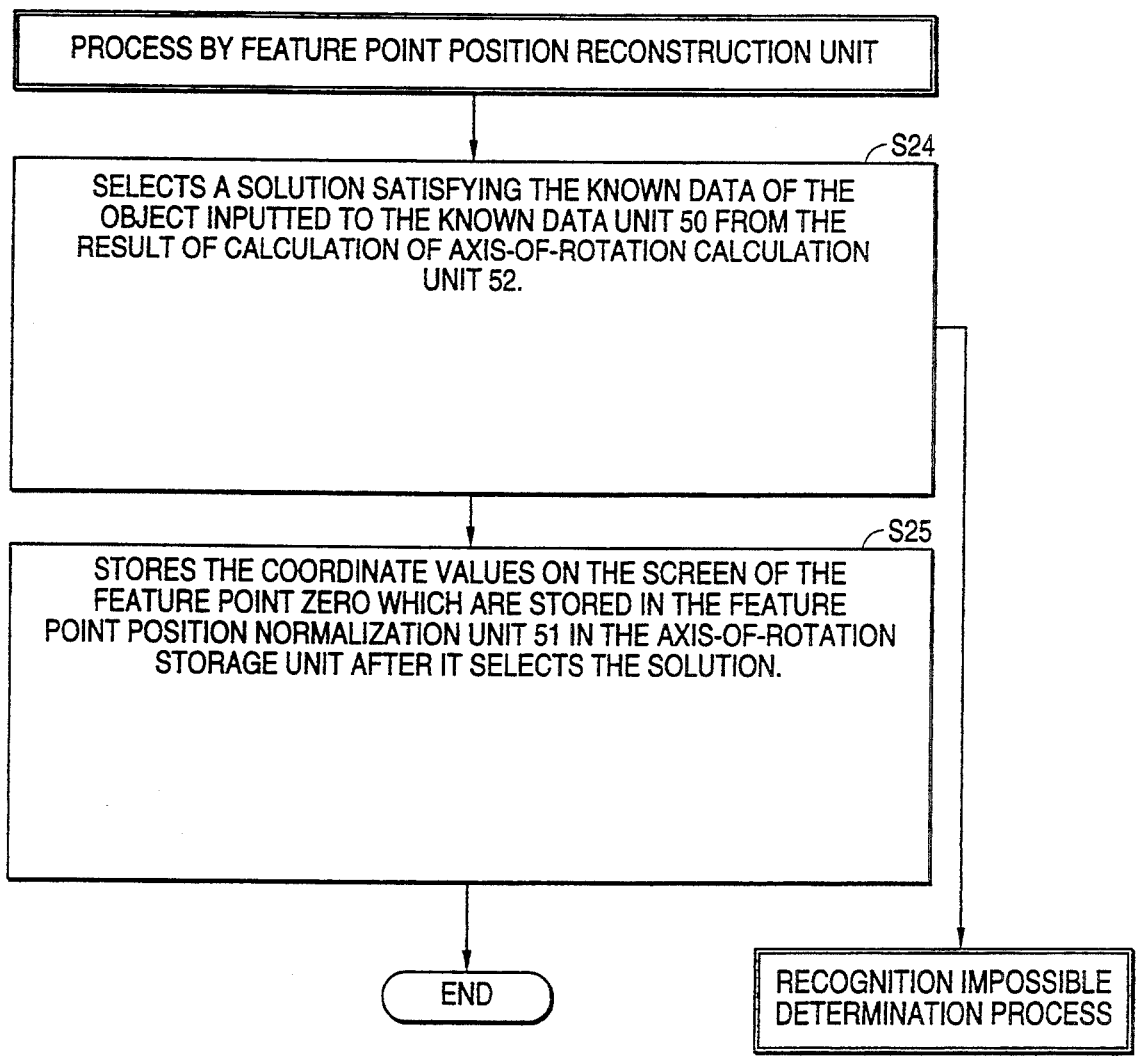
FIG. 15 is a flowchart of processes executed by a feature point position reconstruction unit for two [2] solutions forming mirror image inversions.

FIG. 15 is a flowchart of processes executed by a feature point position reconstruction unit for two [2] solutions forming mirror image inversions.

S24: The axis-of-rotation recognition unit 44 has the feature point position reconstruction unit 54 select a solution from the solutions obtained by the axis-of-rotation calculation unit 52 that satisfies the known data of the object 40 inputted in the known data input unit 50.

S25: If there is a solution that satisfies the known data, the axis-of-rotation recognition unit 44 has the feature point position reconstruction unit 54 store in axis-of-rotation storage unit 45 the selected solution and the on-screen coordinate value of feature point stored in the feature point position normalization unit 51.

If no solution satisfying known data can be selected found in S24, the axis-of-rotation recognition unit 44 has the recognition impossible determination unit 53 execute its process.

So far, the first embodiment has been discussed in detail, with an emphasis on the method for recognizing the depression angle PSI formed between the axis of rotation of a moving body and the Z axis, where the image plane of a television camera is the XY plane with its optical axis being the Z axis.

A Second Embodiment

A second embodiment is explained below in which the shape of a moving body, i.e. the coordinate values of feature points of an object, and the movement of a moving body, i.e. the rotation of an object around its axis of rotation, are recognized by using the result of recognizing the depression angle PSI.

The concept of an image input in the second embodiment is similar to that in the first embodiment shown in FIG. 5. Further, the second embodiment uses a method for calculating the depression angle PSI similar to the one in the first embodiment shown in FIGS. 6 and 7. As such, the operations of basic functional blocks of the second embodiment shown in FIG. 16 are explained by referring to FIGS. 5, 6 and 7.

Figure 16:
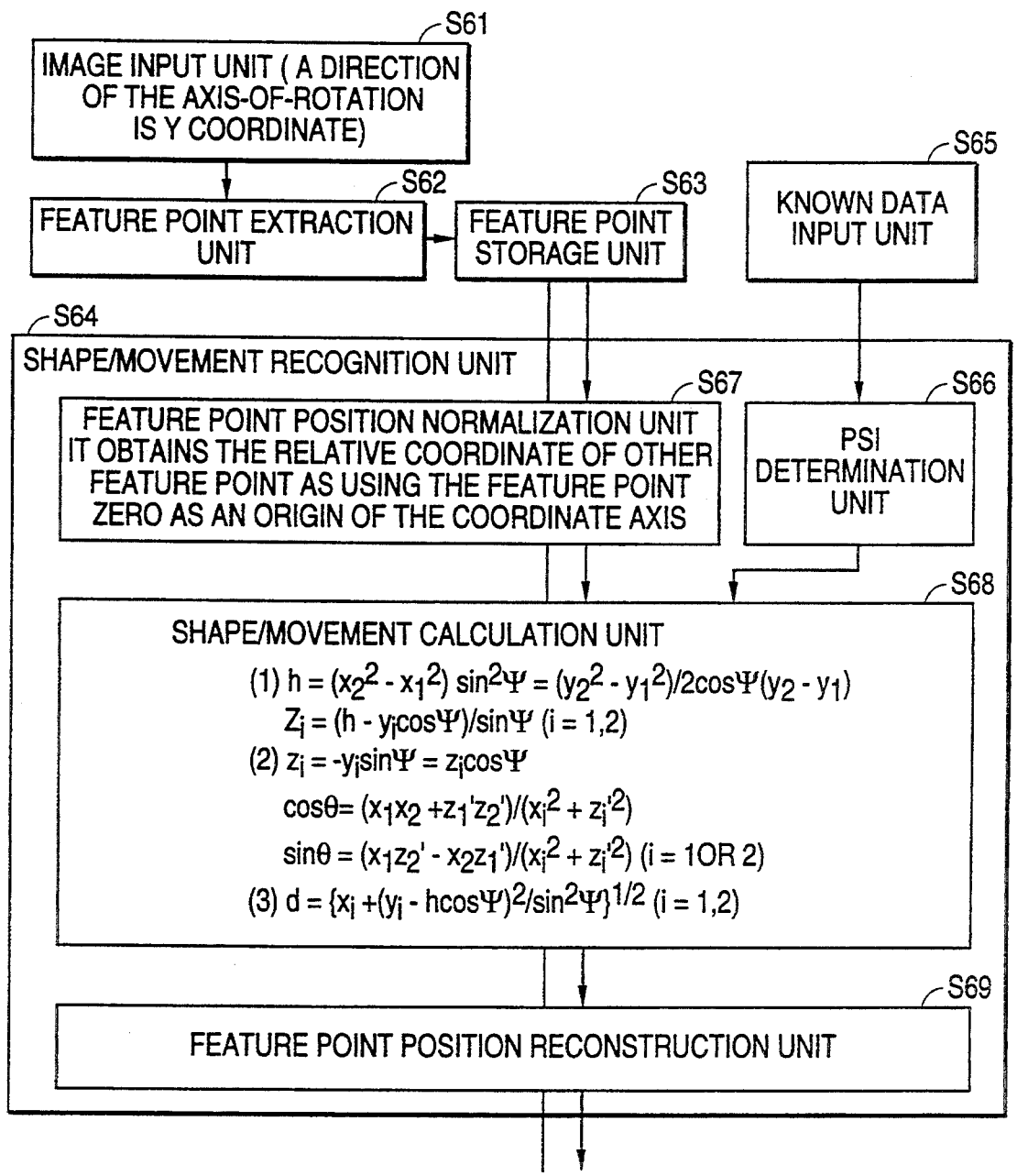
FIG. 16 is a block diagram showing a basic setup of a second embodiment.

Before discussing FIG. 16, the principle for recognizing the shape and movement of an object is explained first.

(1) Recognition of the shape of an object

A recognition of the movement and position of an object through observing the orthogonal projections of feature points requires at least two [2] feature points to be captured at two [2] instants in time.

(Shape Recognition 1)

In case of PSI=n $\pi$, where n is an integer, the observed values on the XY plane allow the movement and position of an object to be recognized. This will be described later in detail.

(Shape Recognition 2)

In case of PSI=$\pi/2$+n $\pi$, where n is an integer, although the shape of an object cannot be recognized, its rotation can be recognized.

(Shape Recognition 3)

In case of PSI$\pm$n $\pi$ and PSI$\pm\pi/2$+n $\pi$, where n is an integer, the coordinate value of feature point 1 at i-th instant in time is expressed as ($x_i$, $y_i$), and the Z coordinate value of feature point 1 is expressed as $z_i$, where i=1, 2.

As described earlier, the orthogonal projection of the $\alpha$ plane on the XY plane forms an ellipse, which is expressed as $$x^2+(y-h\cos PSI)^2/\sin^2 PSI=d^2 \quad (1)$$

When $y_1 \pm y_2$, $$h=\{(x_2^2-x_1^2)\sin^2 PSI+(y_2^2-y_1^2)\}/\{2\cos PSI(y_2-y_1)\} \quad (13)$$

$$z_i=(h-y_i \cos PSI)/\sin PSI \ (i=1, 2) \quad (14)$$

$$d=\{x_i^2+(y_i-h\cos PSI)^2/\sin^2 PSI\}^{\frac{1}{2}}(i=1, 2) \quad (15)$$

Expression (14) can be induced as follows.

Generally, when a feature point (x, y, z) is rotated around the X axis by $-PSI$ parallel to the YZ plane, the rotated point (x', y', z') is expressed as:

$$\begin{bmatrix} x' \\ y' \\ z' \end{bmatrix} = \begin{bmatrix} 1 & 0 & 0 \\ 0 & \cos(-PSI) & -\sin(-PSI) \\ 0 & \sin(-PSI) & \cos(-PSI) \end{bmatrix} \begin{bmatrix} x \\ y \\ z \end{bmatrix} \quad (16)$$

Therefore, $$y'=y \cos PSI + z \sin PSI$$

Because y'=h, if sin PSI$\pm$0, $$z=(h-y \cos PSI)/\sin PSI$$

This is transformed into $$z_i=(h-y \cos PSI)/\sin PSI \ (i=1, 2)$$

It is noted here that the rotation of a feature point by $-PSI$ around the X axis is equivalent to rotating the coordinate system by PSI. However, because the latter causes a confusion that the benchmark itself moves, the earlier construction is adopted.

Accordingly, as long as $y_1 \pm y_2$, feature point $z_i$ is determined, thereby enabling the shape of an object to be recognized.

However, when $y_1 = y_2$, because the orthogonal projections of a feature point at two [2] instants in time on the XY plane degenerate into the orthogonal projection of a feature point at one [1] instant in time, the depth (Z coordinate value) of the object cannot be obtained in theory.

The above relation is summarized as a theorem.

[Theorem 3]

(a) When $PSI = n\pi$ (where n is an integer), the observed value from a direction perpendicular to the axis of rotation enables the shape to be determined. Its detail will be described later.

(b) When $PSI = \pi/2 + n\pi$ (where n is an integer), the shape cannot be recognized in principle regardless of feature points and the number of observations.

(c) When $PSI \pm n\pi$ and $PSI \pm \pi/2 + n\pi$ (where n is an integer), if $y_1 \pm y_2$, observations of two [2] feature points at two [2] instants in time are sufficient to allow the shape to be recognized S according to expressions (1) and (14). However, if $y_1 = y_2$, observations of two [2] feature points at two [2] instants in time are not sufficient to allow the shape to be recognized.

(2) On recognition of the movement of an object

The movement (rotation) of an object can be obtained as follows.

A point $(x', y', z')$ is defined as representing a point obtained by rotating a point $(x, y, z)$ around the X axis by $-PSI$. The expression (16) states the mathematical relation between point $(x, y, z)$ and $(x', y', z')$ Defining $\theta$ as the angle of rotation of an object from a first instant in time to a second instant in time, rotation recognitions are explained for respective cases for specified depression angle PSI.

(Rotation Recognition 1)

When $PSI = \pi/2 + n\pi$, where n is an integer, because a feature point rotates around the Z axis, expressions (17a) and (17b) allow the angle of rotation $\theta$ to be obtained.

$$\cos\theta = (x_1x_2 + y_1y_2)/(x_i^2 + y_i^2)(i=1, 2) \quad (17a)$$

$$\sin\theta = (x_1y_2 - x_2y_1)/(x_i^2 + y_i^2)(i=1, 2) \quad (17b)$$

(Rotation Recognition 2)

When $PSI \pm n\pi$ and $PSI \pm \pi/2 + n\pi$, where n is an integer, if $y_1 \pm y_2$, $z_i' = -y_i \sin PSI + z_i \cos PSI$, expressions (18a) and (18b) allow the angle of rotation $\theta$ to be obtained.

$$\cos\theta = (x_1x_2 + z_1'z_2')/(x_i^2 + z_i'^2)(i=1, 2) \quad (18a)$$

$$\sin\theta = (x_1z_2' - x_2z_1')/(x_i^2 + z_i'^2)(i=1, 2) \quad (17a)$$

The above relation can be summarized as theorem 4.

[Theorem 4]

(a) When $PSI = \pi/2 + n\pi$, where n is an integer, the following expressions determine the angle of rotation $\theta$.

$$\cos\theta = (x_1x_2 + y_1y_2)/(x_i^2 + y_i^2)(i=1, 2)$$

$$\sin\theta = (x_1y_2 - x_2y_1)/(x_i^2 + y_i^2)(i=1, 2)$$

(b) When $PSI \pm n\pi$ and $PSI \pm \pi/2 + n\pi$, where n is an integer, the angle of rotation $\theta$ cannot be obtained, if $y_1 = y_2$.

However, the angle of rotation $\theta$ can be obtained, if $y_1 \pm y_2$, $$z_i' = -y_i \sin PSI + z_i \cos PSI$$

$$\cos\theta = (x_1x_2 + z_1'z_2')/(x_i^2 + z_i'^2)(i=2, 3)$$

$$\sin\theta = (x_1z_2' - x_2z_1')/(x_i^2 + z_i'^2)(i=1, 2)$$

(Rotation Recognition 3)

When Z coordinate values of three [3] feature points other than the coordinate origin at two [2] instants in time are known, if the determinant of the matrix formed by the coordinate values of the three [3] feature points is not zero [0], the following mathematical expression allows the matrix expressing the rotation of a feature point from a first instant in time to a second instant in time to be obtained.

$$R = \begin{bmatrix} x_{21} & x_{22} & x_{23} \\ y_{21} & y_{22} & y_{23} \\ z_{21} & z_{22} & z_{23} \end{bmatrix} \begin{bmatrix} x_{11} & x_{12} & x_{13} \\ y_{11} & y_{12} & y_{13} \\ z_{11} & z_{12} & z_{13} \end{bmatrix}^{-1} \quad (19)$$

where $$\begin{bmatrix} x_{ij} \\ y_{ij} \\ z_{ij} \end{bmatrix}$$

represents the coordinate value of a j-th feature point at an i-th instant in time. ($i = 1, 2; j = 1, 2, 3$)

The second embodiment is such that one [1] image input unit obtains the movement and position of an object from the coordinate values of plural feature points captured at plural instants in time, based on theorems 3 and 4.

FIG. 16 is a block diagram showing the basic setup of a second embodiment.

61 is an image input unit whose image capturing plane is defined as XY plane and the X axis being set parallel to the plane on which the object moves. (That is, the orthogonal projection of the axis of rotation of a feature point points the Y axis direction.)

62 is a feature point extraction unit. 63 is a feature point storage unit. 64 is a shape/movement recognition unit for recognizing the position and movement of a feature point. 65 is a known data input unit for inputting the known data of an object.

66 is a PSI determination unit for determining the size of the depression angle PSI, which can be inputted through a sensor detection or obtained by the two-dimensional observed values on the image capturing plane.

67 is a feature point position normalization unit for normalizing a feature point position by calculating the relative coordinate values of other feature points when one [1] of plural feature points is set as the coordinate origin.

68 is a shape/movement calculation unit for calculating the rotation and position of a feature point from the two-dimensional observed values $(x_i, y_i)$ $(i=1, 2)$ of two [2] feature points captured at two [2] instants in time, as well as for calculating the rotation only from the observed values of three [3] feature points (except the coordinate origin) at two [2] instants in time when the shape of an object is already known.

69 is a feature point position reconstruction unit for reconstructing the position and movement of a feature point in a three-dimensional coordinate system, based on the actual on-screen coordinate value of the feature point made as the origin in the process of the feature point position normalization unit 67 and the relative movements and positions of other feature points obtained by the shape/movement calculation unit 68.

The operations of the basic setup shown in FIG. 16 is explained below.

The image input unit 61 receives the image of an object. The feature point extraction unit 62 extracts a feature point from an inputted image. The feature point storage unit 63 stores the on-screen coordinate values of an extracted feature point.

The known data input unit 65 retains the depression angle PSI formed as an angle between the axis of rotation of an object e.g. obtained by a sensor (not shown) and the Y axis of the image input unit 61. (The depression angle PSI can also be obtained as the two-dimensional observed value of a feature point on the image capturing plane.)

The PSI determination unit 66 determines the magnitude of the depression angle PSI based on either the PSI value inputted from the known data input unit 65 or the coordinate value of a feature point on the XY plane normalized by the feature point position normalization unit 67.

The feature point position normalization unit 67 obtains the relative coordinate positions of other feature points by setting feature point 0 as the coordinate origin.

(1) In case of PSI$\pm$n $\pi$ and PSI$\pm\pi/2$+n $\pi$, where n is an integer, the coordinate value of a feature point observed at an i-th instant in time is expressed as $(x_i, y_i)$, and the Z coordinate value of feature point 1 is expressed as $z_i$, where $i=1, 2$.

The shape/movement calculation unit 68 calculates the Z coordinate value of a feature point by expressions (13) and (14).

$$h=\{(x_2^2-x_1^2)\sin^2 PSI+(y_2^2-y_1^2)\}/\{2\cos PSI(y_2-y_1)\} \quad (13)$$

$$z_i=(h-y_i\cos PSI)^2/\sin PSI(i=1, 2) \quad (14)$$

(2) The shape/movement calculation unit 68 calculates the angle of rotation $\theta$.

$$\cos\theta=(x_1x_2+z_1'z_2')/(x_i^2+z_i'^2)(i=1, 2) \quad (18a)$$

$$\sin\theta=(x_1z_2'-x_2z_1')/(x_i^2+z_i'^2)(i=1, 2) \quad (18b)$$

(3) Further, the shape/movement calculation unit 68 calculates distance d.

$$d=\{x_i^2+(y_i-h\cos PSI)^2/\sin^2 PSI\}^{\frac{1}{2}}(i=1, 2) \quad (15)$$

As well, although this is not shown, the shape/movement recognition unit 64 obtains only the angle of rotation $\theta$ by using expressions (17a) and (17b) when PSI=$\pi/2$+n $\pi$, where n is an integer.

In addition, when PSI=n $\pi$, the shape/movement recognition unit 64 may recognize the shape and movement of an object by a method whose detail is described later.

Alternatively, although this is not shown, the shape/movement recognition unit 64 may use a method different than the one illustrated in this embodiment, when the shape is known and the determinant of the matrix formed by the observed values is not zero [0], the angle of rotation K is obtained by expression (19). The feature point position reconstruction unit 69 reconstructs the actual three-dimensional movement and position of each feature point from the position data of feature point 0 on the image capturing plane, which is set as the coordinate origin, and the relative coordinate values of other feature points.

Figure 17:
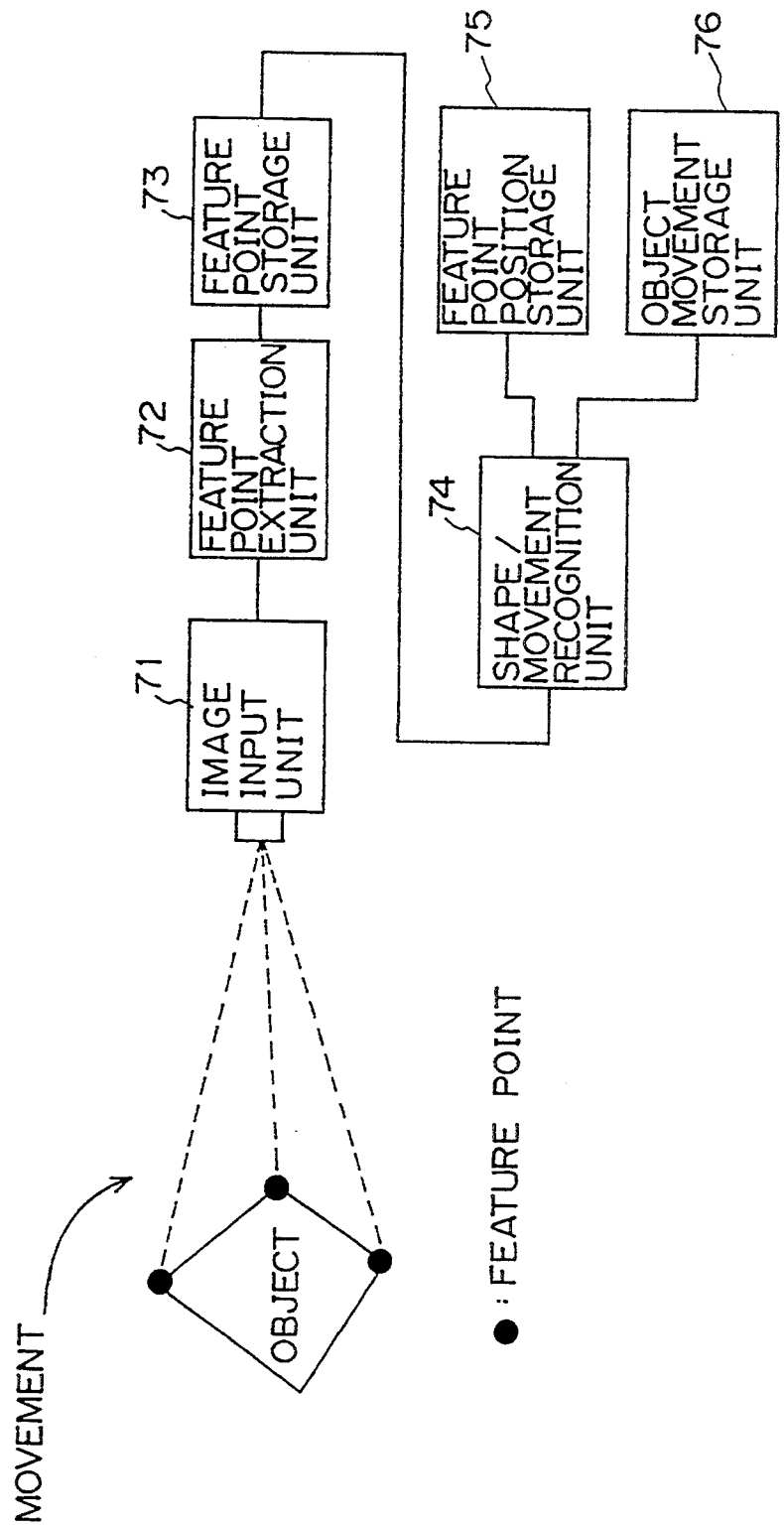
FIG. 17 shows a configuration of a moving body recognition apparatus pursuant to the second embodiment.

FIG. 17 shows a configuration of a moving body recognition apparatus pursuant to the second embodiment.

70 is an object whose black blot indicates a feature point. 71 is an image input unit. 72 is a feature point extraction unit. 73 is a feature point storage unit. 74 is a shape/movement recognition unit. 75 is a feature point position storage unit for storing the position of a feature point obtained by the shape/movement recognition unit 74. 76 is an object movement storage unit for storing the movement of a feature point obtained by the shape/movement recognition unit 74.

Figure 18:
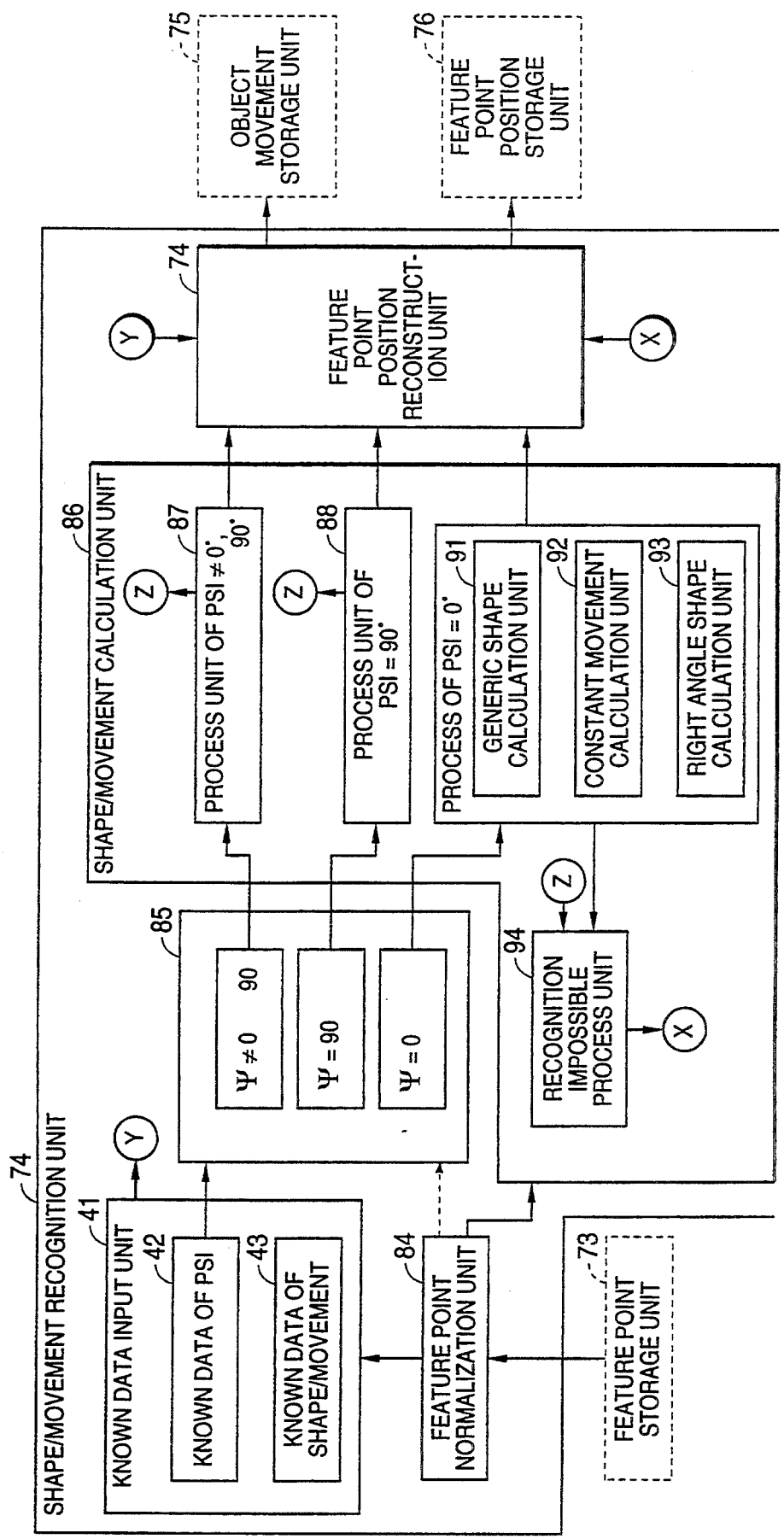
FIG. 18 shows a configuration of a shape/movement recognition unit pursuant to the second embodiment.

FIG. 18 shows a configuration of a shape/movement recognition unit pursuant to the second embodiment.

More specifically, FIG. 18 shows in detail the shape/movement recognition unit 74 shown in FIG. 17. The parts shown in FIG. 18 which are the same as those shown in FIG. 17 have the same numbers.

81 is a known data input unit. 82 is known data on the depression angle PSI, which are detected in advance e.g. by a sensor or obtained by a two-dimensional observed value of a normalized feature point on the image capturing screen. 83 is known data on the shape and movement, which designate a particular shape of an object beforehand, such as a rectangular shape of a roadside curb. 84 is a feature point position normalization unit.

85 is a PSI determination unit for determining whether PSI$\pm$n $\pi$ and PSI$\pm\pi/2$+n $\pi$, PSI=n $\pi$, or PSI=$\pi/2$+n $\pi$, where n is an integer. When known data 82 does not specify the depression angle PSI, the PSI determination unit 85 calculates it from the normalized coordinate value of a feature point.

86 is a shape/movement calculation unit for calculating the shape and the movement of a normalized feature point. The shape/movement calculation unit 86 has three [3] subprocess units, 87, 88 and 90. 87 is a first subprocess unit for a case of PSI$\pm$n $\pi$ and PSI=$\pi/2$+n $\pi$. 88 is a second subprocess unit for a case of PSI=$\pi/2$+n $\pi$. 90 is a third subprocess unit for a case of PSI=n $\pi$. 91 is a generic shape calculation unit for calculating the shape and movement of an object, when the object has a generic shape and PSI=n $\pi$. 92 is a constant movement calculation unit for calculating the shape and movement, when the rotation of an object is constant and PSI=n $\pi$. 93 is a right angle shape calculation unit for calculating the movement and shape of an object having a right angle. 94 is a recognition impossible determination unit. The meanings of the generic shape, the constant movement and the right angle shape will be described later.

89 is a feature point position reconstruction unit.

Figure 19:
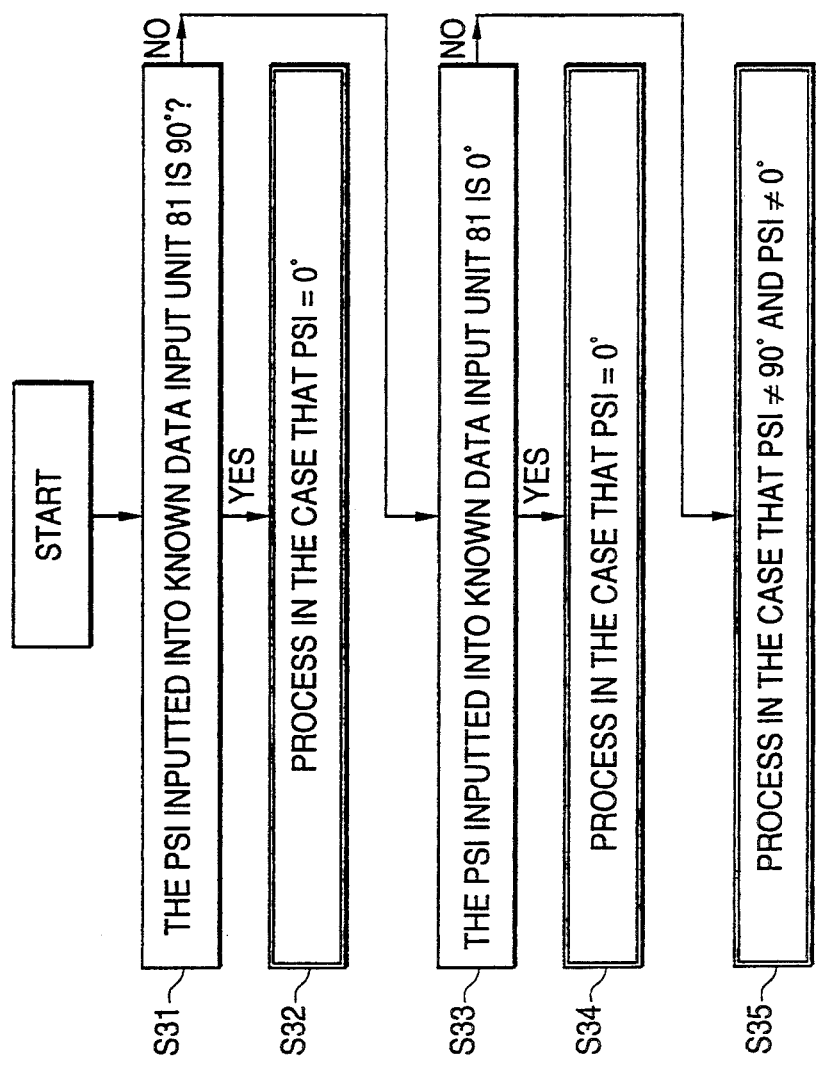
FIG. 19 is a first flowchart of processes executed in the second embodiment.

FIG. 19 is a first flowchart of processes executed in the second embodiment.

Figure 20:
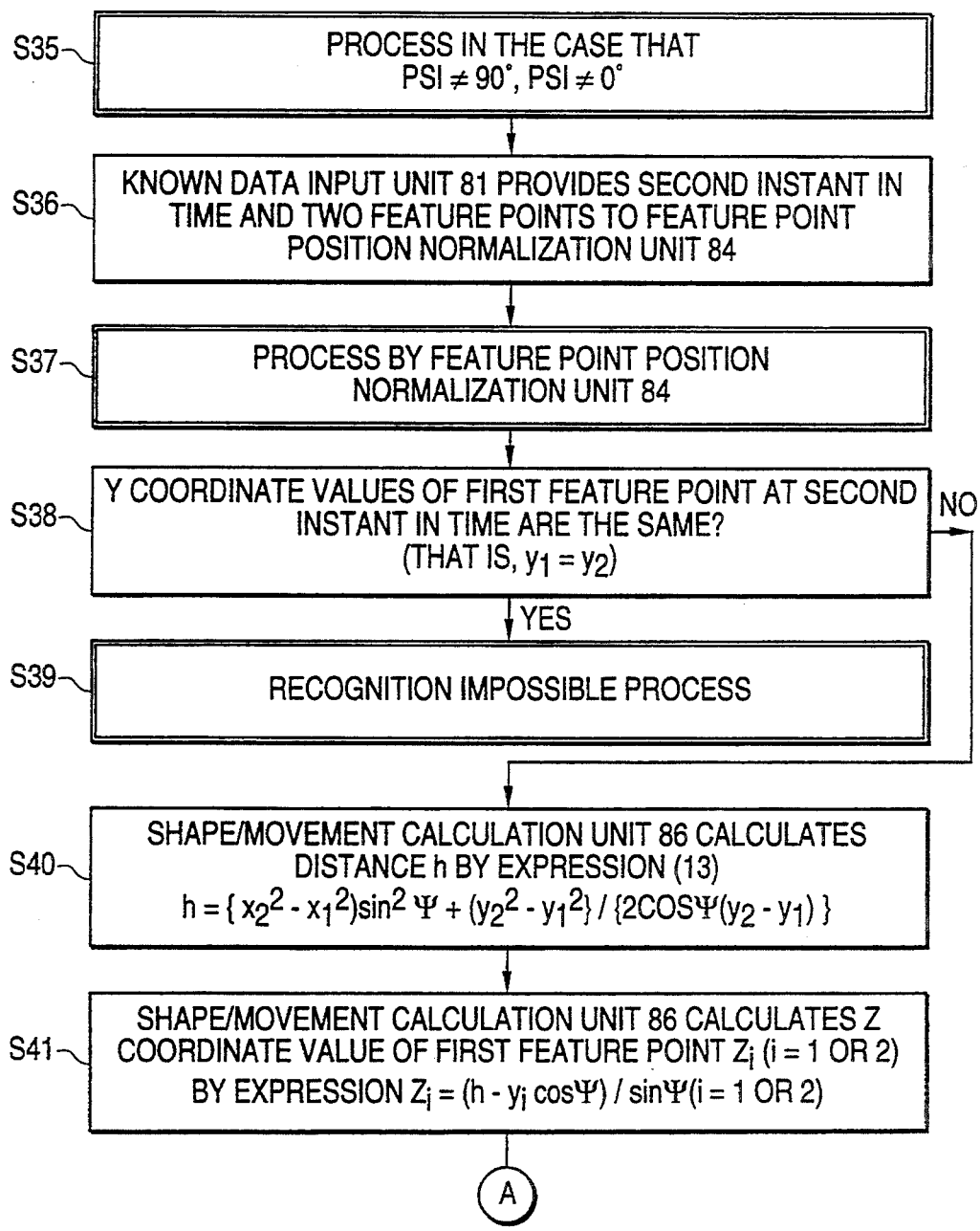
FIG. 20 is a second flowchart of processes executed in the second embodiment.

FIG. 20 is a second flowchart of processes executed in the second embodiment.

Figure 21:
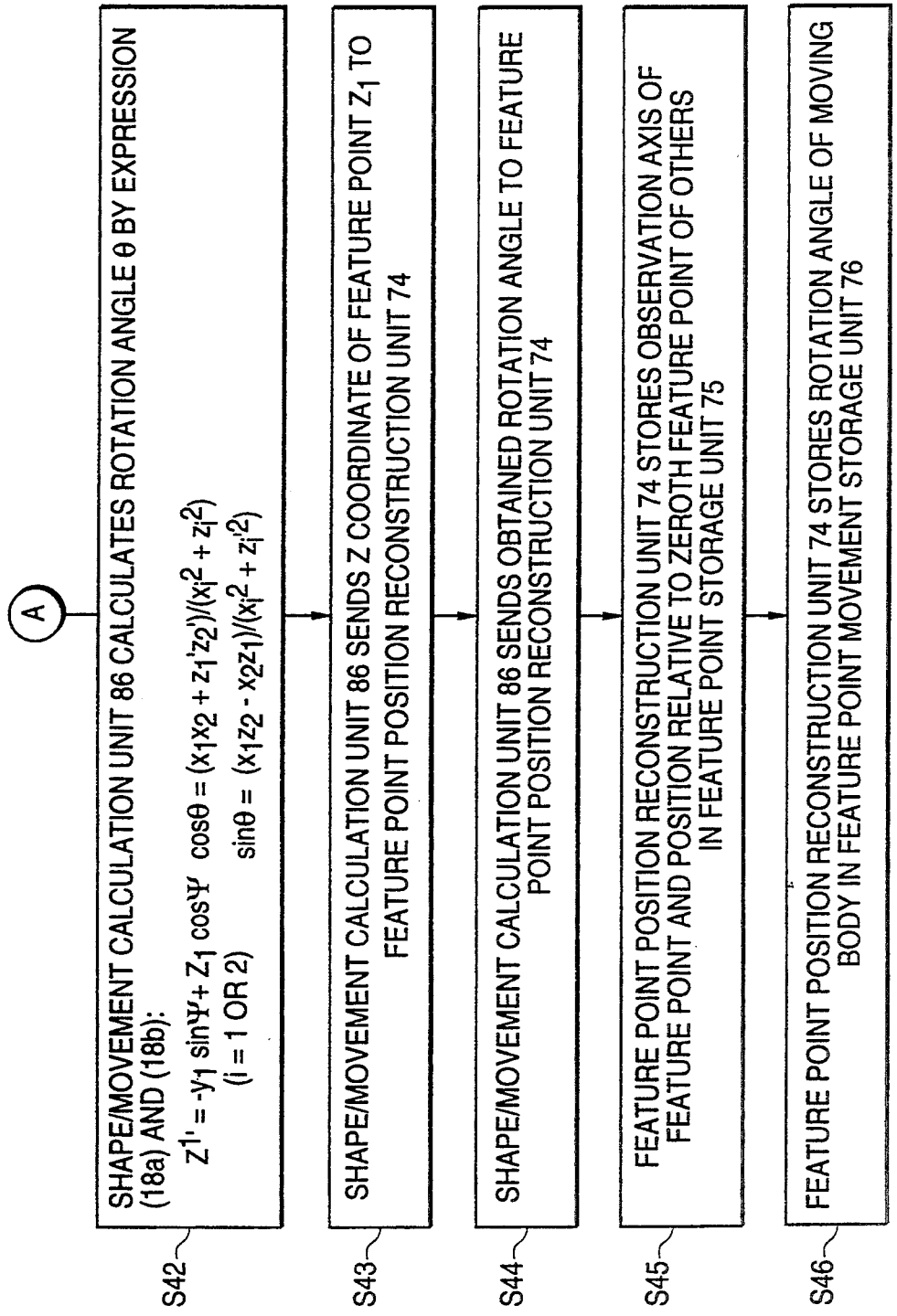
FIG. 21 is a third flowchart of processes executed in the second embodiment.

FIG. 21 is a third flowchart of processes executed in the second embodiment.

Figure 22:
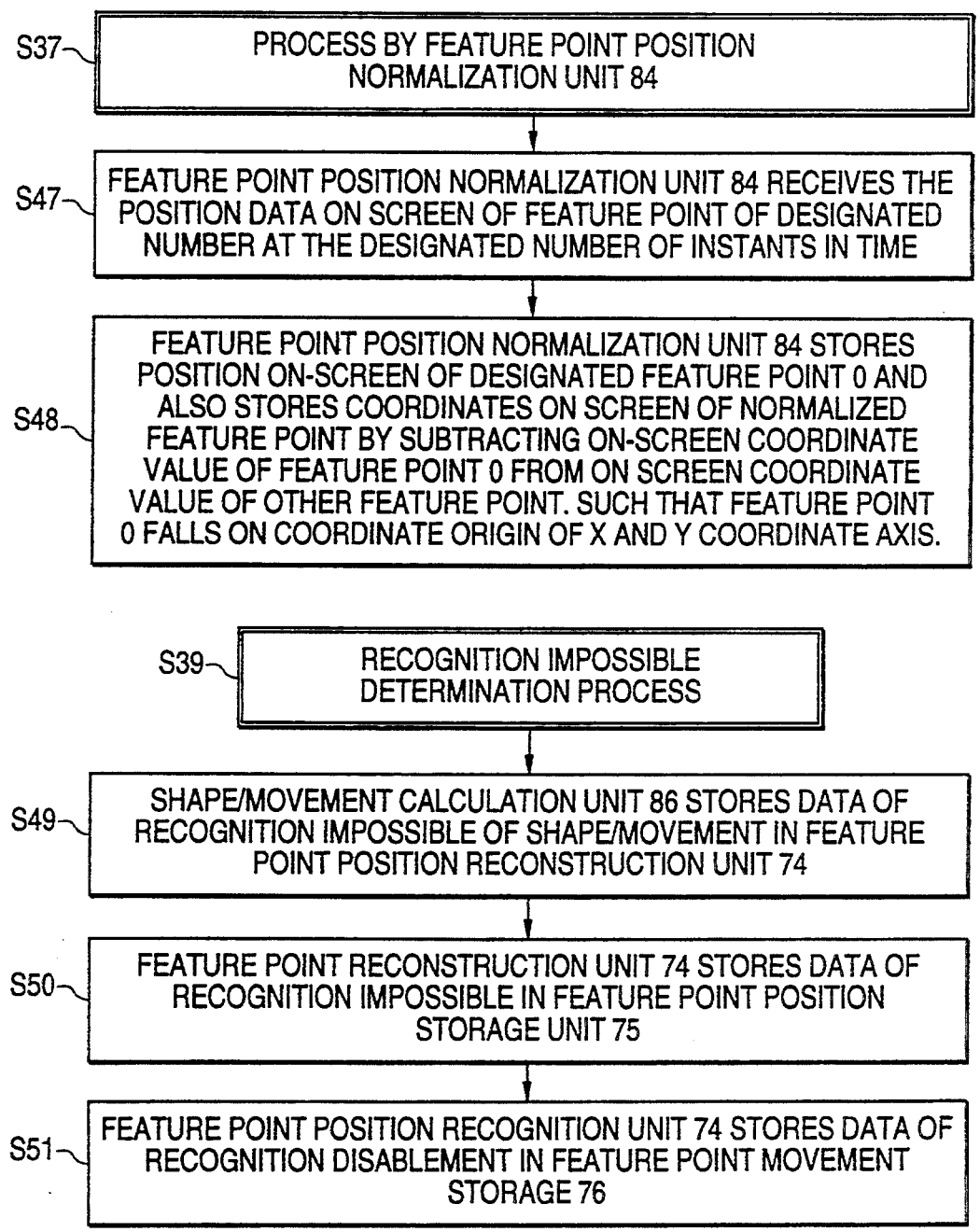
FIG. 22 is a fourth flowchart of processes executed in the second embodiment.

FIG. 22 is a fourth flowchart of processes executed in the second embodiment.

Figure 23:
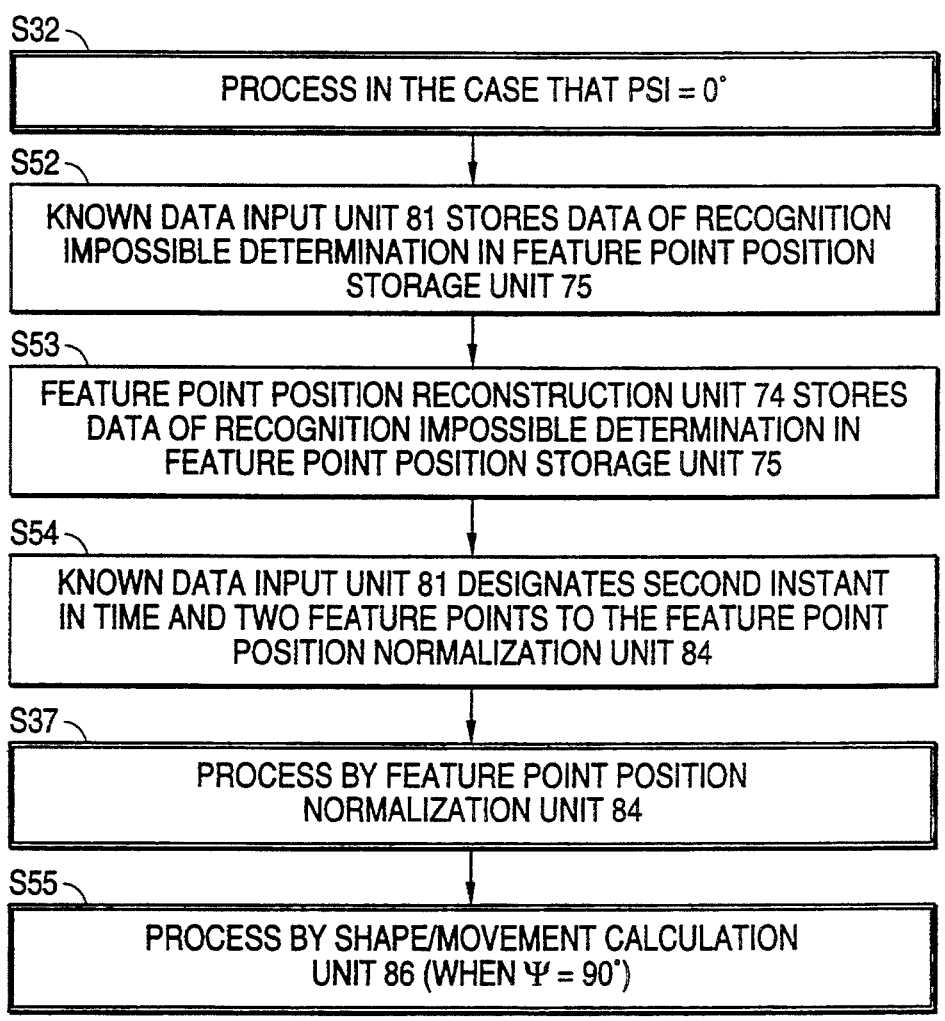
FIG. 23 is a fifth flowchart of processes executed in the second embodiment.

FIG. 23 is a fifth flowchart of processes executed in the second embodiment.

Figure 24:
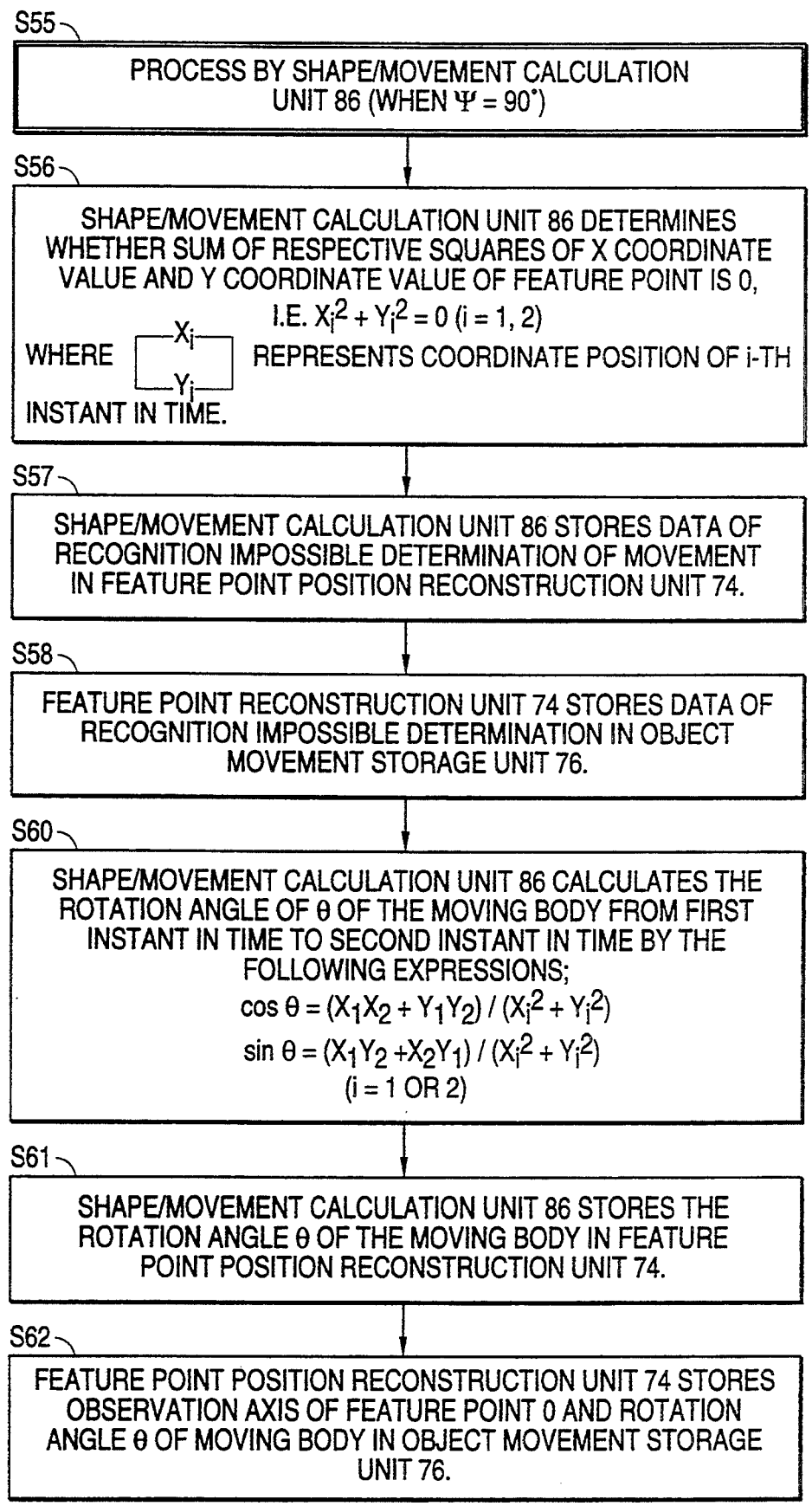
FIG. 24 is a sixth flowchart of processes executed in the second embodiment.

FIG. 24 is a sixth flowchart of processes executed in the second embodiment.

Figure 25:
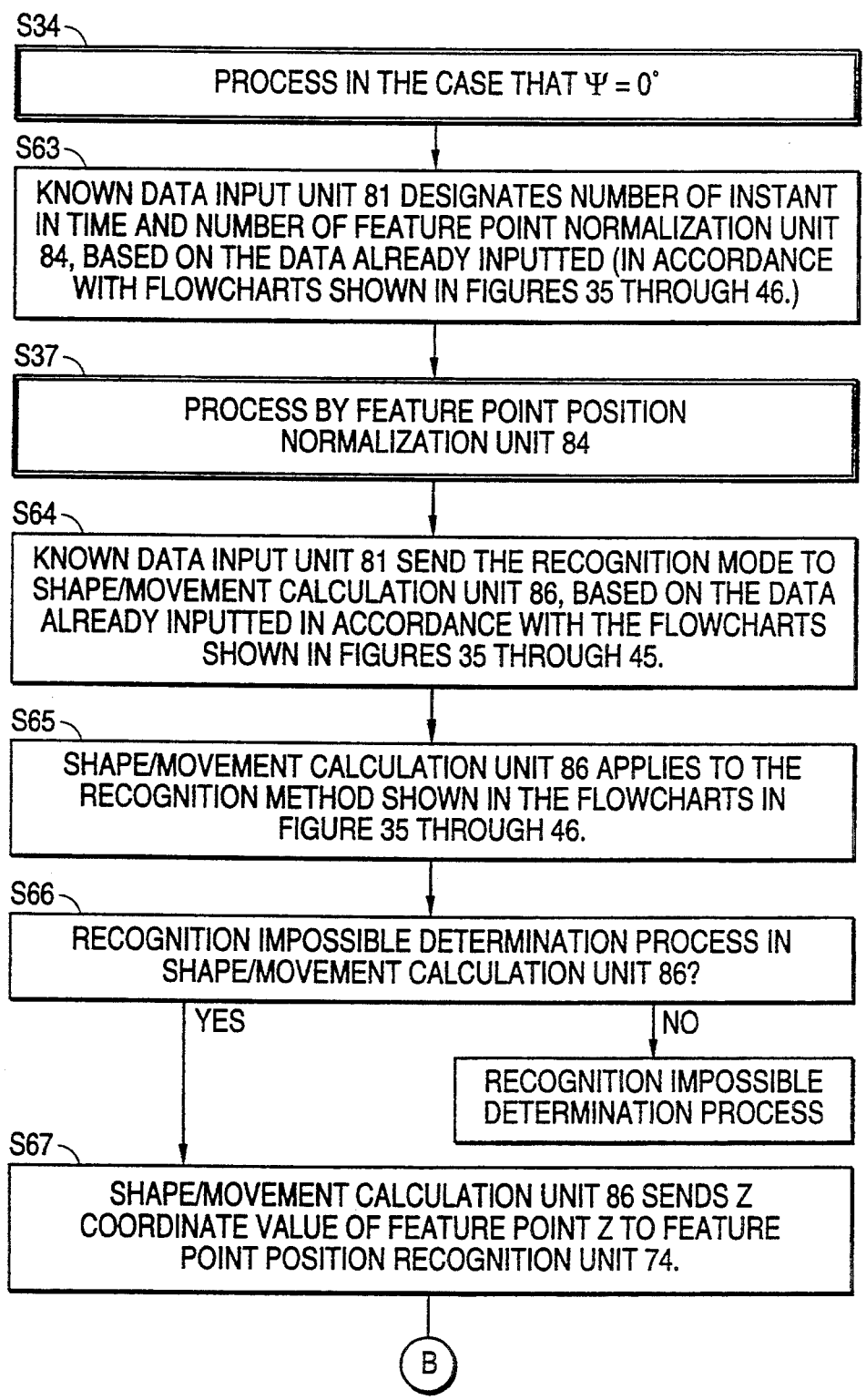
FIG. 25 is a seventh flowchart of processes executed in the second embodiment.

FIG. 25 is a seventh flowchart of processes executed in the second embodiment.

Figure 26:
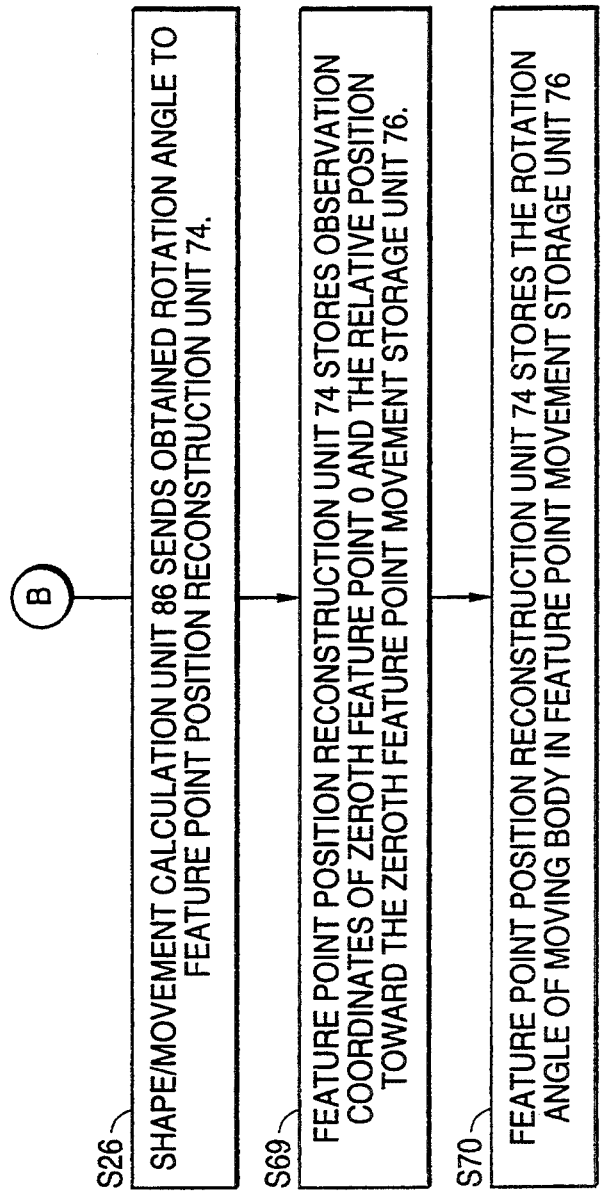
FIG. 26 is an eighth flowchart of processes executed in the second embodiment.

FIG. 26 is an eighth flowchart of processes executed in the second embodiment.

More specifically, FIGS. 19 through 26 illustrate operations of the shape/movement recognition unit 74 shown in FIG. 18, which is referred to in the description of each step.

[Processes of the PSI determination unit 85]

S31: The PSI determination unit 85 determines whether or not the depression angle PSI inputted into the known data unit 81 is $\pi/2+n\ \pi$. S33 is invoked for a negative determination, and S32 (representing a process for a case of PSI$=\pi/2+n\ \pi$) is invoked for a positive determination.

S33: The PSI determination unit 85 determines whether or not the depression angle PSI inputted into the known data unit 81 is n $\pi$. S34 (representing the initiation of processes shown in FIG. 25 for a case of PSI$=$n $\pi$) is invoked for a positive determination.

S35 (representing the initiation of processes shown in FIG. 20 for a case of PSI$\pm\pi/2+$n $\pi$ and PSI$\pm$n $\pi$) is invoked for a negative determination.

[Processes of the first subprocess unit 87 for a case of PSI$\pm$n $\pi$ and PSI$\pm\pi/2+$n $\pi$]

S36: The known data input unit 81 specifies for the feature point position normalization unit 84 two [2] instants in time at which two [2] feature points are captured.

S37: The feature position normalization unit 84 executes its process, which is explained by referring to FIG. 22.

S47: The feature position normalization unit 84 receives from the feature position storage unit 73 the on-screen position data of the specified number of feature points captured at specified number of instants in time.

S48: The feature position normalization unit 84 stores the on-screen position of a particular feature point (feature point 0) to be set at the coordinate origin of the X and Y axes and the normalized on-screen position of the other feature point (feature point 1) by subtracting the on-screen position of feature point 0 from the on-screen position of feature point 1.

The explanation of the process of the first subprocess unit 87 for a case of PSI$\pm$n $\pi$ and PSI$\pm\pi/2+$n $\pi$ continues by returning back to FIG. 20.

S38: The first subprocess unit 87 determines whether or not the Y coordinate values of feature point 1 captured at two [2] instants in time are the same.

S40 is invoked for a negative determination, and S39 for a recognition impossible process is invoked for a positive determination. Although S38 can be executed before S37, FIG. 20 shows that S38 is executed after S37 in order to confirm with the configuration shown in FIG. 18.

S40: If it is determined in S38 that $y_1\pm y_2$, the shape/movement calculation unit 86 has the first subprocess unit 87 for a case of PSI$\pm$n $\pi$ and PSI$\pm\pi/2+$n $\pi$ calculate the distance h by expression (13).

S41: Then, the shape/movement calculation unit 86 has the first subprocess unit 87 for a case of PSI$\pm$n $\pi$ and PSI$=\pi/2+$n $\pi$ calculate the z coordinate values $z_i(i=1, 2)$ of feature point 1 by expression (14).

S42: Further, the shape/movement calculation unit 86 has the first subprocess unit 87 for a case of PSI$\pm$n $\pi$ and PSI$\pm\pi/2+$n$\pi$ calculate the angle of rotation $\theta$ by expressions (18a) and (18b).

S43: Besides, the shape/movement calculation unit 86 has the first subprocess unit 87 for a case of PSI$\pm$n $\pi$ and PSI$\pm\pi/2+$n $\pi$ send the calculated z coordinate values $z_i(i=1, 2)$ of feature point to the feature point position reconstruction unit 89.

S44: In addition, the shape/movement calculation unit 86 has the first subprocess unit 87 for a case of PSI $\pm$n $\pi$ and PSI$\pm\pi/2+$n $\pi$ send the calculated angle of rotation $\theta$ to the feature point position reconstruction unit 89.

S45: The feature point position reconstruction unit 89 stores in the feature point position storage unit 75 the observed coordinate value of feature point 0 and the relative coordinate position of other feature points (e.g. feature point 1) against feature point 0.

S46: The feature point position reconstruction unit 89 stores in the object movement storage unit 76 the angle of rotation of the moving body.

Explained below with reference to FIG. 22 is the recognition impossible process for a case in which the Y coordinate values of feature point captured at two [2] instants in time are the same.

[Processes of the recognition impossible determination unit 94]

S49: The shape/movement calculation unit 86 has the recognition impossible determination unit 94 store in the feature point position reconstruction unit 89 information that the shape and movement cannot be recognized.

S50: The feature point position reconstruction unit 89 stores in the feature point position storage unit 75 information that the shape and movement cannot be recognized.

S51: The feature point position reconstruction unit 89 stores in the object movement storage unit 76 information that the shape and movement cannot be recognized.

S32 (representing the initiation of processes shown in FIG. 23 for a case of PSI$=\pi/2+$n $\pi$) is invoked for a positive determination in S31 shown in FIG. 19.

[Processes of the second subprocess unit 88 for a case of PSI$=\pi/2+$n $\pi$]

S52: The known data input unit 81 stores in the feature point position reconstruction unit 89 information that the shape cannot be recognized.

S53: The feature point position reconstruction unit 89 stores in the feature point position storage unit 75 information that the shape cannot be recognized.

S54: The known data input unit 81 specifies for the feature point position normalization unit 84 two [2] instants in time at which two [2] feature points are captured.

The feature position normalization unit 84 executes its processes shown as S37, S47 and S48 in FIG. 22, between S54 and S55.

S55: The shape/movement calculation unit 86 has the second subprocess unit 88 initiate processes shown in FIG. 24 for a case of PSI=$\pi/2$+n $\pi$.

[Processes of the shape/movement calculation unit 86 for a case of PSI=$\pi/2$+n $\pi$]

S56: The shape/movement calculation unit 86 determines whether or not the sum of the respective squares of the X and Y coordinate values is zero [0]. S60 is invoked for a negative determination, and S57 is invoked for a positive determination.

S57: On determining that the sum of the respective squares of the X and Y coordinate values is zero [0] in S56, the shape/movement determination unit 86 has the recognition impossible determination unit 94 store in the feature point position reconstruction unit 89 information that the movement cannot be recognized.

S58: The feature point position reconstruction unit 89 stores in the object movement storage unit 76 information that the movement cannot be recognized.

S60: On determining that the sum of the respective squares of the X and Y coordinate values is zero [0] in S56, the shape/movement determination unit 86 has the second subprocess unit 88 for a case of PSI=$\pi/2$+n $\pi$ calculate the angle of rotation $\theta$ of the moving body (feature point 1) from a first instant in time to a second instant in time by expressions (17a) and (17b).

S61: The shape/movement determination unit 86 has the second subprocess unit 88 for a case of PSI=$\pi/2$+n $\pi$ store in the feature point position reconstruction unit 74 the angle of rotation $\theta$ of the moving body (feature point) from the first instant in time to the second instant in time.

S62: The shape/movement determination unit 86 has the feature point position reconstruction unit 89 store in the object movement storage unit 76 the observed coordinate value of feature point the angle of rotation $\theta$ of the moving body (feature point) from the first instant in time to the second instant in time.

S34 (representing the initiation of processes shown in FIGS. 25 and 26 for a case of PSI=n $\pi$) is invoked for a positive determination in S33 shown in FIG. 19.

[Processes of the third subprocess unit 91 for a case of PSI=n $\pi$]

FIGS. 27 through 33 illustrate a method of shape/movement recognition for processes in which PSI=n $\pi$, and FIGS. 35 through 46 illustrate the flows of its recognition procedure.

S63: The known data input unit 81 specifies for the feature point position normalization unit 84 necessary numbers of instants in time and feature points, based on known data according to FIG. 35 through 46.

The feature position normalization unit 84 executes its processes shown as S37, S47 and S48 in FIG. 22, between S63 and S64.

S64: Based on known data and according to the flows shown in FIG. 35 through 46, the known data input unit 81 notifies the shape/movement calculation unit 86 of a recognition mode, thereby instructing different processes for respective cases of a generic shape, a constant movement (rotation) and a right angle shape.

Here, two [2] pieces of relevant information of the known data input unit 81 are (A) the object has a constant movement (rotation), and (B) the object has a right angle shape. Based on the presence or absence of the above pieces of information (A) and (B), the following operations are performed in S63 and S64.

S63: The known data input unit 81 specifies for the feature point position normalization unit 84 the following numbers of instants in time and feature points.

When piece of information (A) is given, three [3] instants in time and two [2] feature points are necessary.

When piece of information (B) is given, two [2] instants in time and three [3] feature points are necessary.

When neither piece of information (A) nor piece of information (B) is given, three [3] instants in time and three [3] feature points are necessary.

S64: The known data input unit 81 notifies the shape/movement calculation unit 86 of the following recognition mode.

When piece of information (A) is given, a constant movement (rotation) recognition mode is specified.

When piece of information (B) is given, a right angle shape is specified.

When neither piece of information (A) nor piece of information (B) is given, a generic shape mode is specified.

33/154

S65: The shape/movement calculation unit 86 uses the recognition procedures shown in FIGS. 35 through 46.

S66: The shape/movement calculation unit 86 has the third subprocess unit 90 for a case of PSI=n $\pi$ determine the possibility of recognizing the shape and movement of a feature point. (There are cases in which a shape/movement recognition is deemed to be impossible in a process of calculating the shape and/or movement, when the flows of recognition procedure shown in FIGS. 35 through 46 are followed.)

If a recognition is determined to be impossible, the recognition impossible process shown in FIG. 22 is invoked, otherwise S67 is invoked.

33/154 middle

S67: The shape/movement calculation unit 86 has the third subprocess unit 90 for a case of PSI=n $\pi$ store in the feature point position reconstruction unit 89 the Z coordinate values z of feature points.

S68: The shape/movement calculation unit 86 has the third subprocess unit 90 for a case of PSI=n $\pi$ send to the feature point position reconstruction unit 89 the calculated angle of rotation $\theta$.

S69: The feature point position reconstruction unit 89 stores in the feature point position storage unit 75 the observed coordinate value of feature point 0 and the relative coordinate position of other feature points (e.g. feature point) against feature point 0.

S70: The feature point position reconstruction unit 89 stores in the object movement storage unit 76 the angle of rotation of the moving body.

FIGS. 27 through 33 illustrate a method of recognizing a moving body when PSI=n $\pi$, where n is an integer, pursuant to the second embodiment.

Figure 27:
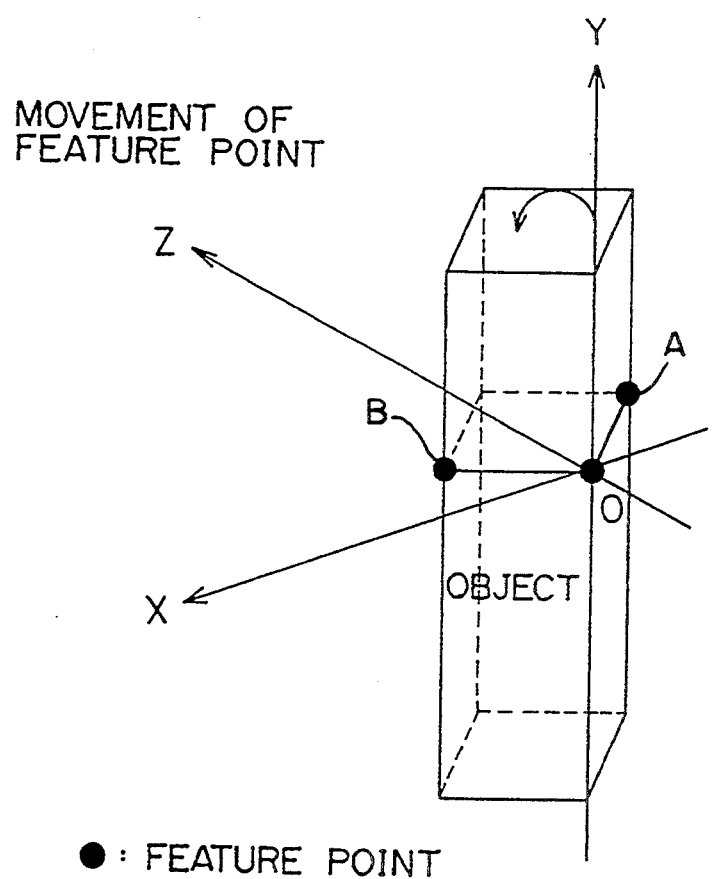
FIG. 27 is an explanatory chart illustrating a method for calculating the shape and rotation, when $PSI = n\pi$, where n is an integer.

FIG. 27 is an explanatory chart illustrating a method for calculating the shape and rotation, when PSI=n $\pi$, where n is an integer.

XY plane represents the observation plane. Feature point 0 is on the coordinate origin. First and second feature points A and B, respectively, rotate around the Y axis. The Z axis is the direction of the optical axis of an image capturing device. (FIG. 27 illustrates a case in which an object is observed from a direction perpendicular to its axis of rotation.)

Figure 28:
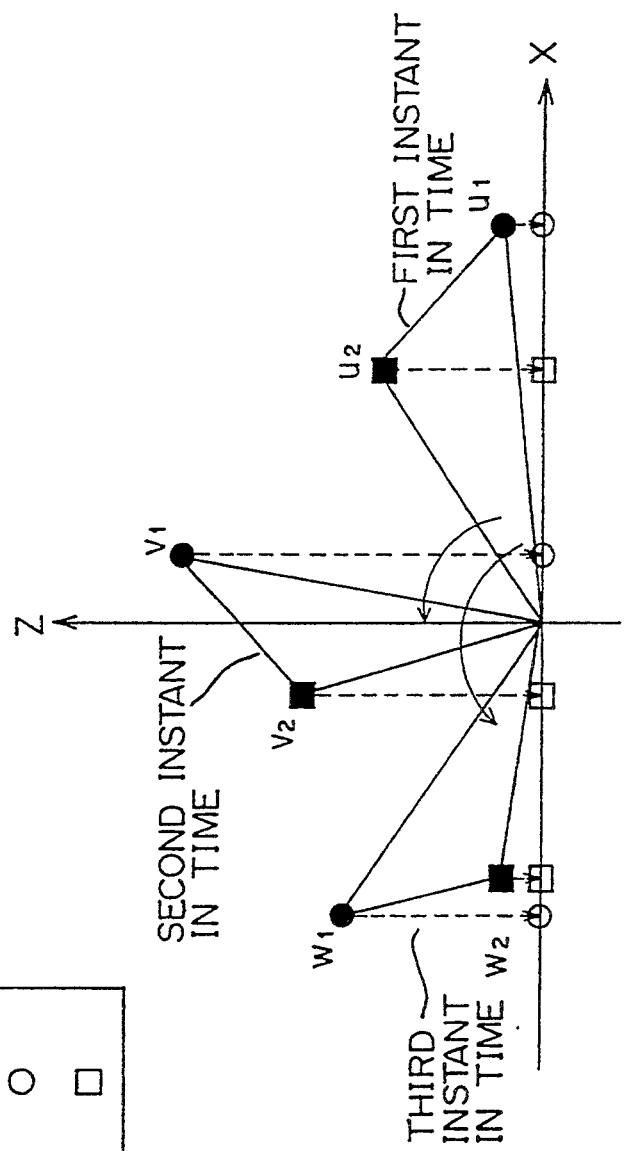
FIG. 28 is an explanatory chart illustrating a case of a generic shape when $PSI = n\pi$.

FIG. 28 is an explanatory chart illustrating a case of a generic shape when PSI=n $\pi$.

The generic shape should be construed as meaning referring to cases other than those representing a constant movement and a right angle shape, which will be described later.

In case of a generic shape, observations of three [3] feature points at three [3] instants in time.

$u_1$ and $u_2$ represent vectors of first and second feature points at a first instant in time, respectively. $w_1$ and $w_2$ represent vectors of first and second feature points at a second instant in time, respectively. $v_1$ and $v_2$ represent vectors of first and second feature points at a third instant in time, respectively.

R and S represent matrices from the first instant in time respectively to the second and third instants in time. At this time, the problem of obtaining the shape and movement of the first and second feature points is formulated as a problem of obtaining from $$v_i = R\ u_i,\ w_i = S\ u_i (i=1, 2) \quad (20)$$

the rotation matrices R and S and Z coordinate values $u_{i2}$, $v_{i2}$ and $w_{i2}$ of the first and second feature points at first, second and third instants in time.

It should be noted that the X and Z axes respectively represent first and second coordinate axes.

The components of the rotation matrices R and S are as follows.

$$R = \begin{bmatrix} r_{11} & r_{12} \\ r_{21} & r_{22} \end{bmatrix} \quad S = \begin{bmatrix} s_{11} & s_{12} \\ s_{21} & s_{22} \end{bmatrix} \quad (21)$$

where $r_{21} = -r_{12}$, $r_{22} = r_{11}$, $s_{21} = -s_{12}$, and $s_{22} = s_{11}$.

The geometrical conditions for obtaining a recognition solution are (A) the angle of rotation $\theta$ of an object between any two [2] instants in time is neither $n\pi$ nor $\pi/2 + n\pi$, and (B) three [3] feature points are not on a single straight line.

These are equivalent that the following matrices are all regular.

$$\begin{bmatrix} u_{11} & u_{21} \\ v_{11} & v_{21} \end{bmatrix}, \begin{bmatrix} v_{11} & v_{21} \\ w_{11} & w_{21} \end{bmatrix}, \begin{bmatrix} w_{11} & w_{21} \\ u_{11} & u_{21} \end{bmatrix} \quad (22)$$

The recognition solution is obtained by the following procedure.

(1) Calculate rotation matrices R and S.
(2) Calculate $a_1$ by expression (23).

$$a_1 = [u_{11}\ u_{21}] \begin{bmatrix} v_{11} & v_{21} \\ w_{11} & w_{21} \end{bmatrix}^{-1} \quad (23)$$

Components $r_{11}$ and $r_{12}$ of rotation matrix R are obtained by expressions (24) and (25).

$$r_{11} = (1 + a_{11} - a_{12}^2)/2a_{11} \quad (24)$$

$$r_{12} = \pm(1 - r_{11}^2)^{\frac{1}{2}} \quad (25)$$

Components $s_{11}$ and $s_{12}$ of rotation matrix S are obtained by expressions (26) and (27).

$$s_{11} = (1 - a_{11}\ r_{11})/a_{12} \quad (26)$$

$$s_{12} = (a_{11}\ r_{12}/a_{12} \quad (27)$$

(2) The Z coordinate value of a feature point is calculated.

$a_2$ is obtained as the second row of the matrix of expression (28).

$$\begin{bmatrix} r_1 \\ s_1 \end{bmatrix}^{-1} \quad (28)$$

Here, $r_1$ and $s_1$ are the first rows of the rotation matrices R and S, respectively.

Then, $u_{i2}$ (i=1, 2) are obtained by expression (29).

$$u_{i2} = a_2 \begin{bmatrix} v_{i2} \\ w_{i2} \end{bmatrix} (i=1, 2) \quad (29)$$

$v_{i2}$ and $w_{i2}$, where (i=1, 2) are obtained by expression set (30).

$$v_{i2} = r_2 u_i,\ w_{i2} = s_2 u_i \quad (30)$$

Figure 29A:
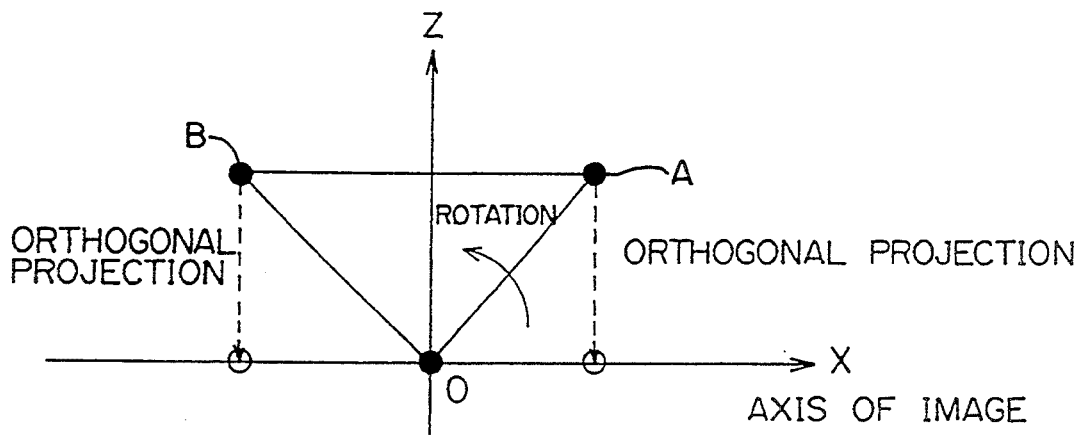
FIGS. 29A and 29B is an explanatory chart illustrating two [2] solutions forming mirror image inversions.
Figure 29B:
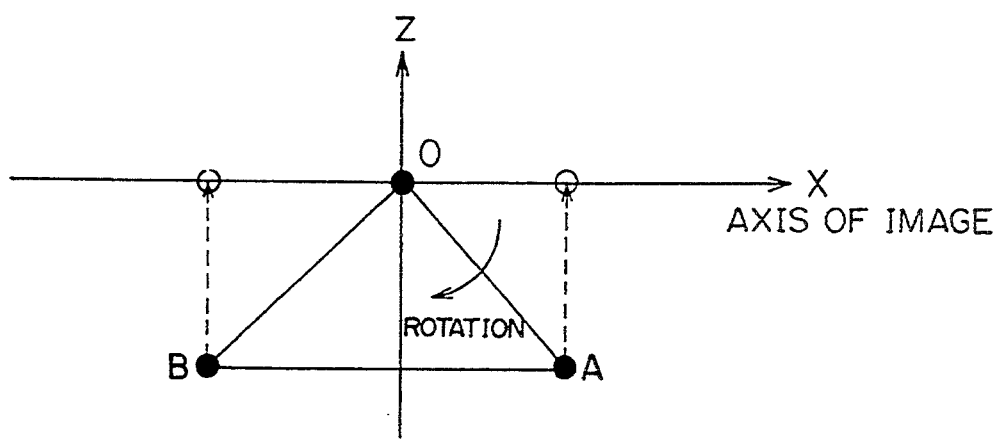

FIG. 29 is an explanatory chart illustrating two [2] solutions forming mirror image inversions.

There are cases in the above in which $r_{12}$ is positive and negative, which correspond to solutions forming mirror image inversions as shown in FIG. 29. (Both the counterclockwise rotation shown in part (a) and the clockwise rotation shown in part (b) satisfy the solutions of $v_i = R\ u_i$, $w_i = S\ u_i$, where i=1, 2.) These correspond to the cases in which the surface of an object has a convexity and concavity. An advance input of these correspondences as known data enables either one of the recognition solutions to be selected.

U.S. patent application Ser. No. 07/1946,540 and European Patent Application No. 92308486.7 submitted by this applicant disclose in detail a method for recognizing a moving body having a generic shape from a direction perpendicular to its axis of rotation. It should be noted, however, this invention swaps the Y axis with the Z axis in the earlier application.

Figure 30:
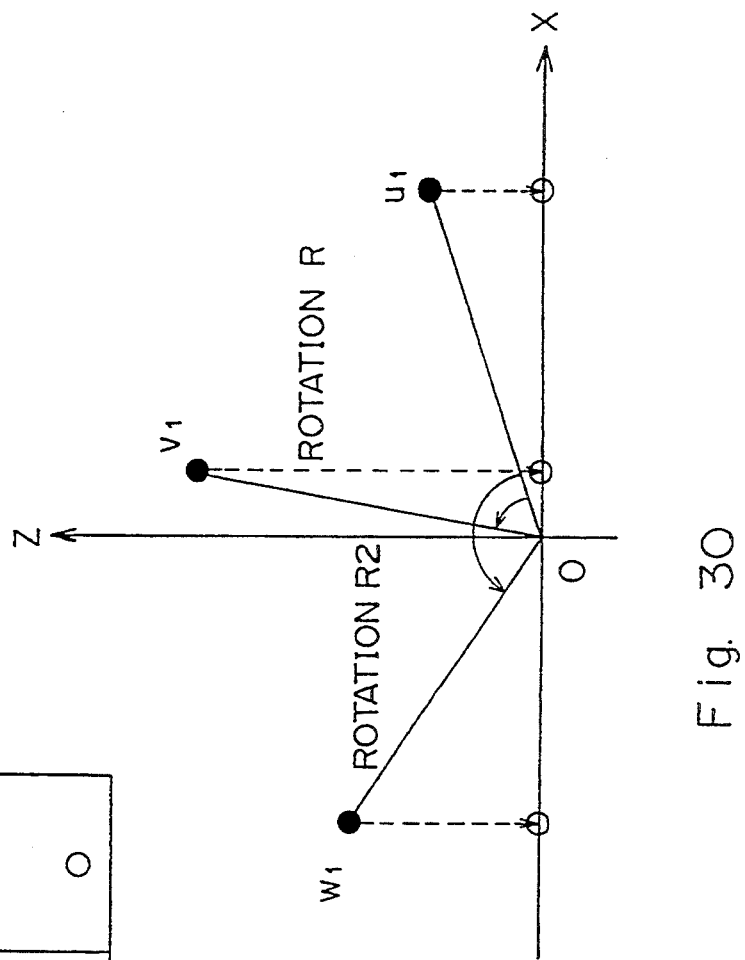
FIG. 30 is an explanatory chart illustrating a case in which $PSI = n\pi$ and the movement is constant.

FIG. 30 is an explanatory chart illustrating a case in which PSI=$n\pi$ and the movement is constant.

The movement of a body can often be considered to be constant, when it is observed for a short duration. Described below is a case in which an object having a constant movement (rotation) is observed, when PSI=$n\pi$.

$u_1$, $v_1$ and $w_1$ represent the vectors of feature point 1 respectively at first, second and third instants in time.

At this time, the recognition problem can be formulated as $$v_1 = R\ u_1,\ w_1 = R^2\ u_1 \quad (31)$$

The geometrical conditions for obtaining a recognition solution are (C) the angle of rotation represented by rotation matrix R is neither $n\pi$ nor $\pi/2 + n\pi$, and (D) the orthogonal projections of two [2] feature points do not overlap at a v-th instant in time.

Geometrical condition (C) is equivalent to a determinant condition (E) "$u_{11} = \pm v_{11} = w_{11}$ is false". When (D) and (E) are valid, a recognition solution can be obtained by the following procedure.

(1) Calculate rotation matrix R.

Components $r_{11}$ and $r_{12}$ are calculated by expressions (32) and (33).

$$r_{11} = (u_{11} + w_{11})/2v_{11} \tag{32}$$

$$r_{12} = \pm(1 - r_{11}^2)^{\frac{1}{2}} \tag{33}$$

(2) The Z coordinate value of a feature point is calculated.

$u_{12}$, $v_{12}$, and $w_{12}$ are calculated according to expressions (34) and (35).

$$u_{12} = (1 - 2r_{11}^2, r_{11}) \begin{bmatrix} v_{11} \\ w_{11} \end{bmatrix} / r_{12} \tag{34}$$

$$v_{12} = r_2 \, u_1, \quad w_{12} = r_2 \, v_1 \tag{35}$$

A mirror image inversion solution exists in the case shown in FIG. 30 as well.

U.S. patent application No. 07/1946,540 and European Patent Application No. 92308486.7 submitted by this applicant disclose in detail a method for recognizing a moving body having a constant movement from a direction perpendicular to its axis of rotation. It should be noted, however, this invention swaps the Y axis with the Z axis in the earlier application.

Quite a few objects, e.g. buildings and roadside curbs, have right angle peaks. When an object has feature points forming a right angle, the right angle shape recognition mode is selected, whereby three [3] feature points forming a right angle are observed at two [2] instants in time for matching.

Figure 31:
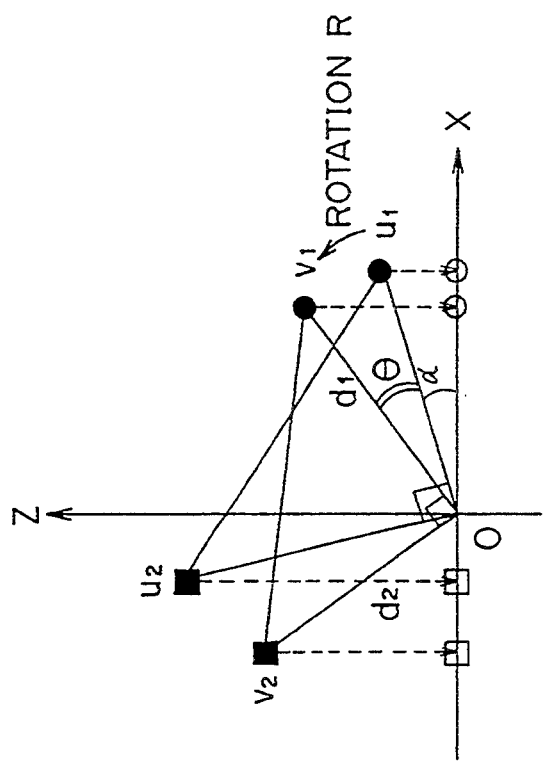
FIG. 31 is an explanatory chart illustrating a case in which $PSI = n\pi$ and the shape of an object has a right angle.

FIG. 31 is an explanatory chart illustrating a case in which PSI=n π and the shape of an object has a right angle.

$u_1$ and $u_2$ are vectors of first and second feature points at a first instant in time. $u_1$ and $u_2$ form a right angle. $v_1$ and $v_2$ are vectors of first and second feature points at a second instant in time. A rotation matrix R expresses the rotation (of an angle $\theta$) from the first instant in time to the second instant in time. $d_1$ and $d_2$ represent the distances to the first and second feature points from the coordinate origin. An angle $\alpha$ represents the angle formed between the X axis and vector $u_1$.

The vectors representing these feature points satisfy expression (36).

$$v_i = R \, u_i (i = 1, 2) \tag{36}$$

Transforming expression (36), expression sets (37) and (38), which include observable X coordinate values, are obtained.

$$d_1 \cos \alpha = u_{11}, \quad -d_2 \sin \alpha = u_{21} \tag{37}$$

$$d_1 \cos (\alpha + \theta) = v_{11}, \quad -d_2 \sin (\alpha + \theta) = v_{21} \tag{38}$$

$d_1$, $d_2$, $\alpha$ and $\theta$ are obtained from these expressions.

The geometrical conditions for obtaining a recognition solution are (F) the angle of rotation of an object is neither n $\theta$ nor $\pi/2$+n $\pi$, and (G) the first and second feature points are not on a symmetrical position against the orthogonal projecting axis at two [2] instants in time.

Geometrical condition (F) is equivalent to a determinant condition (H).

(H) Neither $|u_{11}| = |v_{11}|$ nor $|u_{21}| = |v_{21}|$ is valid.

Geometrical condition (G) is equivalent to a determinant condition (I).

(I) $u_{11}v_{21} + u_{21}v_{11} \neq 0$

When determinant condition (H) is valid, a recognition solution can be obtained by the following procedure.

(1) Calculate rotation matrix R by expressions (39) and (40).

$$r_{11} = (u_{11}u_{21} + v_{11}v_{22})/(u_{11}v_{21} + u_{21}v_{11}) \tag{39}$$

$$r_{12} = \pm(1 - r_{11}^2)^{\frac{1}{2}} \tag{40}$$

(2) Calculate the Z coordinate values of feature points.

$\alpha$, $d_1$ and $d_2$ are determined as follows.

(a) When $u_{11} \neq 0$ and $U_{21} \neq 0$ $$\tan \alpha = (v_{11} - u_{11}r_{11})/u_{11}r_{12} \tag{41}$$

$$d_1 = u_{11}/\cos \alpha, \quad d_2 = -u_{21}/\sin \alpha \tag{42}$$

(b) When $u_{11} \neq 0$ $$\begin{aligned}&\alpha = \pi/2 \text{ (if } u_{21}<0), \, \alpha = 3\pi/2 \text{ (if} \\ &u_{21}>0) d_1 = |v_{11}/r_{12}|, \, d_2 = |u_{21}|\end{aligned} \tag{43}$$

(c) When $u_{21} = 0$ $$\begin{aligned}&\alpha = 0 \text{ (if } u_{21}<0), \, \alpha = \pi \text{ (if } u_{11}<0) d_1 = |u_{11}|, \\ &d_2 = |v_{21}/r_{12}|\end{aligned} \tag{44}$$

Angle $\alpha$ specifying the relative position of feature points and the sign of $r_{12}$ (the direction of rotation matrix R) in expression (40) can be determined uniquely from the signs of the observed coordinate values and their inequalities.

FIG. 32 is an explanatory chart illustrating a method for determining the range of $\alpha$ and $\beta$ when the shape of an object has a right angle.

As shown in part (a), angle a can be determined within a $\pi/2$ range.

Part (b) shows the relation between the sign of the observed coordinate values and an angle $\beta(=\alpha+\theta)$. As with $\alpha$, angle $\beta$ can be determined within a $\pi/2$ range.

FIG. 33 is an explanatory chart illustrating a method for determining the direction of a rotation represented by a rotation matrix R when the shape of an object has a right angle.

The sign of $r_{12}$ expressing the direction of a rotation represented by rotation matrix R can be determined as follows. First, find integers n and m (=0, 1, 2, 3) satisfying expressions (45) and (46).

$$(\pi/2)n \leq \alpha < (\pi/2)(n+1) \tag{45}$$

$$(\pi/2)m \leq \beta < (\pi/2)(m+1) \tag{46}$$

(a) When n-m is odd, the sign of $r_{12}$ can be determined according to part (a) of FIG. 33.

(b) When n-m is even, the sign of $r_{12}$ can be determined according to part (b) of FIG. 33.

U.S. patent application No. 07/1946,540 and European Patent Application No. 92308486.7 submitted by this applicant disclose in detail a method for recognizing a moving body having a right angle shape from a direction perpendicular to its axis of rotation. It should be noted, however, this invention swaps the Y axis with the Z axis in the earlier application.

Figure 34:
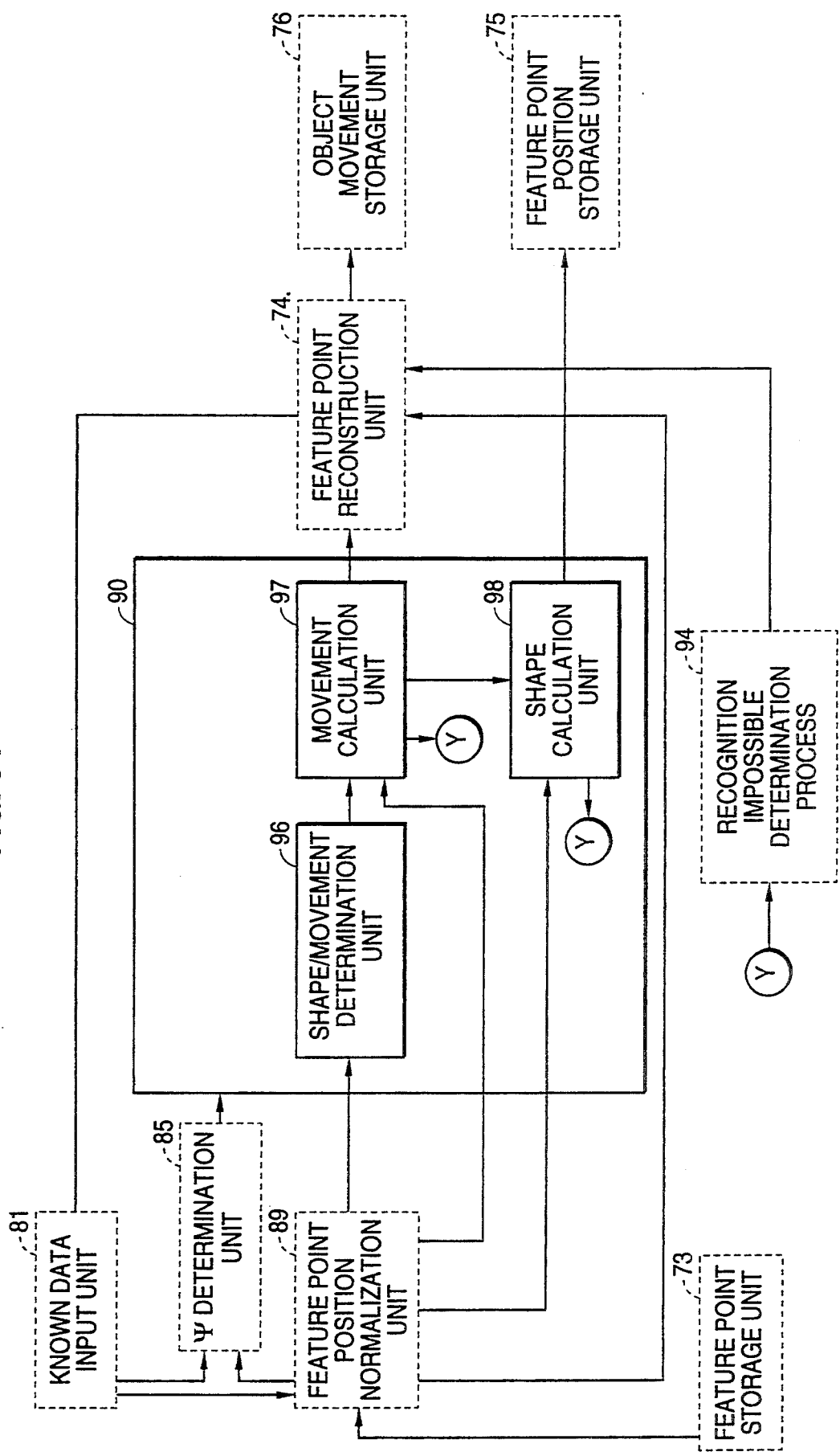
FIG. 34 shows in detail a configuration of a subprocess unit in case of $PSI = 0$.

FIG. 34 shows in detail a configuration of a subprocess unit in case of PSI=0.

More specifically, FIG. 34 is a block diagram of the third subprocess unit 90 for a case of PSI=n π in the shape/movement calculation unit 86 shown in FIG. 18. Parts shown in FIG. 34 which are the same as those shown in FIG. 18 have the same numbers.

96 is a shape/movement determination unit for determining the computability of the shape and object of an object. 97 is a movement calculation unit for obtaining the rotation of a feature point. 98 is a shape calculation unit for obtaining the three-dimensional coordinate position of a feature point, including the Z coordinate value.

As described earlier, the third subprocess unit 90 for a case of PSI=n π comprises the generic shape calculation unit 91 for calculating the shape and movement of an object when the object has a generic shape, the constant movement calculation unit 92 for calculating the shape and movement when the rotation of an object (the movement of feature points) is constant, and the right angle shape calculation unit 93 for calculating the movement and shape of an object having a right angle formed by three [3] feature points. Although these calculating units are totally separate, because their differences do not count in the illustration of FIG. 34, they are superposed for exhibit.

Figure 35:
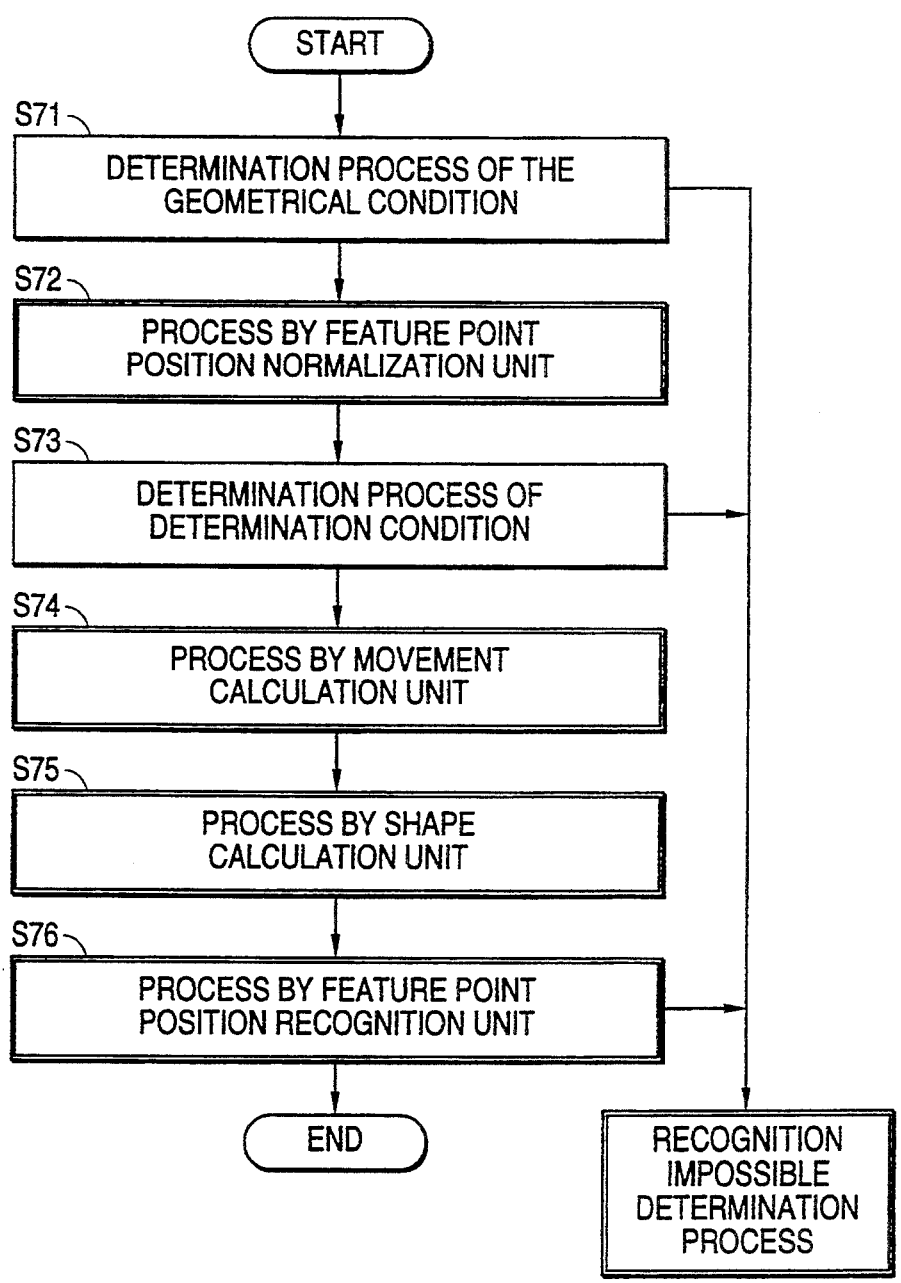
FIG. 35 is a first flowchart of processes executed by a generic shape calculation unit pursuant to the second embodiment.

FIG. 35 is a first flowchart of processes executed by a generic shape calculation unit pursuant to the second embodiment.

Figure 36:
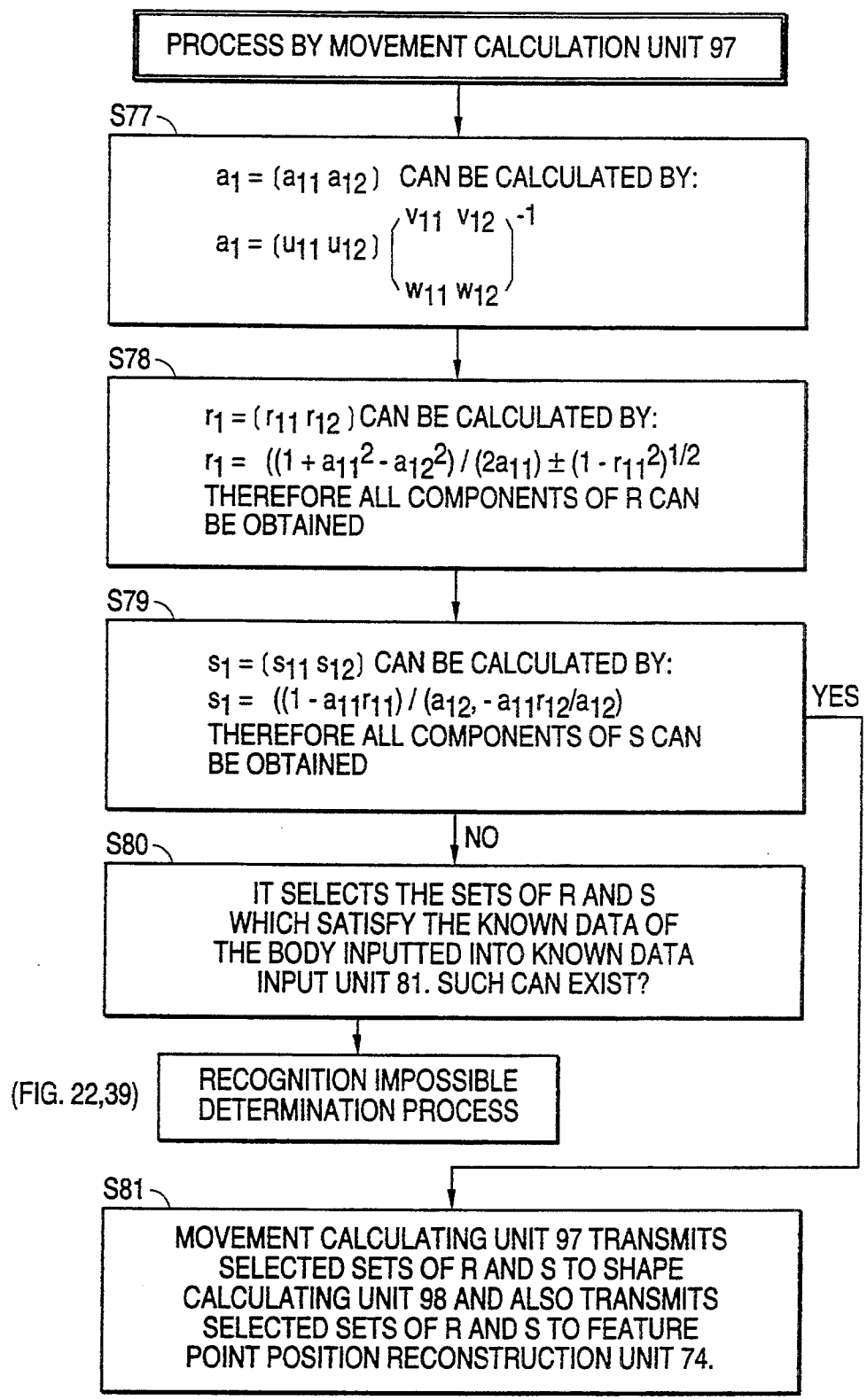
FIG. 36 is a second flowchart of processes executed by a generic shape calculation unit pursuant to the second embodiment.

FIG. 36 is a second flowchart of processes executed by a generic shape calculation unit pursuant to the second embodiment.

Figure 37:
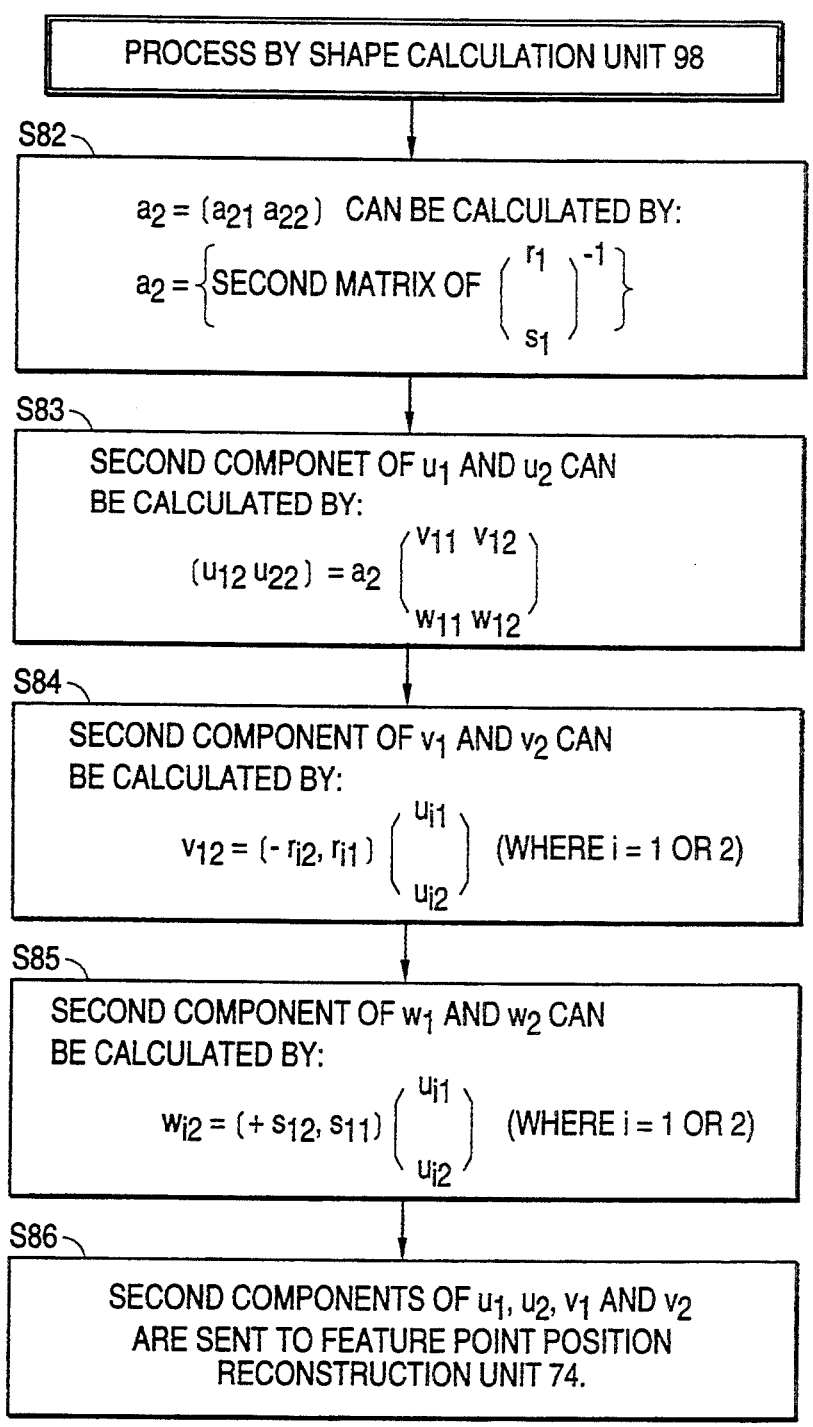
FIG. 37 is a third flowchart of processes executed by a generic shape calculation unit pursuant to the second embodiment.

FIG. 37 is a third flowchart of processes executed by a generic shape calculation unit pursuant to the second embodiment.

Figure 38:
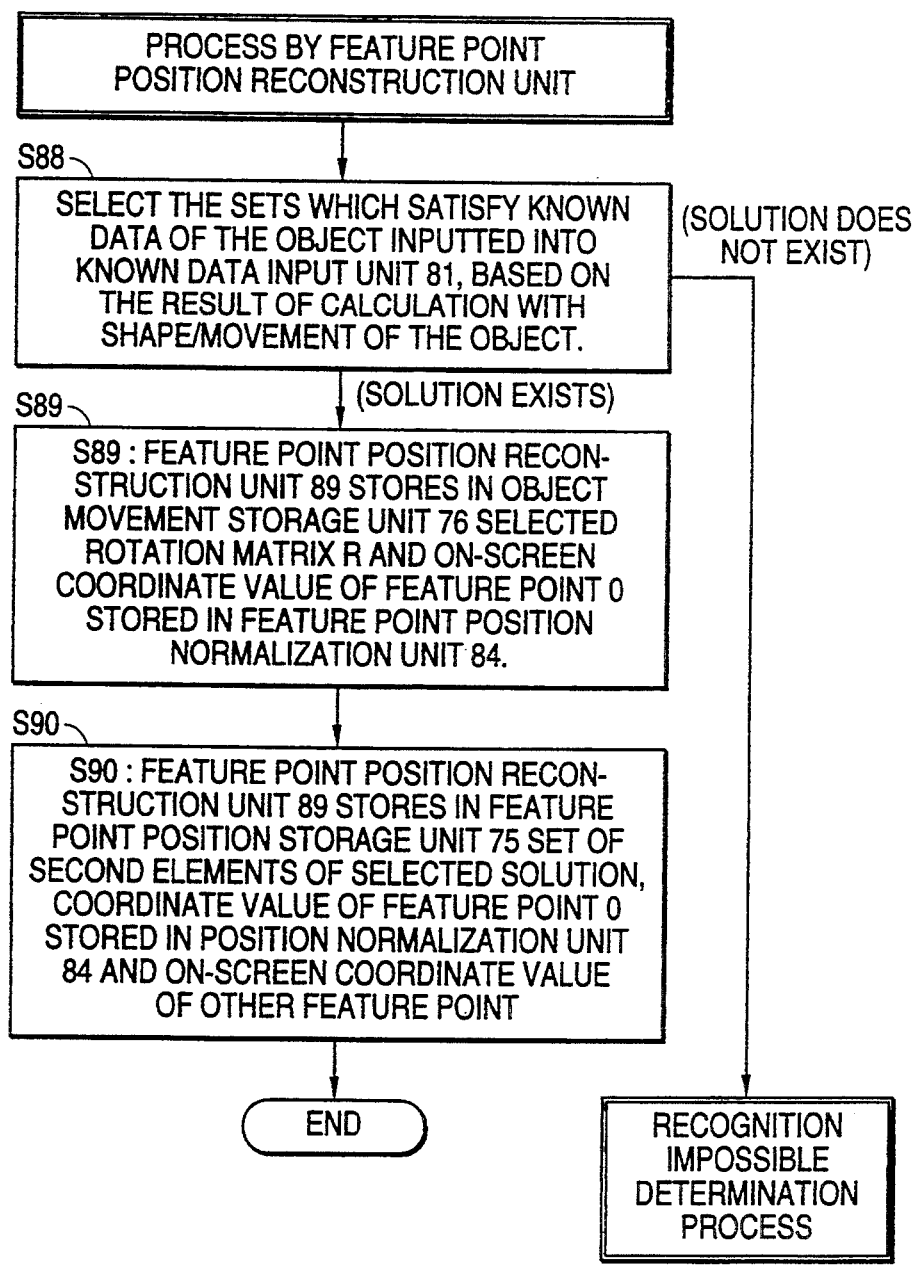
FIG. 38 is a fourth flowchart of processes executed by a generic shape calculation unit pursuant to the second embodiment.

FIG. 38 is a fourth flowchart of processes executed by a generic shape calculation unit pursuant to the second embodiment.

The flows of the processes shown in FIGS. 35 through 38 are explained by following the steps. Although these and other flowcharts contain some redundant steps, they are included for convenience sake.

S71: The generic shape calculation unit 91 determines, e.g. based on data from a sensor (not shown), the regularities of matrices in expression (22), which are equivalent to geometrical conditions (A) and (B) for a case of PSI=n π. A negative determination invokes a recognition impossible process shown as S39 in FIG. 22. A positive determination invokes S72.

S72: The feature point position normalization unit 84 executes normalization processes for three [3] feature points captured at three [3] instants in time.

S73: The feature point position normalization unit 84 determines the satisfaction or dissatisfaction of the determinant conditions (geometrical conditions) for normalized coordinate values. The dissatisfaction invokes the recognition impossible process shown as S39 in FIG. 22. The satisfaction invokes the processes of the movement calculation unit 97 and the shape calculation unit 98.

[Processes by the movement calculation unit 97]

S77 through S81 represent processes by the movement calculation unit 97.

S77: The movement calculation unit 97 calculates expression (23).

S78: The movement calculation unit 97 calculates expressions (24) and (25), where $r_1$ represents the first row of rotation matrix R.

S79: The movement calculation unit 97 calculates expressions (26) and (27).

S80: The movement calculation unit 97 determines the presence or absence of a solution satisfying known data by comparing the obtained set of rotation matrices R and S with known data. A determination of absence invokes the recognition impossible process shown as S39 in FIG. 22. A determination of presence invokes S81.

S81: The movement calculation unit 97 sends the solution satisfying known data to the shape calculation unit 98 and the feature point position reconstruction unit 89.

[Processes of the shape calculation unit 98]

S77 through S81 represent processes by the shape calculation unit 98.

S82: The shape calculation unit 98 calculates expression (28).

S83: The shape calculation unit 98 calculates expression (29).

S84 and S85: The shape calculation unit 98 calculates expression (30).

S86: The shape calculation unit 98 sends to the feature point position reconstruction unit 89 the obtained second components of vectors $u_1$, $u_2$, $v_1$ and $v_2$.

[Processes by the feature point position reconstruction unit 89]

S88, S89 and S90 represent processes by the feature point position reconstruction unit 89.

S88: The feature point position reconstruction unit 89 determines the presence or absence of a set of solutions (comprising second components of vectors $u_1$, $u_2$, $v_1$ and $v_2$) satisfying the known data of the object inputted from the known data input unit 81. (Because the obtained solutions include mirror image inversions, the solution satisfying known data, on the convexity or concavity of a shape, needs to be selected.) A determination of absence invokes the recognition impossible process shown as S39 in FIG. 22. A determination of presence invokes S89.

S89: The feature point position reconstruction unit 89 stores the obtained movement in the object movement storage unit 76.

S90: The feature point position reconstruction unit 89 stores the obtained set of solutions in the feature point position storage unit 75.

Figure 39:
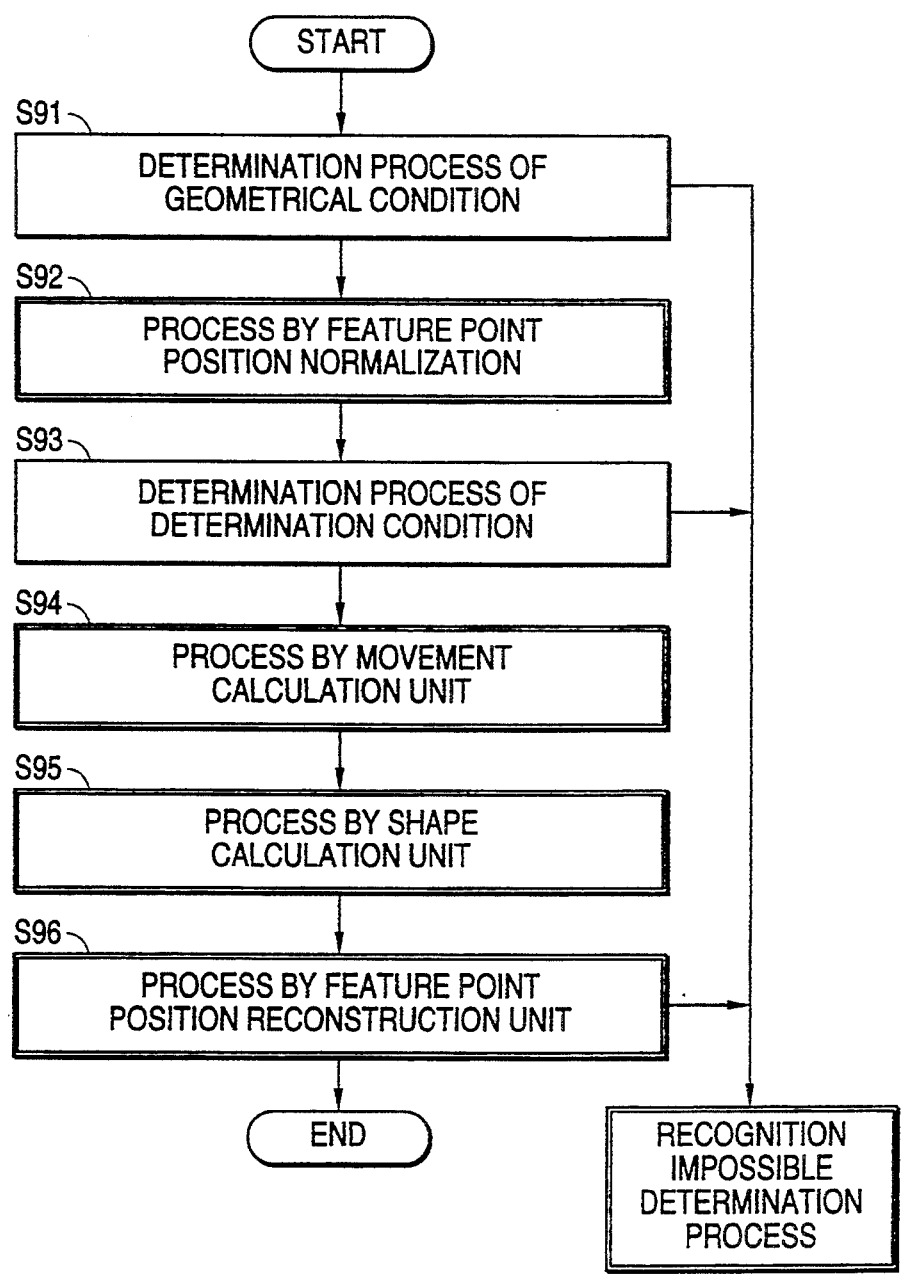
FIG. 39 is a first flowchart of processes executed by a constant movement calculation unit pursuant to the second embodiment.

FIG. 39 is a first flowchart of processes executed by a constant movement calculation unit pursuant to the second embodiment.

Figure 40:
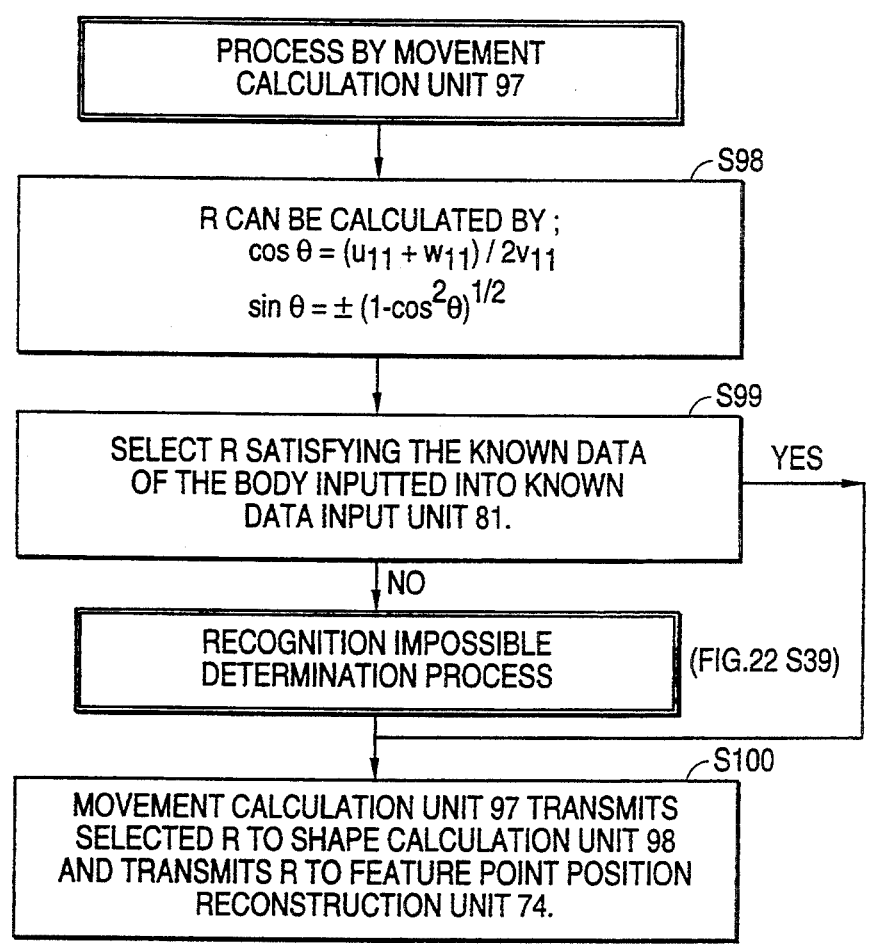
FIG. 40 is a second flowchart of processes executed by a constant movement calculation unit pursuant to the second embodiment.

FIG. 40 is a second flowchart of processes executed by a constant movement calculation unit pursuant to the second embodiment.

Figure 41:
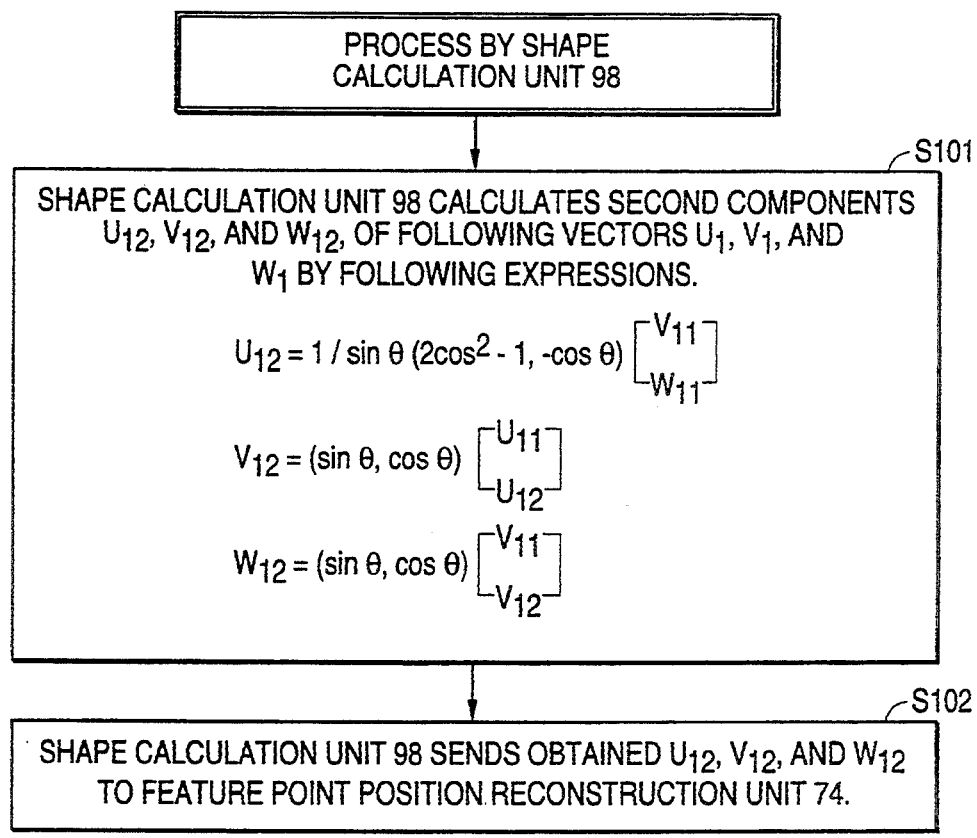
FIG. 41 is a third flowchart of processes executed by a constant movement calculation unit pursuant to the second embodiment.

FIG. 41 is a third flowchart of processes executed by a constant movement calculation unit pursuant to the second embodiment.

S91: The constant movement calculation unit 92 determines, based on the known data e.g. from a sensor (not shown), the satisfaction of geometrical condition (C) for a case in which PSI=n π.

A dissatisfaction of geometrical condition (C) (when $\theta = n\pi$) causes the constant movement calculation unit 92 to input to the movement calculation unit 97 information about the failure in recognition, thereby invoking the recognition impossible process shown as S39 in FIG. 22.

A satisfaction of geometrical condition (C) invokes S92.

S92: The feature point position normalization unit 84 executes the process shown as S37 in FIG. 22.

S93: The feature point position normalization unit 84 determines the satisfaction of determinant condition (E), based on the normalized coordinate values of feature points.

A dissatisfaction of geometrical condition (E) causes the constant movement calculation unit 92 to input to the movement calculation unit 97 information that a moving body cannot be recognized, thereby invoking the recognition impossible process shown as S39 in FIG. 22.

A satisfaction of geometrical condition (E) invokes processes by the movement calculation unit 97 and the shape calculation unit 98.

[Processes by the movement calculation unit 97]

S98: The movement calculation unit 97 calculates expressions (32) and (33), which are $r_{11}=\cos \theta$ and $r_{12}=-\sin \theta$.

S99: The movement calculation unit 97 determines the presence or absence of a solution satisfying the known data of an object inputted in the known data input unit 81. The absence of a solution satisfying known data invokes a recognition impossible process shown as S39 in FIG. 22. The presence of a solution satisfying known data invokes S100.

S100: The movement calculation unit 97 sends as rotation matrix R the selected solution to the shape calculation unit 98 (for shape calculation) and the feature point position reconstruction unit 89.

[Processes by the shape calculation unit 98] S101: The shape calculation unit 98 calculates expressions (34) and (35) to obtain following vectors. $r_2$ (sin $\theta$, cos $\theta$), $u_1$ ($u_{11}$, $u_{12}$) and $v_1$ ($v_{11}$, $v_{12}$)

S102: The shape calculation unit 98 sends the obtained set of $u_{12}$, $v_{12}$ and $w_{12}$ to the feature point position reconstruction unit 89.

Thereafter, the feature point position reconstruction unit 89 executes its processes shown as S88, S89 and S90 in FIG. 38.

Figure 42:
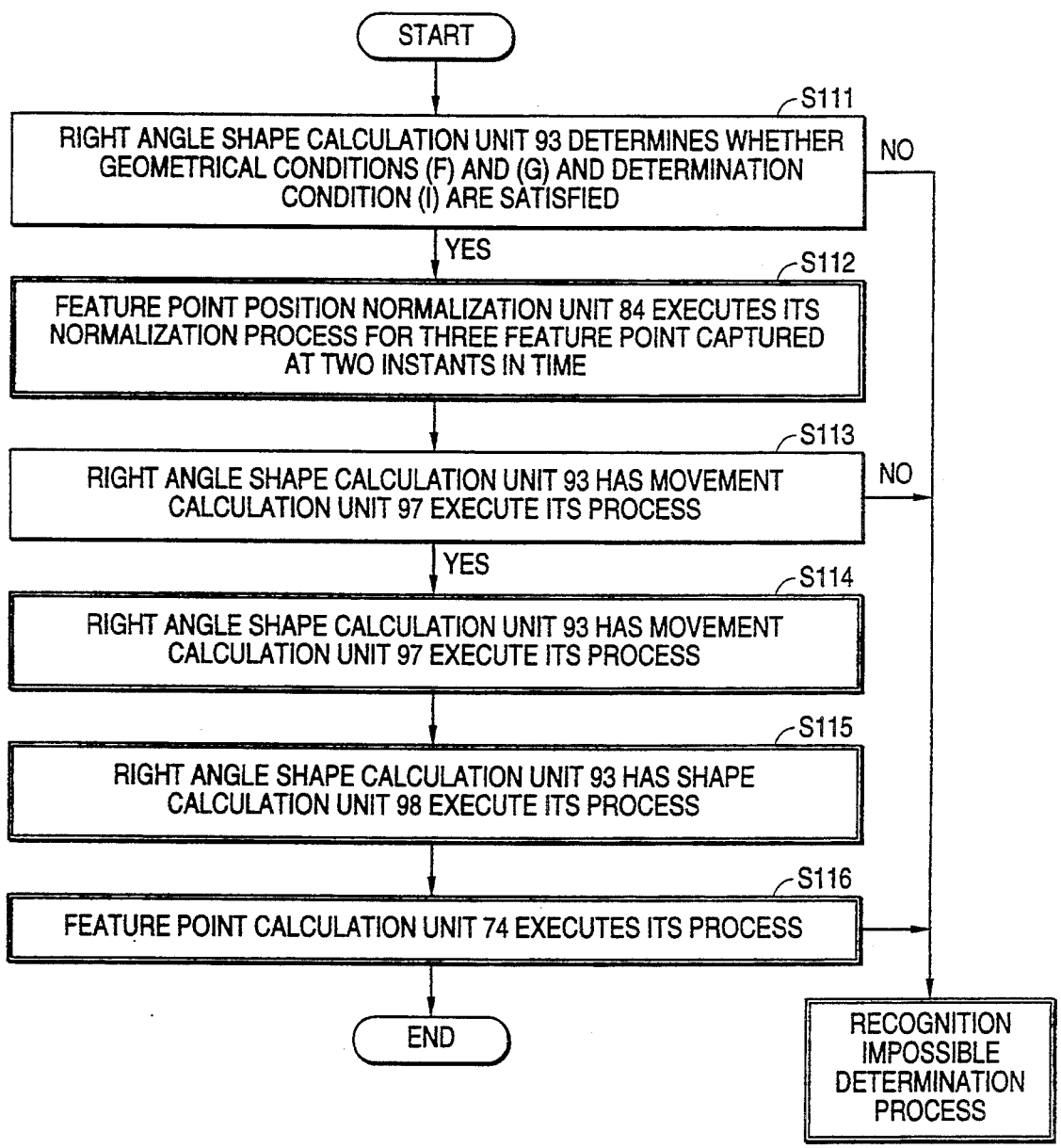
FIG. 42 is a first flowchart of processes executed by a right angle shape calculation unit pursuant to the second embodiment.

FIG. 42 is a first flowchart of processes executed by a right angle shape calculation unit pursuant to the second embodiment.

Figure 43:
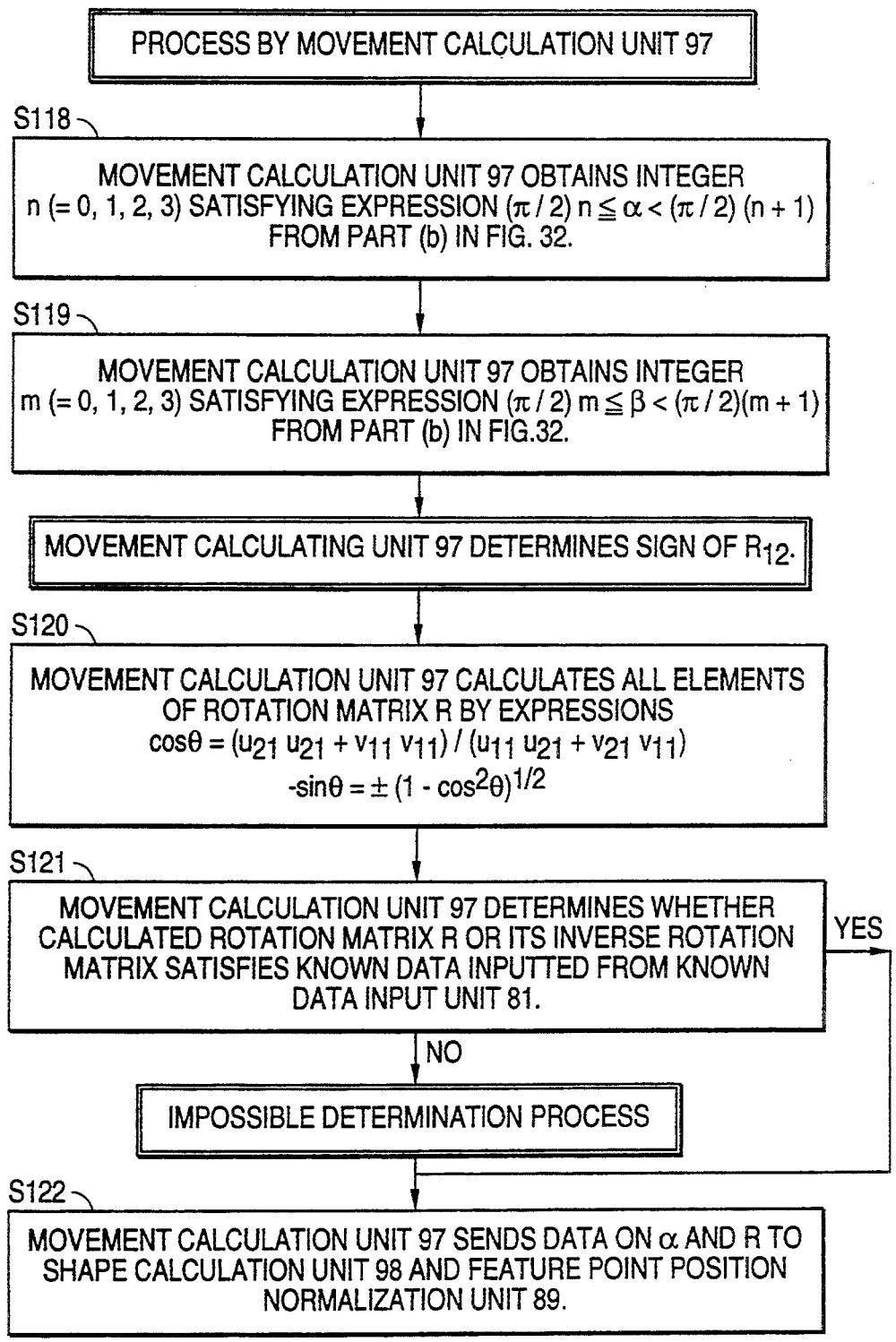
FIG. 43 is a second flowchart of processes executed by a right angle shape calculation unit pursuant to the second embodiment.

FIG. 43 is a second flowchart of processes executed by a right angle shape calculation unit pursuant to the second embodiment.

Figure 44:
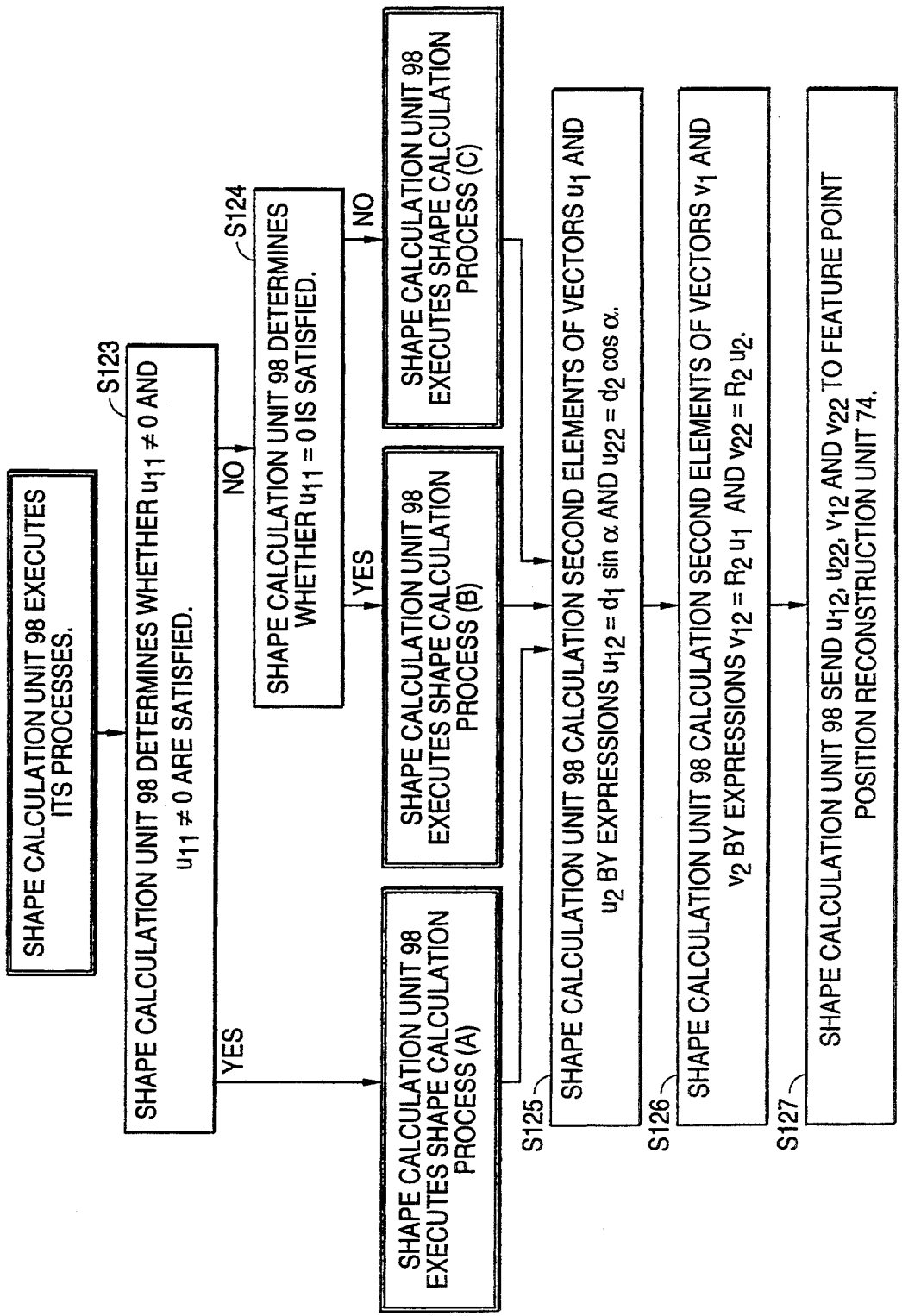
FIG. 44 is a third flowchart of processes executed by a right angle shape calculation unit pursuant to the second embodiment.

FIG. 44 is a third flowchart of processes executed by a right angle shape calculation unit pursuant to the second embodiment.

Figure 45:
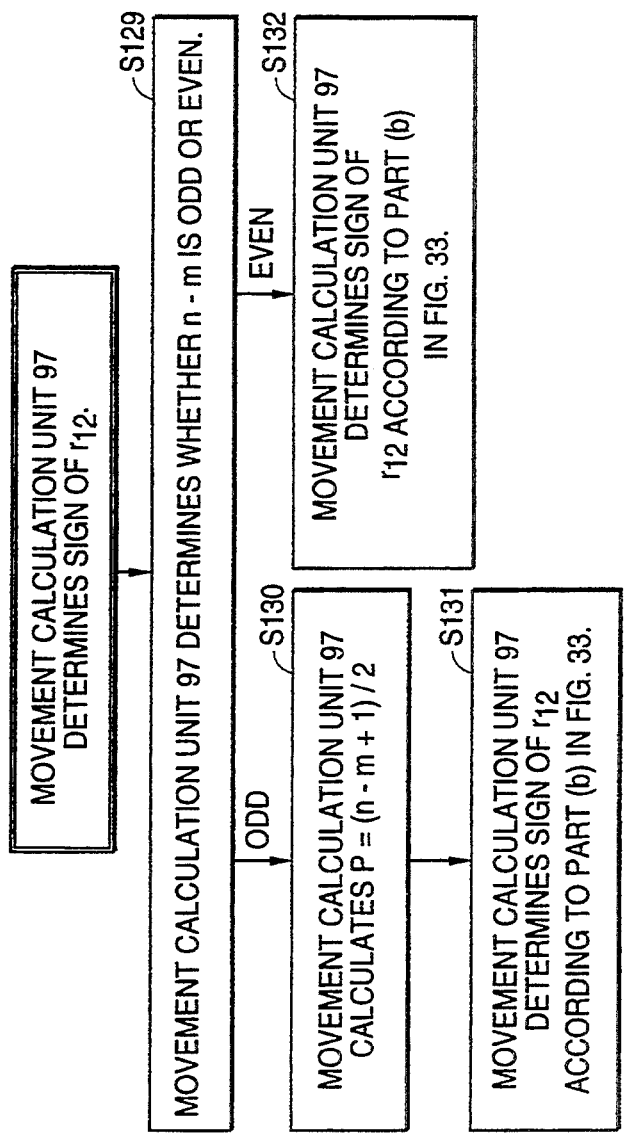
FIG. 45 is a fourth flowchart of processes executed by a right angle shape calculation unit pursuant to the second embodiment.

FIG. 45 is a fourth flowchart of processes executed by a right angle shape calculation unit pursuant to the second embodiment.

Figure 46:
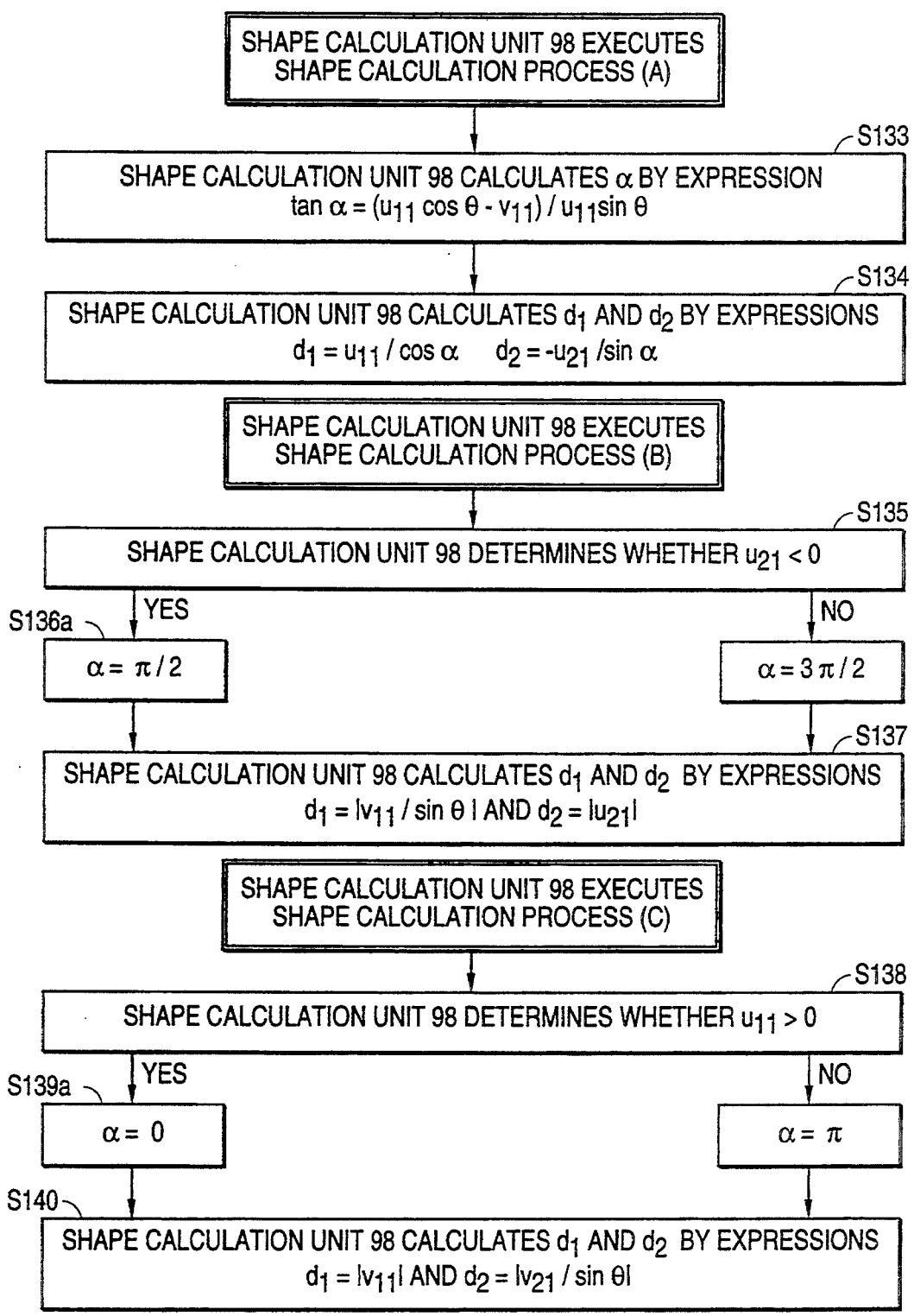
FIG. 46 is a fifth flowchart of processes executed by a right angle shape calculation unit pursuant to the second embodiment.

FIG. 46 is a fifth flowchart of processes executed by a right angle shape calculation unit pursuant to the second embodiment.

S111: The right angle shape calculation unit 93 determines, e.g. based on known data inputted from a sensor, the satisfaction or dissatisfaction of geometrical conditions (F) and (G) and determinant condition (I) for a case in which PSI=n $\pi$.

On determining a dissatisfaction of any of the geometrical and determinant conditions in S111, the right angle shape calculation unit 93 inputs to the movement calculation unit 97 information that the movement cannot be recognized, thereby invoking the recognition impossible process shown as S39 in FIG. 22.

On determining a satisfaction of all of the geometrical and determinant conditions in S111, the right angle shape calculation unit 93 invokes S112. S112: The feature point position normalization unit 84 executes its normalization process for three [3] feature points captured at two [2] instants in time.

S113: The right angle shape calculation unit 93 determines the satisfaction of determinant condition (H), based on the coordinate value of a normalized feature point. On determining the dissatisfaction of determinant condition (H), the right angle shape calculation unit 93 inputs to the movement calculation unit 97 information that the movement cannot be recognized, thereby invoking the recognition impossible process shown as S39 in FIG. 22. On determining the dissatisfaction of determinant condition (H), the right angle shape calculation unit 93 calculates the movement and shape of an object.

[Processes by the movement calculation unit 97]

S118 and S119: The movement calculation unit 97 obtains the range of $\alpha$ and $\beta$ from parts (a) and (b) shown in FIG. 32.

[Process for determining the sign of $r_{12}$]

The movement calculation unit 97 determines the sign of $r_{12}$ in S129 through S132.

S129: The movement calculation unit 97 determines whether m−n is odd or even. On determining m−n to be odd, the movement calculation unit 97 determines the sign of sin $\theta$ in S130 according to part (a) shown in FIG. 33. On determining m−n to be even, the movement calculation unit 97 determines the sign of sin $\theta$ in S130 according to part (b) shown in FIG. 33.

S120: The movement calculation unit 97 calculates rotation matrix R by expressions (39) and (40), which are $r_{11}=\cos \theta$ and $w_{12}=-\sin \theta$.

S121: The movement calculation unit 97 compares the calculated rotation matrix R with known data inputted from the known data input unit 81. On determining the absence of a solution satisfying the known data, the movement calculation unit 97 invokes the recognition impossible process shown as S39 in FIG. 22. On determining the presence of a solution satisfying the known data, the movement calculation unit 97 invokes S122.

S122: The movement calculation unit 97 sends to the feature point position reconstruction unit 89 data on $\alpha$ and R.

Then the shape calculation unit 98 executes its process.

[Processes by the shape calculation unit 98]

S123: The shape calculation unit 98 determines whether $u_{11}\pm 0$ and $u_{11}\pm 0$ are satisfied. If neither $u_{11}$ nor $u_{21}$ is zero [0], the shape calculation unit 98 invokes S133.

S133 [Shape calculation process (A)]: The shape calculation unit 98 calculates $\alpha$ by expression (41) in shape calculation process (A).

S134: The shape calculation unit 98 calculates $d_1$ and $d_2$ by expression (42).

S135, S136 and S137 [Shape calculation process (B)]: On determining that $u_{11}=0$ in S123 and S124, the shape calculation unit 98 determines $\alpha=\pi/2$ ($u_{21}<0$) or $\alpha=3\pi/2$ ($u_{21}>0$), for calculating $d_1$ and $d_2$ by expression (43).

S138, S139 and S140 [Shape calculation process (C)]: On determining $u_{21}=0$ in S123, the shape calculation unit 98 determines $\alpha=0$ ($u_{11}>0$) or $\alpha=\pi$ ($u_{11}<0$) for calculating $d_1$ and $d_2$ by expression (44).

S125 and S126: The shape calculation unit 98 calculates $u_1$, $u_2$, $v_1$ and $v_2$, based on $d_1$, $d_2$ and $\alpha$ obtained in shape calculation processes (A), (B) and (C), and sends to the feature point position reconstruction unit 89 $u_{12}$, $u_{22}$, $v_{12}$ and $v_{22}$ obtained in S137.

Thereafter, the feature point position reconstruction unit 89 executes its processes shown as S88, S89 and S90 in FIG. 38.

Although the second embodiment illustrates a method for obtaining the movement and shape of an object, there are cases in which the shape of an object is given in advance. In such a case, it is possible to obtain rotation matrix R expressing the rotation of a moving object from a first instant in time to a second instant in time by calculating the coordinate positions ($x_{ij}$, $y_{ij}$ and $z_{ij}$) of three [3] feature points other than the coordinate origin captured at two [2] instants in time from expressions (13) and (14).

$$R = \begin{bmatrix} x_{21} & x_{22} & x_{23} \\ y_{21} & y_{22} & y_{23} \\ z_{21} & z_{22} & z_{23} \end{bmatrix} \begin{bmatrix} x_{11} & x_{12} & x_{13} \\ y_{11} & y_{12} & y_{13} \\ z_{11} & z_{12} & z_{13} \end{bmatrix}^{-1} \quad (47)$$

where $$\begin{bmatrix} x_{ij} \\ y_{ij} \\ z_{ij} \end{bmatrix}$$

represents the coordinate value of a j-th feature point at an i-th instant in time (i=1, 2; j=1, 2, 3)

Although this invention aims at calculating both the movement and shape of an object based on image data obtained by one [1] image input unit, the above method is effective when the rotation of an object only is obtained with one [1] image input unit while the shape of an object is recognized by triangulation with two [2] image input unit.

In the second embodiment, d is not required just for obtaining the three-dimensional coordinate position of a feature point. However, because d is effective as a parameter expressing a feature point, d is calculated by expression (15) after h is obtained. That is, d is calculated by the following expression and stored in the feature point position storage unit 89.

$$d = \{x_{ij}^2 + (y_{ij} - h \cos PSI)^2 / \sin^2 PSI\}^{\frac{1}{2}}$$

So far, the second embodiment has been explained, in which a moving body recognition apparatus recognizes the shape and movement of a moving body by using the result of recognizing the depression angle PSI explained in the first embodiment.

A Third Embodiment

A third embodiment describes a moving body recognition apparatus, which presents a system of recognizing the shape and movement of a moving body based on the result of recognizing the depression angle PSI, which is different from the second embodiment.

The third embodiment is for recognizing the shape and movement of a moving body by calculating the virtual rotation of a moving body when the axis of rotation of the moving body falls virtually on the Y axis, except when the axis of rotation and the Y axis forms an angle of $\pi/2$, i.e. when the Z axis representing the optical direction of the television camera matches the direction of the axis of rotation.

Figure 47:
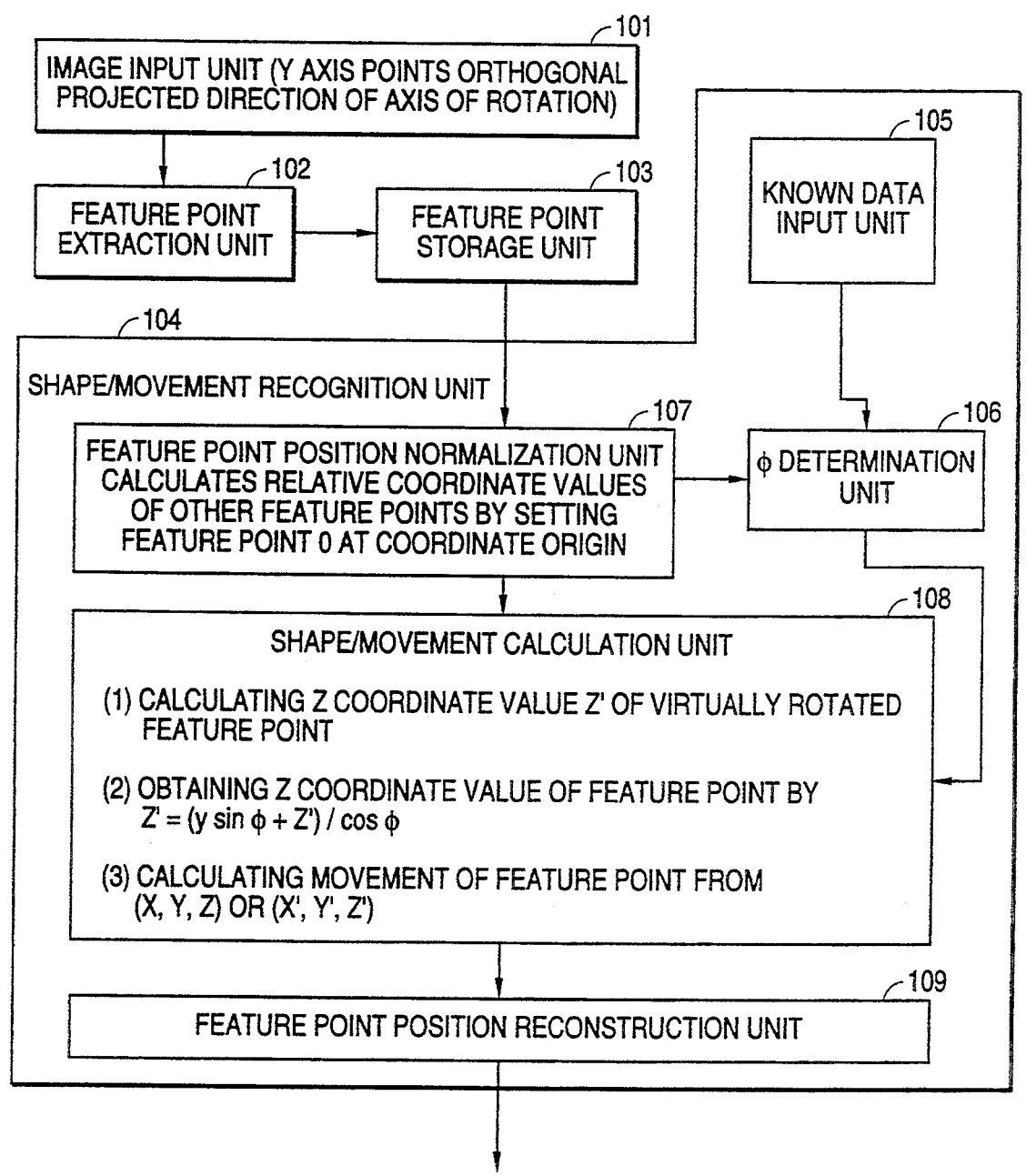
FIG. 47 is a block diagram showing a basic setup of a third embodiment.

FIG. 47 is a block diagram showing basic setup of a third embodiment.

The concept of an image input in the third embodiment is similar to that for the first embodiment shown in FIG. 5. Also, the method for calculating the depression angle PSI is similar to that shown in FIGS. 6 and 7. However, in the third embodiment, although of feature points 0 and 1, feature point 0 falling on the coordinate origin is the same, feature point 1 rotates by −PSI around the X axis. After the shape and movement (virtual rotation) of the moving body is recognized for the rotated position, the coordinate position of feature point is reconstructed back to the original one, thereby finalizing the actual shape and movement of a moving body.

Figure 48:
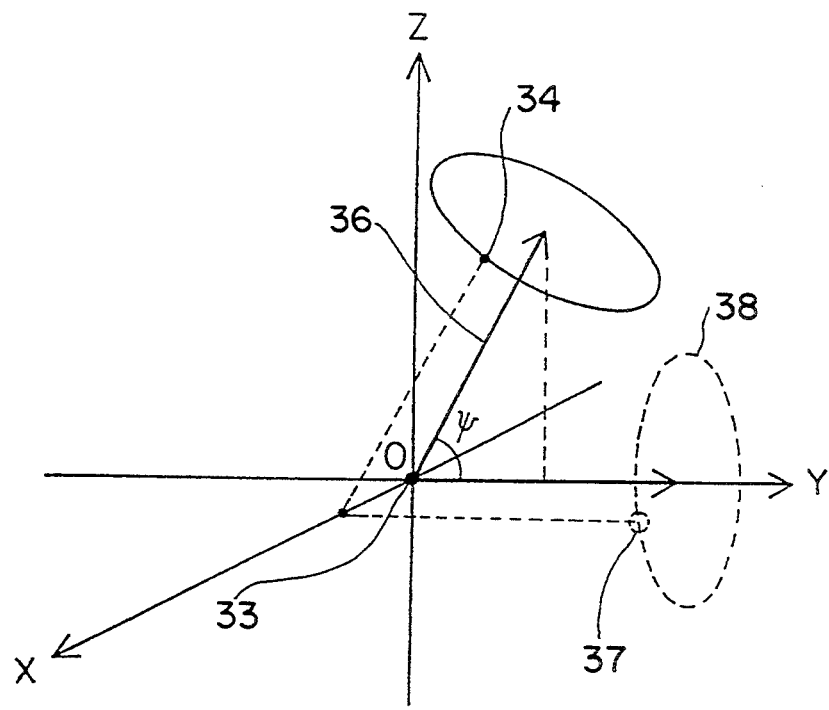
FIG. 48 is an explanatory chart illustrating the principle of recognizing a shape and movement for use in the third embodiment.

FIG. 48 is an explanatory chart illustrating the principle of recognizing a shape and movement for use in the third embodiment.

Figure 49:
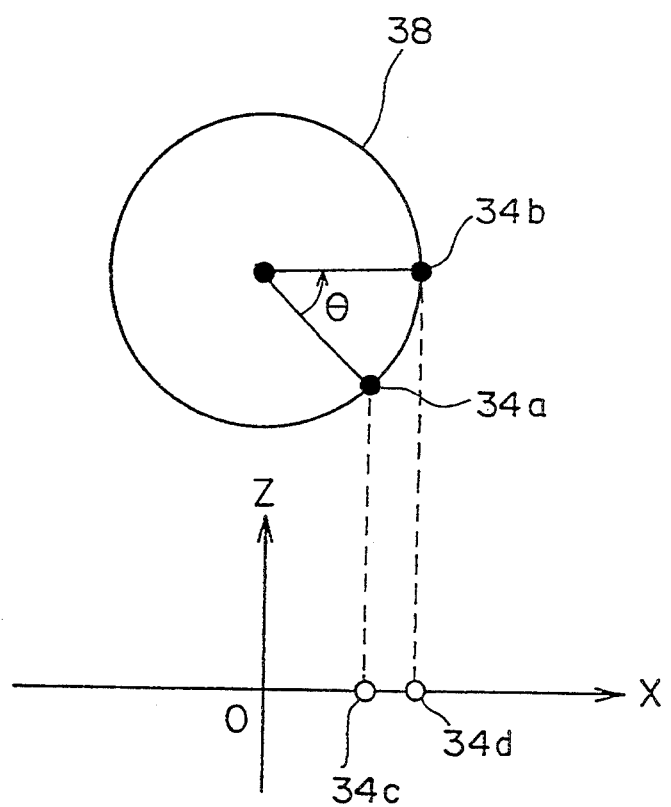
FIG. 49 is an explanatory chart illustrating a rotation of feature point 1 in case of a virtual rotation.

FIG. 49 is an explanatory chart illustrating a rotation of feature point in case of a virtual rotation.

FIGS. 48 and 49 are referred to in explaining the operations of respective functional blocks shown in FIG. 47.

The XY plane represents an observation plane (image capturing plane). The Z axis is perpendicular to the XY plane and matches the direction of the optical axis of an image capturing device, such as a television camera.

33 is feature point 0, which is set as the coordinate origin 0. 34 is feature point 1 (x, y, z). 37 is a virtual feature point 1 (x', y', z') obtained by rotating feature point 1 (x, y, z) by −PSI on a plane perpendicular to the X axis (on a plane parallel to the YZ plane), where PSI is a depression angle formed between the Y axis and the axis of rotation 36 of feature point 34. 36 is an axis of rotation of feature point 34. 38 is a virtual plane of rotation of feature point 34 around the axis of rotation 36, and represents the rotation of the virtual feature point 37 obtained by rotating the axis of rotation 36 by −PSI parallel to the YZ plane.

In this case, the relations between the coordinate positions of feature point 34 and the virtual feature point 37 are as follows.

$x' = x$ $y' = y \cos PSI + z \sin PSI$ $z' = -y \sin PSI + z \cos PSI$

FIG. 49, to be specific, shows the rotation of feature point 134 on the XZ plane for illustrating a virtual rotation shown in FIG. 48. Feature point 1 34 rotates around an axis of rotation parallel to the Y axis on the virtual plane of rotation 38. 34c and 34d respectively represent the orthogonal projections on the X axis of feature point positions 34a and 34b at first and second instants in time.

The following is a description of the principle of recognizing the shape and movement of a moving object in the third embodiment, for each of the different methods of calculating the size of the depression angle PSI and amount of rotation θ (referred to below as movement). Some of the following description overlaps the explanation of the principle for the second embodiment for convenience sake.

(A) Recognition of the shape of an object when cos PSI±0.

Because x'=x, the virtual rotation does not change the x coordinate value of feature point 34. Therefore, z coordinate value z' after the virtual rotation can be obtained from the coordinate value observed in the direction of the X axis on the image capturing plane by applying to the virtually rotated state shown in FIG. 49 the method (disclosed in an earlier application) of recognizing the shape and movement of an object when PSI=n π as explained in the second embodiment. Additionally, when cos PSI±0 (i.e. PSI±π/2+n π, where n is an integer), because $$z=(y \sin PSI+z')/\cos PSI \quad (48)$$

derived from the above set of equations, (since y is known because it is the coordinate value in the direction of the Y axis of the image capturing plane) the actual z coordinate value of the feature point can be obtained from z'. Therefore, the three-dimensional coordinate position (x, y, z) can be obtained from the virtual rotation.

Also, because the virtual rotation of a feature point is the same as the actual rotation of a feature point, the movement of a feature point on an actual plane can be obtained from its movement (rotation) on the virtual plane of rotation 38.

(B) Recognition of the shape of an object when cos PSI=0.

When cos PSI=0, (i.e. when PSI=π/2+n π), because the movement of an object is parallel to the orthogonally projecting plane, the shape of an object (the z coordinate value) cannot be recognized.

(C) Recognition of the movement (rotation) of an object when cos PSI=0.

Defining an angle formed between the vectors representing feature point at first and second instants in time as θ, $$\cos \theta = (x_1 x_2 + y_1 y_2)/(x_i^2 + y_i^2) \quad (i=1 \text{ or } 2) \quad (49)$$

$$\sin \theta = (X_1 y_2 - x_2 y_1)/(x_i^2 + y_i^2)(i=1 \text{ or } 2) \quad (50)$$

From these relations, when $(xi^2 + y_i^2) \pm 0$, rotation θ can be obtained. Here, $(x_i, y_1, z_i)$ represents the coordinate position of a feature point at i-th point in time.

(D) Recognition of the movement (rotation) of an object when cos PSI±0.

By applying to a virtual rotation the method of recognizing the moving body when PSI=n π, which is explained in the second embodiment, the rotation of an object on the actual plane of rotation can be obtained. (Here, when PSI=n π, the shape is obtained after calculating the rotation.)

(E) Recognition of the movement (rotation) of an object when cos PSI±0.

The rotation of an object can be obtained by expressions (51) and (52) after calculating the shape of an object.

$$\cos \theta = (x_1 x_2 + z_1' z_2')/x_i^2 + z_i'^2)(i=1 \text{ or } 2) \quad (51)$$

$$\sin \theta = (x_1 z_2' - x_2 z_1')/(x_i^2 + z_i'^2)(i=2 \text{ or } 2) \quad (52)$$

The angle of rotation θ can be obtained from these relations.

(F) Recognition of the movement (rotation) of an object when cos PSI=0.

As with the case of (E), the rotation of an object can be obtained after the shape is obtained by the following expression.

After obtaining z from the coordinate values z' of three [3] feature points at two [2] instants in time, when the determinant of the matrix composed of the coordinate values of three [3] feature points is not zero [0], rotation matrix R expressing the rotation of a moving body can be expressed as follows.

$$R = \begin{bmatrix} x_{21} & x_{22} & x_{23} \\ y_{21} & y_{22} & y_{23} \\ z_{21} & z_{22} & z_{23} \end{bmatrix} \begin{bmatrix} x_{11} & x_{12} & x_{13} \\ y_{11} & y_{12} & y_{13} \\ z_{11} & z_{12} & z_{13} \end{bmatrix}^{-1} \quad (53)$$

where $$\begin{bmatrix} x_{ij} \\ y_{ij} \\ z_{ij} \end{bmatrix}$$

represents the coordinate value of a j-th feature point at an i-th instant in time (i=1, 2; j=1, 2, 3)

By performing the above matrix operation, the rotation of an object can be obtained.

The above can be summarized as theorem 5.

[Theorem 5]

Observe on an orthogonally projecting plane a known moving body whose axis of rotation does not change. The axis of rotation is not perpendicular to the orthogonally projecting plane. That is, PSI±π/2+n π. At this time, if a normalized rotational object (virtual rotation) can be recognized, the actual rotation of a moving body can be recognized.

The two [2] moving body has the same rotation. The z coordinate value of a feature point (x, y, z) of a moving body can be obtained as $$z=(y \sin PSI+z')/\cos PSI$$

where z' is the z coordinate value of the normalized rotational object.

In the third embodiment, based on theorem 5, the shape and movement of an object are obtained from an image captured at a position obliquely looking down an object as shown in FIG. 5.

Returning to FIG. 47, the basic setup of a third embodiment of this invention is explained.

101 is an image input unit whose image capturing plane is the XY plane, where the X axis is set parallel to the plane on which the object moves. (That is, the orthogonal projection of the axis of rotation of a feature point points to the direction of the X axis.) 102 is a feature point extraction unit. 103 is a feature point storage unit. 104 is a shape/movement recognition unit for recognizing the position and movement of a feature point. 105 is a known data input unit for inputting the known data of an object. 106 is a PSI determination unit for determining PSI. 107 is a feature point position normalization unit for normalizing the coordinate position of a feature point by calculating the relative coordinate values of other feature points when one [1] of plural feature points is set at the coordinate origin. 108 is a shape/movement calculation unit for calculating the z coordinate value z' of a virtually rotated feature point, and for obtaining the actual z coordinate value of a feature point, thereby calculating the shape and movement of a feature point.

109 is a feature point position reconstruction unit for reconstructing the three-dimensional coordinate position and movement of a feature point, based on the actual on-screen coordinate values of a feature point set as the coordinate origin in the process by the feature point position normalization unit 107 and the movements and positions of other feature points obtained by the shape/movement calculation unit 108.

Although the above configuration assumes that the known data input unit 105 has received the depression angle PSI as a part of known data, PSI can be obtained from the two-dimensional coordinate value (x, y) on the image capturing plane.

The operations of functional blocks shown in FIG. 47 are explained below.

The image input unit 101 captures the image of an object. The feature point extraction unit 102 extracts a feature point from the captured image. The feature point storage unit 103 stores the on-screen coordinate value of an extracted feature point.

The known data input unit 105 retains depression angle PSI formed between the Y axis in the image inputted from the image input unit 101 and the axis of rotation of an object e.g. obtained by a sensor (not shown).

The feature point position normalization unit 107 obtains the relative coordinate values of other feature points by setting feature point 0 on the coordinate origin. The PSI determination unit 106 determines the size of PSI inputted from the known data input unit 105 or obtains PSI from the coordinate values of feature points captured on the image capturing screen.

(1) The shape/movement calculation unit 108 obtains the z coordinate values z' in a virtual rotation and the rotation, by assuming that the object rotates virtually around the Y axis.

Alternatively, the shape/movement calculation unit 108 may obtain the rotation from z' based on expressions (51) and (52) presented above. In addition, the shape/movement calculation unit 108 may obtain the rotation from the matrix operation by expression (53).

(2) The shape/movement calculation unit 108 calculates the z coordinate value z of an object in an actual rotation from z' obtained in (1), the on-screen y coordinate value y of a feature point y and known data on PSI in the known data input unit 104 by using the following expression:

$$z = (y \sin PSI + z')/\cos PSI \qquad (48)$$

The feature point position reconstruction unit 109 reconstructs the actual position of a feature point from the on-screen coordinate value of feature point 0 and the coordinate positions (normalized coordinate values (x, y, z) and movement (angle of rotation $\theta$) of feature points relative to feature point 0.

(3) The shape/movement calculation unit 108 may obtain the rotation by any of expressions (51), (52) and (53) when the rotation is calculated after the shape is obtained.

This concludes the explanation of the principle of recognition and the basic setup of the third embodiment. The following is a more detailed explanation of the third embodiment. The moving body recognition apparatus in the third embodiment of this invention has a configuration similar to that in the second embodiment shown in FIG. 17, except for the detailed configuration of the shape/movement recognition unit 74. Thus, redundant parts are not explained.

Figure 50:
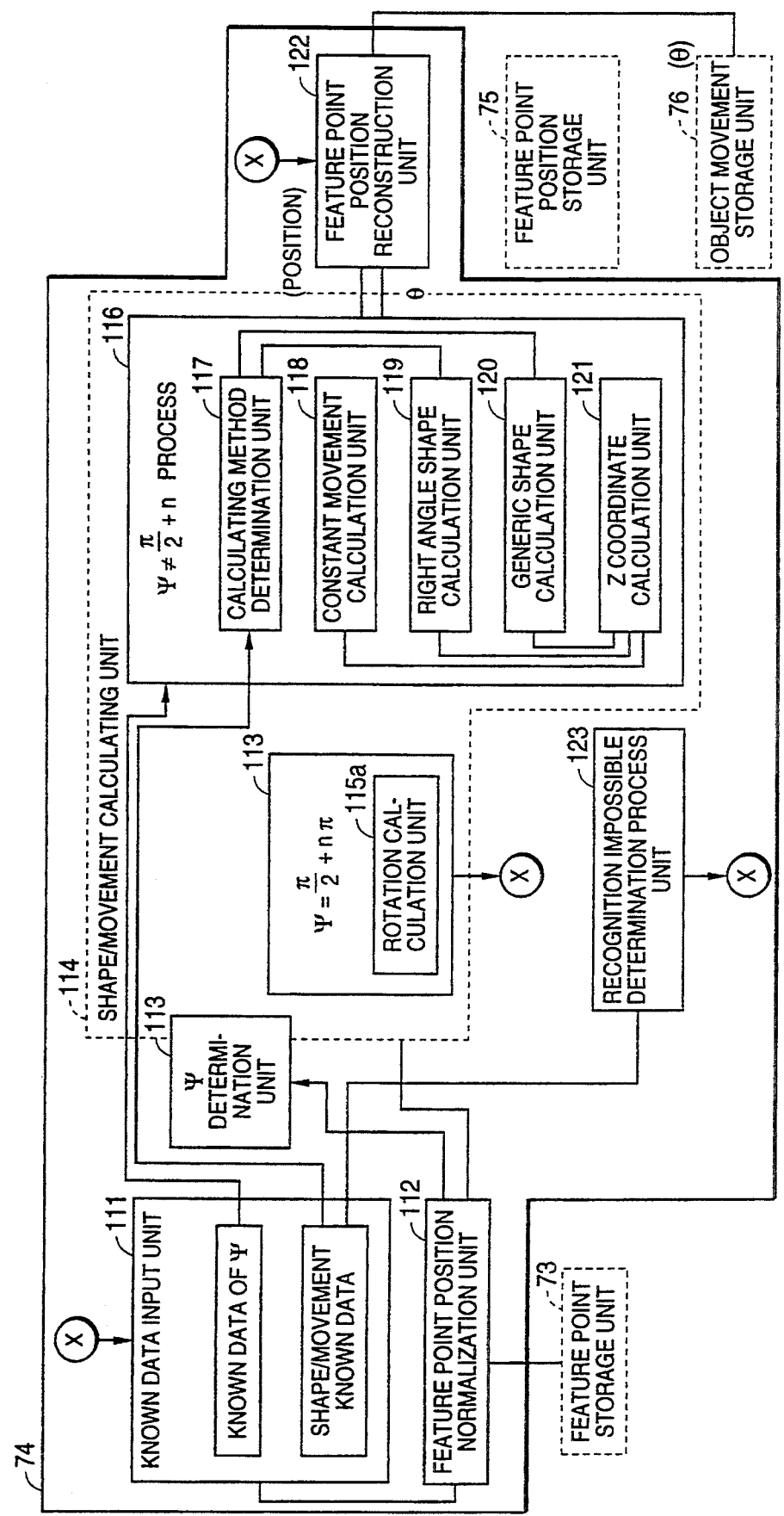
FIG. 50 shows a configuration of a shape/movement recognition unit pursuant to the third embodiment.

FIG. 50 shows a configuration of a shape/movement recognition unit pursuant to the third embodiment.

74 is a shape/movement recognition unit. 111 is a known data input unit for storing known data on PSI, shape and movement (generic shape, constant movement, right angle shape, etc.), which are set in advance e.g. by a sensor detection.

112 is a feature point position normalization unit. 73 is a feature point storage unit. 113 is a PSI determination unit. 114 is a shape/movement calculation unit. 115 is a process unit when PSI = $\pi/2$ + n $\pi$ (i.e. when cos PSI = 0). 115a is a rotation calculation unit when cos PSI = 0. 116 is a process unit when PSI $\pm \pi/2$ + n $\pi$ (i.e. when cos PSI $\pm$ 0). 118 is a calculation unit for a constant movement case. 119 is a calculation unit for a right angle shape case. 120 is a calculation unit for a generic shape case. 121 is a z coordinate value calculation unit for calculating the z coordinate value based on the z coordinate value obtained from the virtual rotation. 122 is a feature point position reconstruction unit. 75 is a feature point position storage unit. 76 is an object movement storage unit. 123 is a recognition impossible determination unit.

Figure 51:
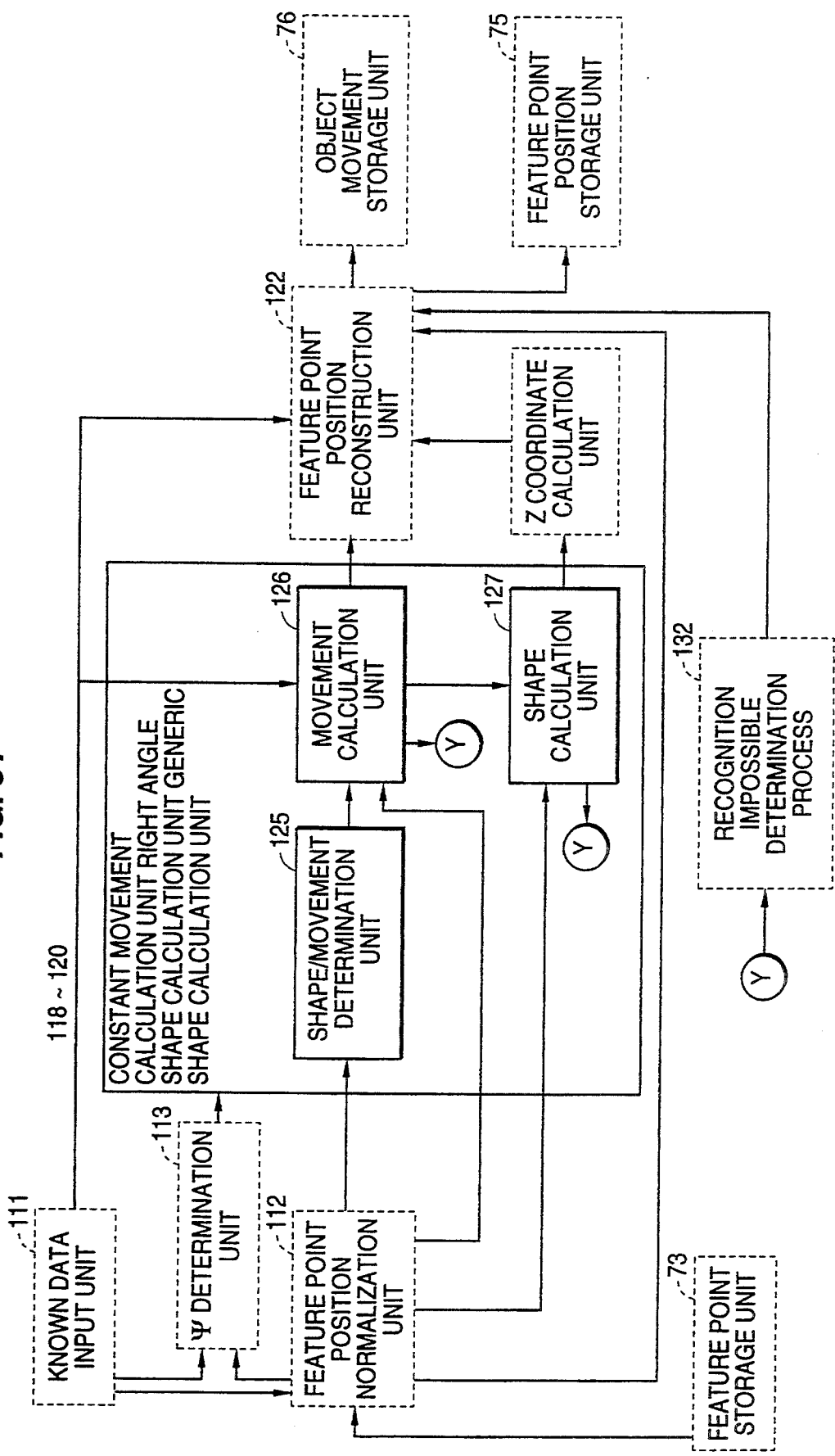
FIG. 51 shows configurations of a constant movement calculation unit, a right angle shape calculation unit and a generic shape calculation unit pursuant to the third embodiment.

FIG. 51 shows configurations of a constant movement calculation unit, a right angle shape calculation unit and a generic shape calculation unit pursuant to the third embodiment.

As with the configuration of shape/recognition unit 74 in the second embodiment shown in FIG. 34, three [3] calculation units overlap.

73 is a feature point storage unit. 76 is an object movement storage unit. 75 is a feature point position storage unit. 118, 119 and 120 are a constant movement calculation unit, a right angle shape calculation unit and a generic shape calculation unit, for calculating the shape and movement, respectively when feature points move constantly, when three feature points form a right angle and when the shape is generic. 111 is a known data input unit. 112 is a feature point position normalization unit. 125 is a shape/movement determination unit for determining the computability of the shape and movement. 126 is a movement calculation unit for obtaining the rotation of a feature point. 127 is a shape calculation unit for obtaining the three-dimensional position of a feature point. 122 is a feature point position reconstruction unit. 121 is a z coordinate value calculation unit.

The calculation mode determination unit 117 activates any of the calculation units 118, 119 and 120 depending whether or not the known data input unit 111 has the following pieces of information about the shape and movement.

(A) The movement (rotation) of an object is constant.

(B) The shape has a right angle.

The calculation mode determination unit 117 activates the constant movement calculation unit 118 when piece of information (A) is available, the right angle shape calculation unit 119 when piece of information (B) is available, and the generic shape calculation unit when neither piece of information (A) nor piece of information (B) is available.

When PSI $\pm \pi/2$ + n $\pi$, depending on the result of determination by the calculation mode determination unit 117 shown in FIG. 50, the constant movement calculation unit 118, the right angle shape calculation unit 119 or the generic shape calculation unit 120 recognizes the shape and movement of a virtually rotated object.

The method is essentially the same as that when PSI=n π in the second embodiment. Therefore, they are not explained again. The explanation of the following flowcharts also uses the geometrical conditions (determinant conditions) and formulae for calculating coordinate values used in the description of the second embodiment.

Figure 52:
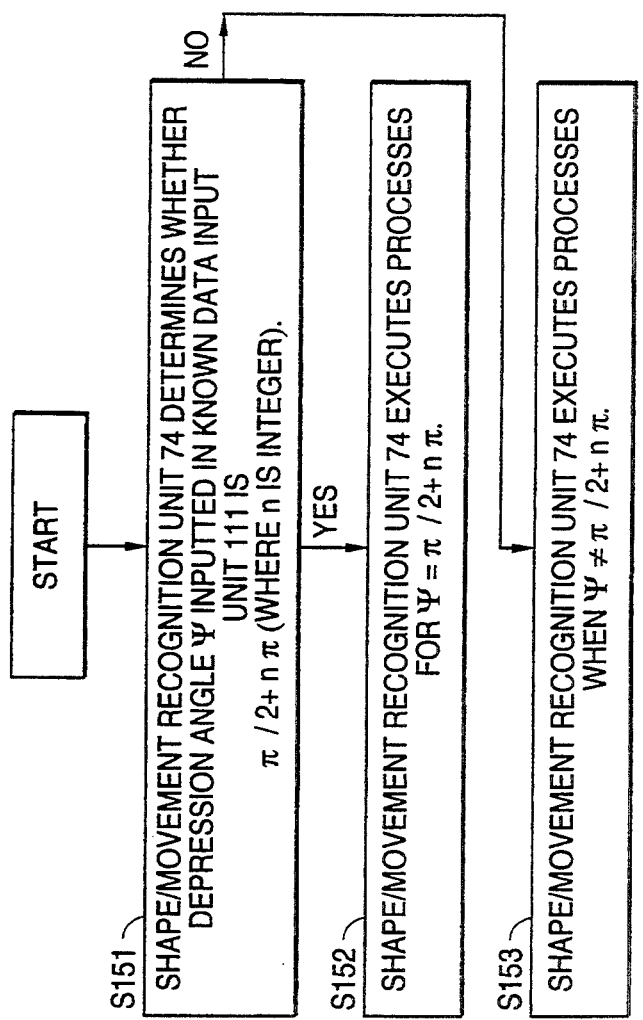
FIG. 52 is a first flowchart of processes executed by a shape/movement recognition unit pursuant to the third embodiment.

FIG. 52 is a first flowchart of processes executed by a shape/movement recognition unit pursuant to the third embodiment.

Figure 53:
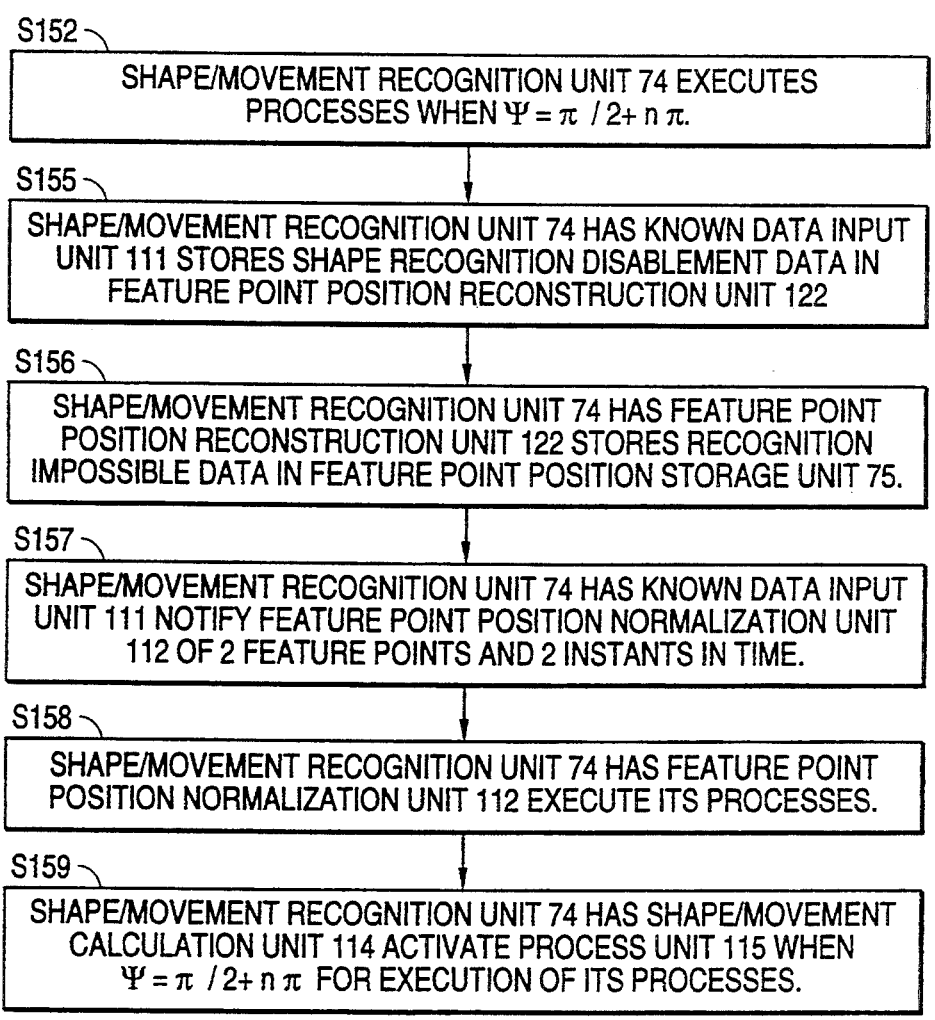
FIG. 53 is a second flowchart of processes executed by a shape/movement recognition unit pursuant to the third embodiment.

FIG. 53 is a second flowchart of processes executed by a shape/movement recognition unit pursuant to the third embodiment.

Figure 54:
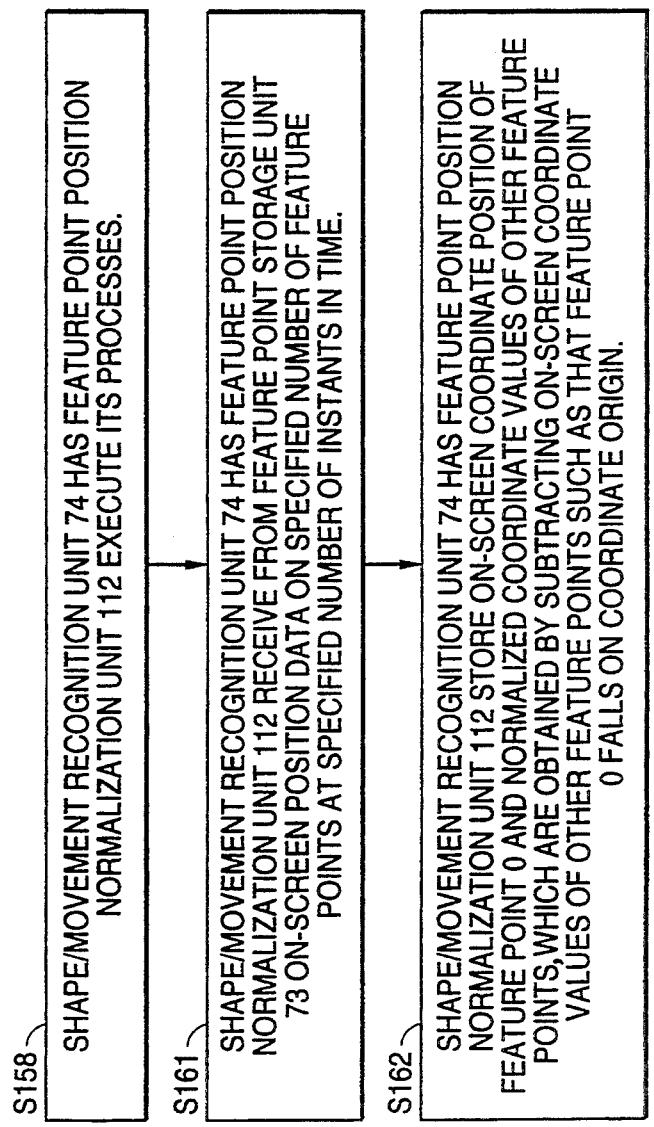
FIG. 54 is a third flowchart of processes executed by a shape/movement recognition unit pursuant to the third embodiment.

FIG. 54 is a third flowchart of processes executed by a shape/movement recognition unit pursuant to the third embodiment.

Figure 55:
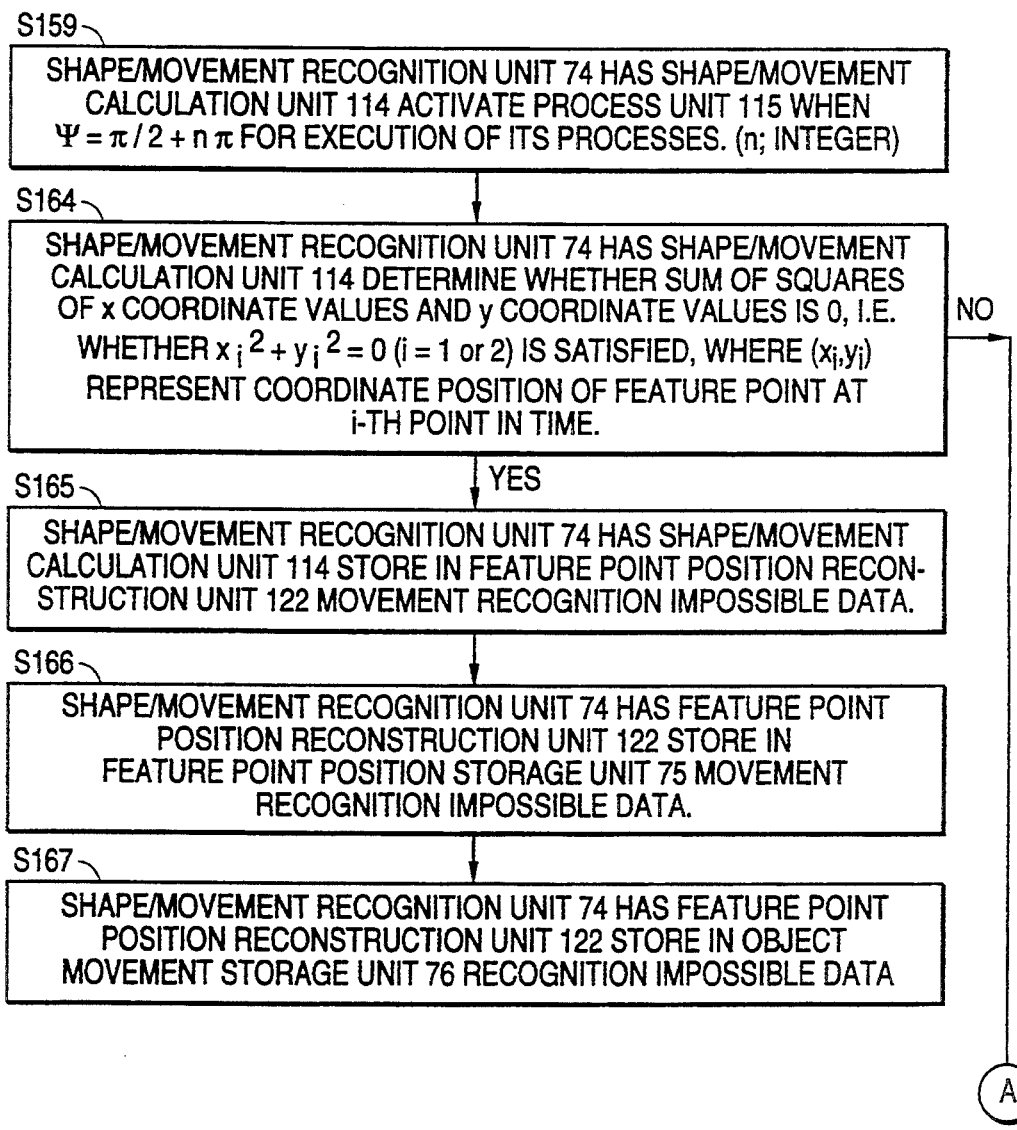
FIG. 55 is a fourth flowchart of processes executed by a shape/movement recognition unit pursuant to the third embodiment.

FIG. 55 is a fourth flowchart of processes executed by a shape/movement recognition unit pursuant to the third embodiment.

Figure 56:
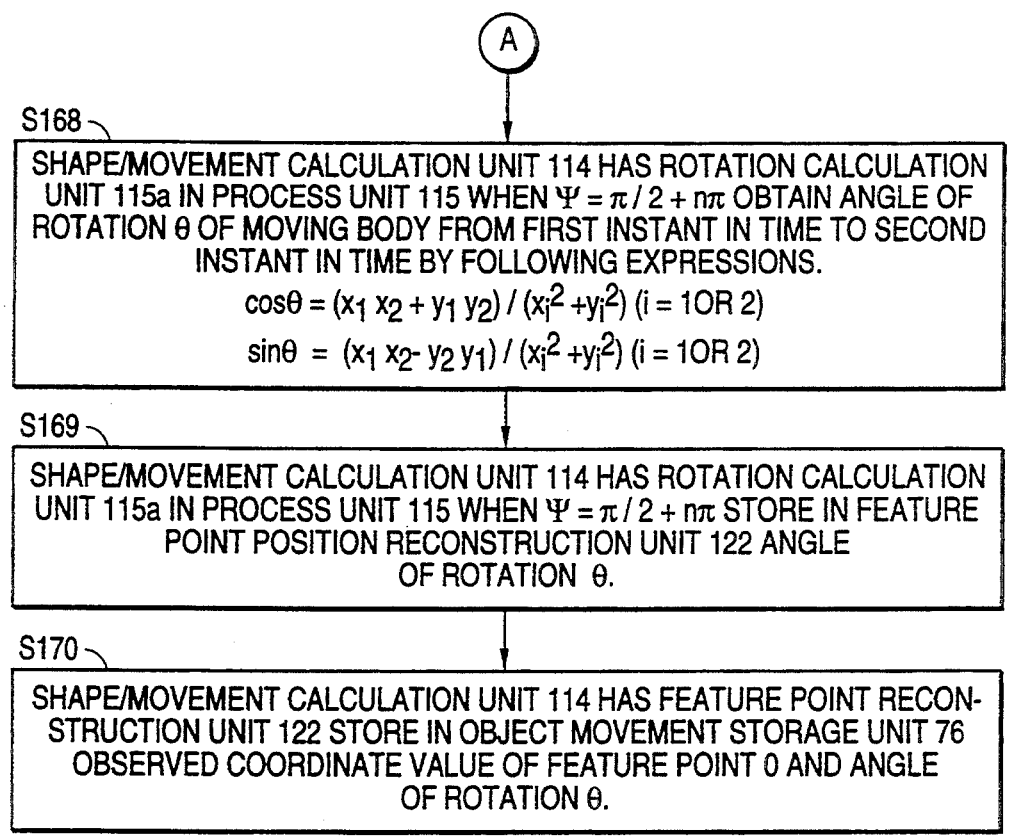
FIG. 56 is a fifth flowchart of processes executed by a shape/movement recognition unit pursuant to the third embodiment.

FIG. 56 is a fifth flowchart of processes executed by a shape/movement recognition unit pursuant to the third embodiment.

Figure 57:
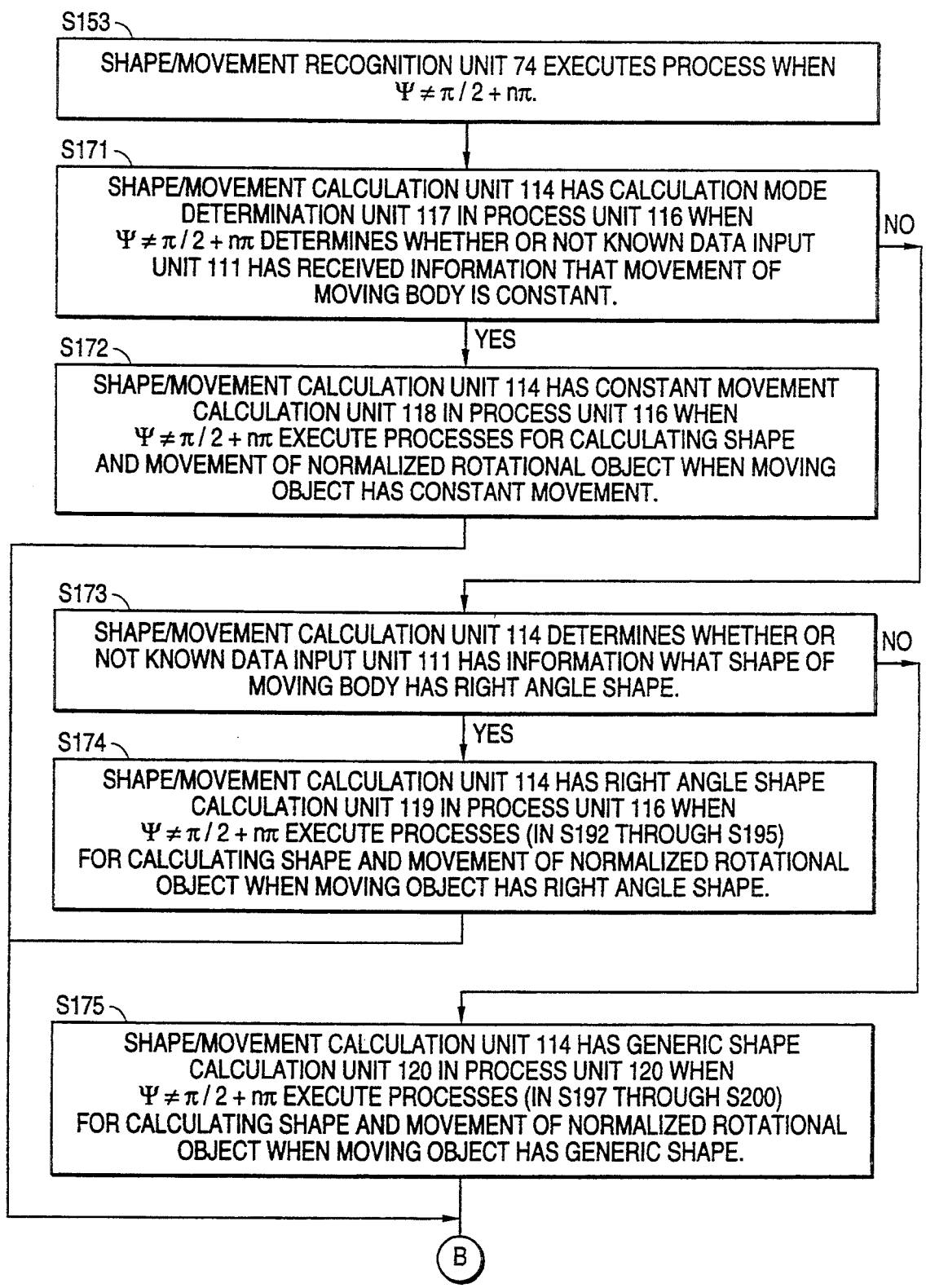
FIG. 57 is a sixth flowchart of processes executed by a shape/movement recognition unit pursuant to the third embodiment.

FIG. 57 is a sixth flowchart of processes executed by a shape/movement recognition unit pursuant to the third embodiment.

Figure 58:
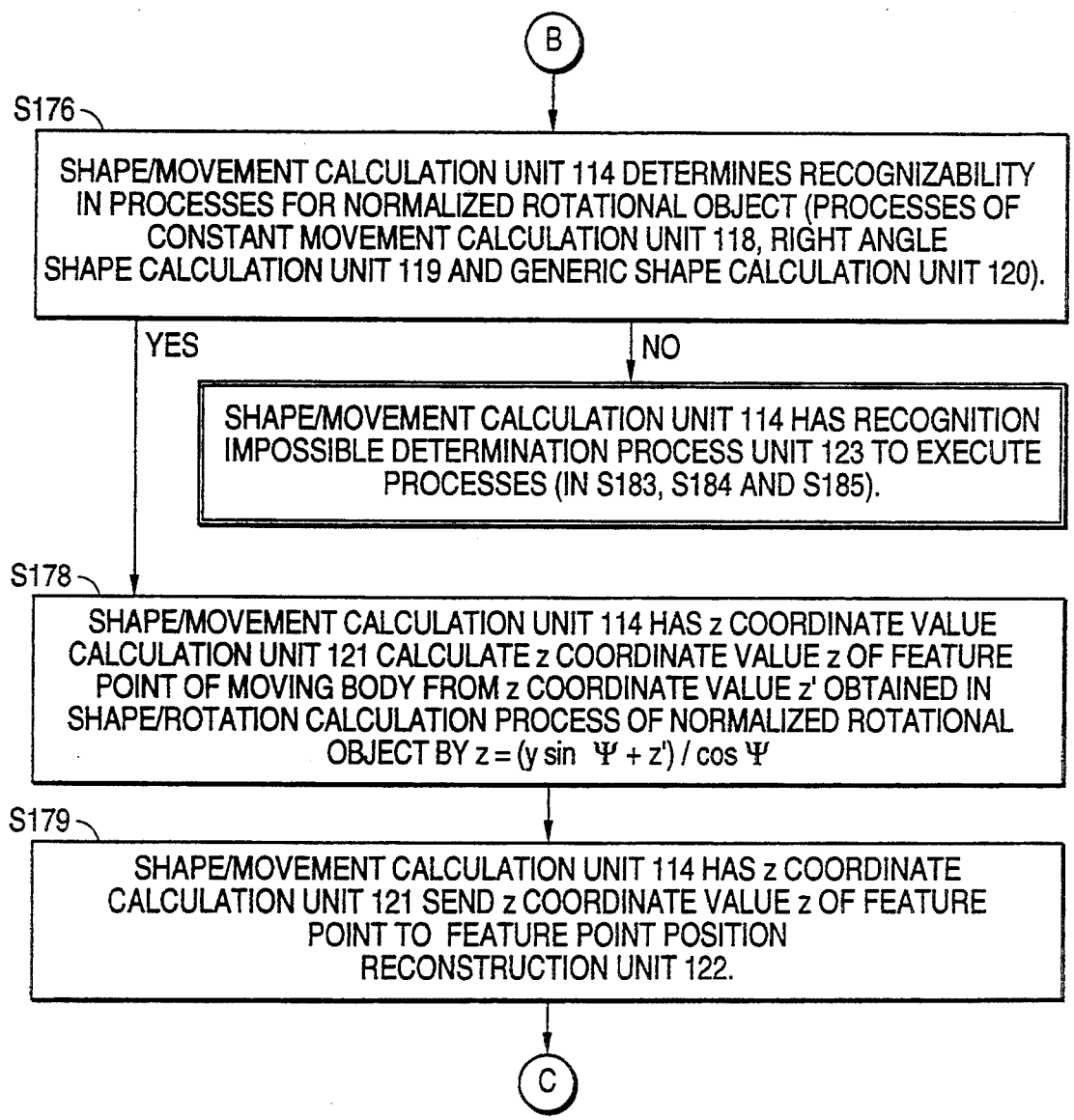
FIG. 58 is a seventh flowchart of processes executed by a shape/movement recognition unit pursuant to the third embodiment.

FIG. 58 is a seventh flowchart of processes executed by a shape/movement recognition unit pursuant to the third embodiment.

Figure 59:
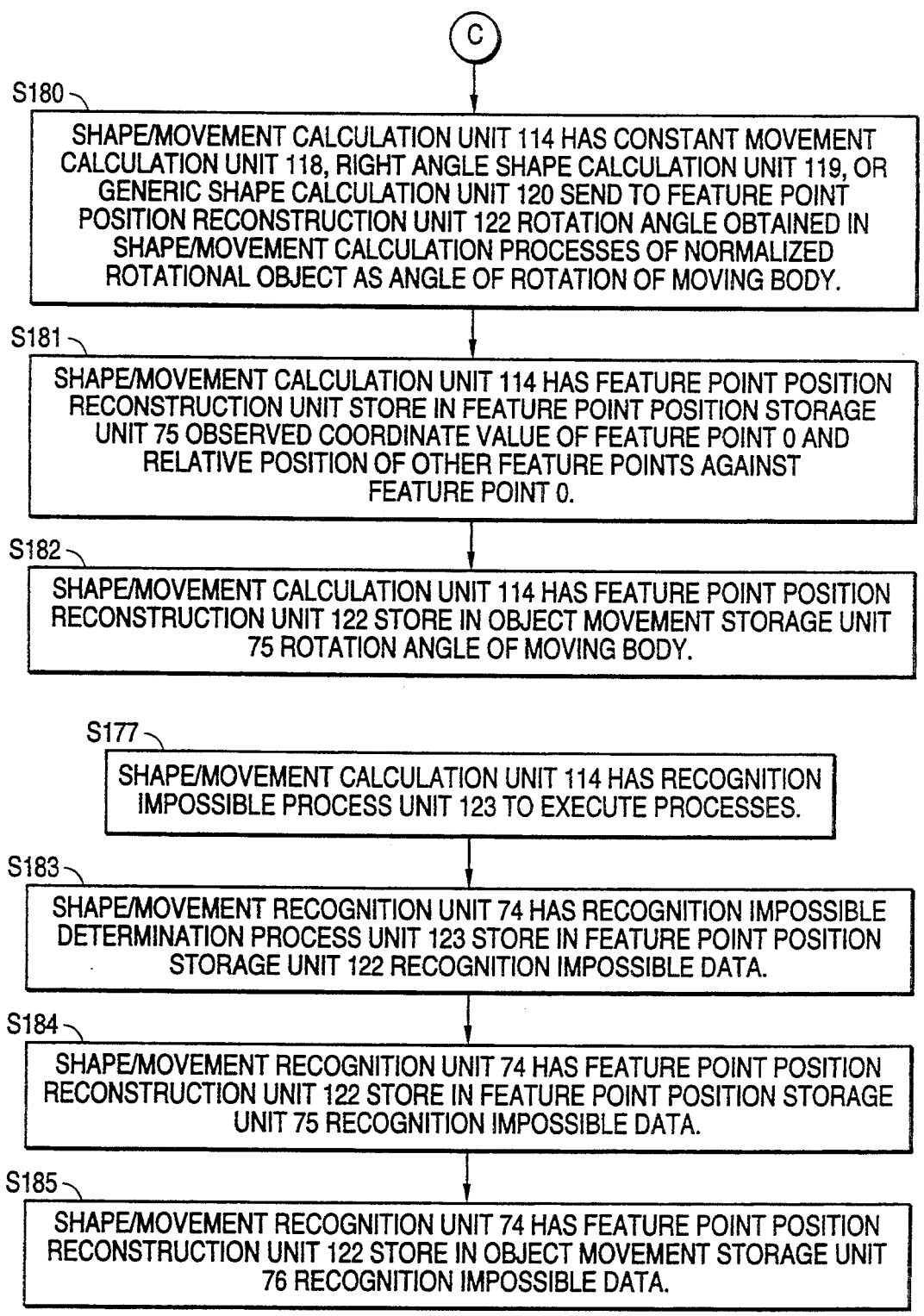
FIG. 59 is an eighth flowchart of processes executed by a shape/movement recognition unit pursuant to the third embodiment.

FIG. 59 is an eighth flowchart of processes executed by a shape/movement recognition unit pursuant to the third embodiment.

Figure 60:
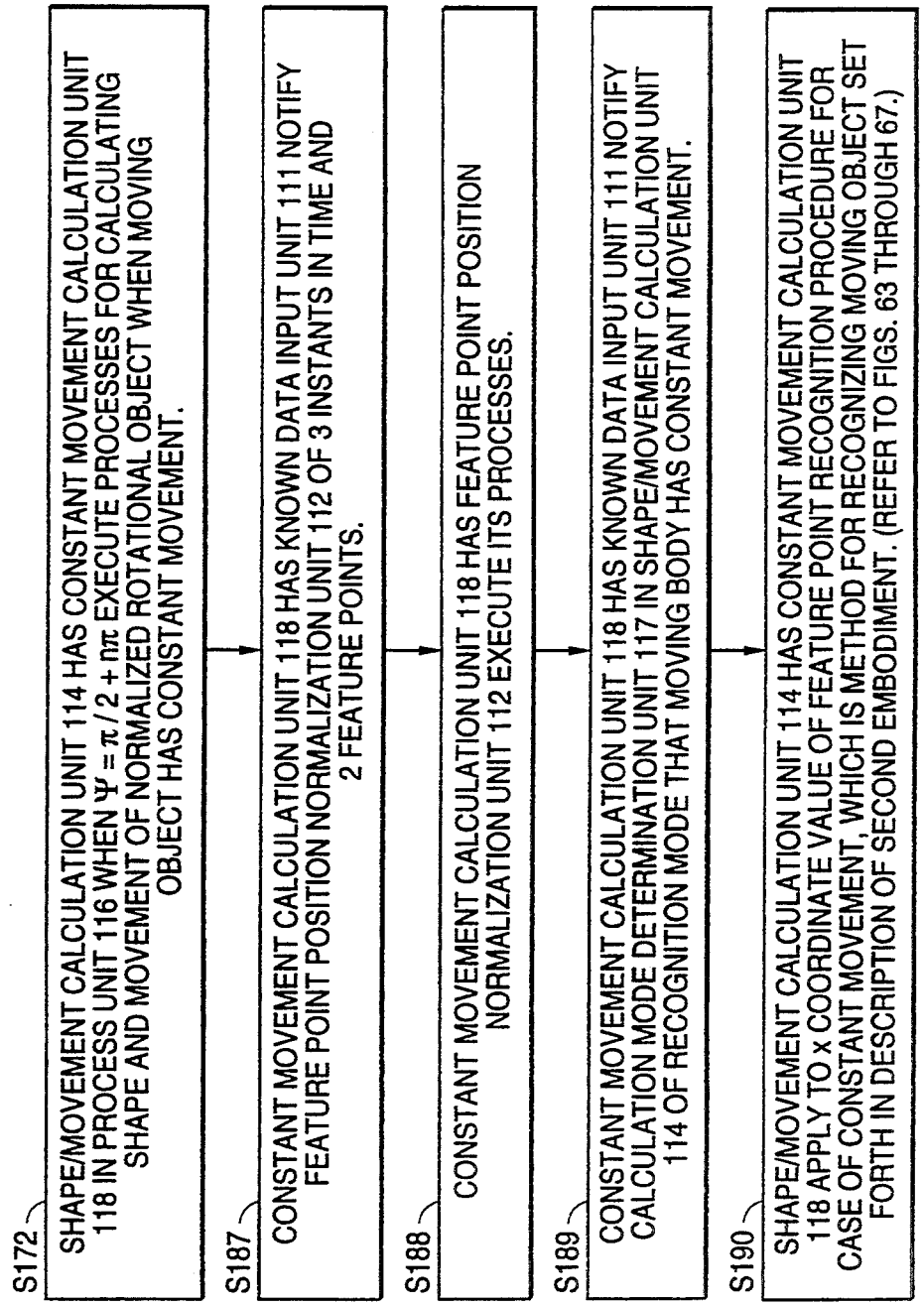
FIG. 60 is a ninth flowchart of processes executed by a shape/movement recognition unit pursuant to the third embodiment.

FIG. 60 is a ninth flowchart of processes executed by a shape/movement recognition unit pursuant to the third embodiment.

Figure 61:
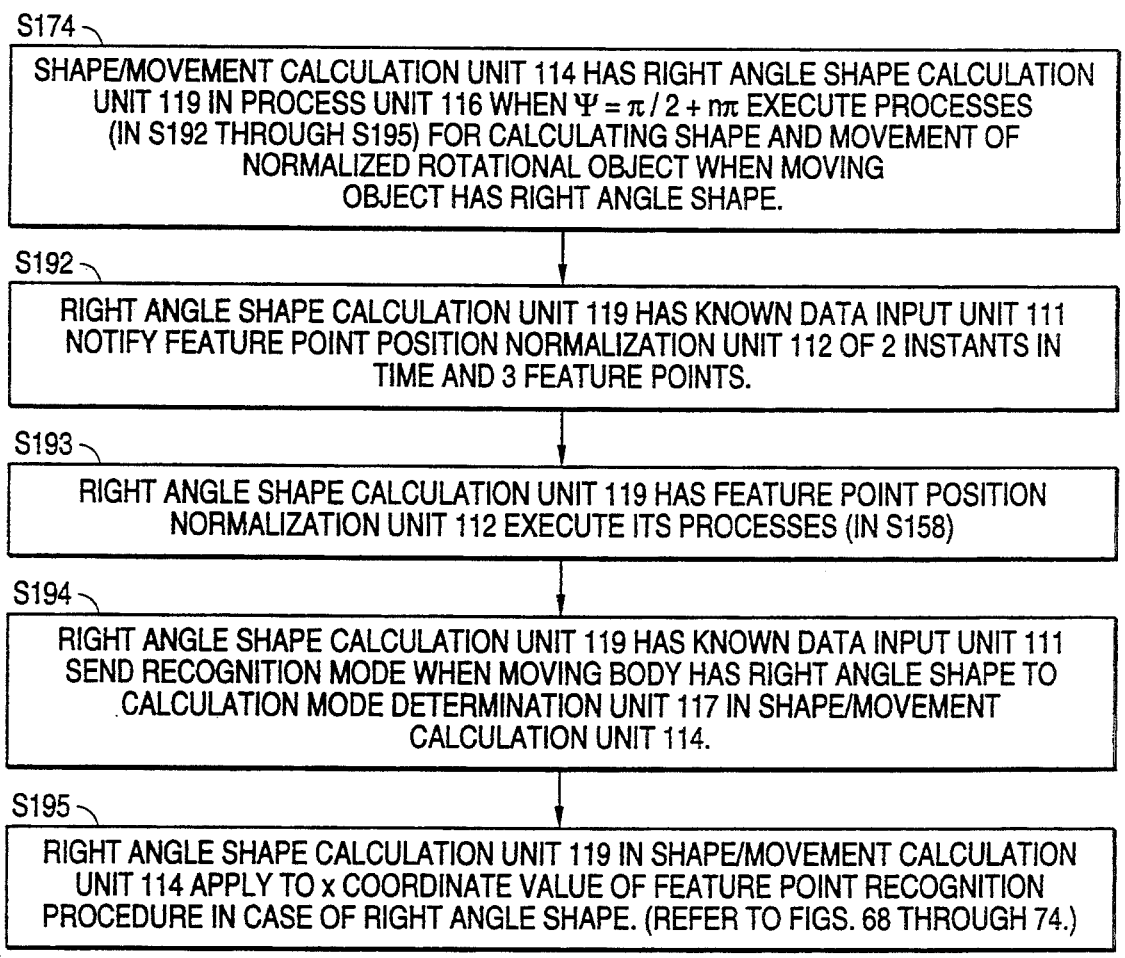
FIG. 61 is a tenth flowchart of processes executed by a shape/movement recognition unit pursuant to the third embodiment.

FIG. 61 is a tenth flowchart of processes executed by a shape/movement recognition unit pursuant to the third embodiment.

Figure 62:
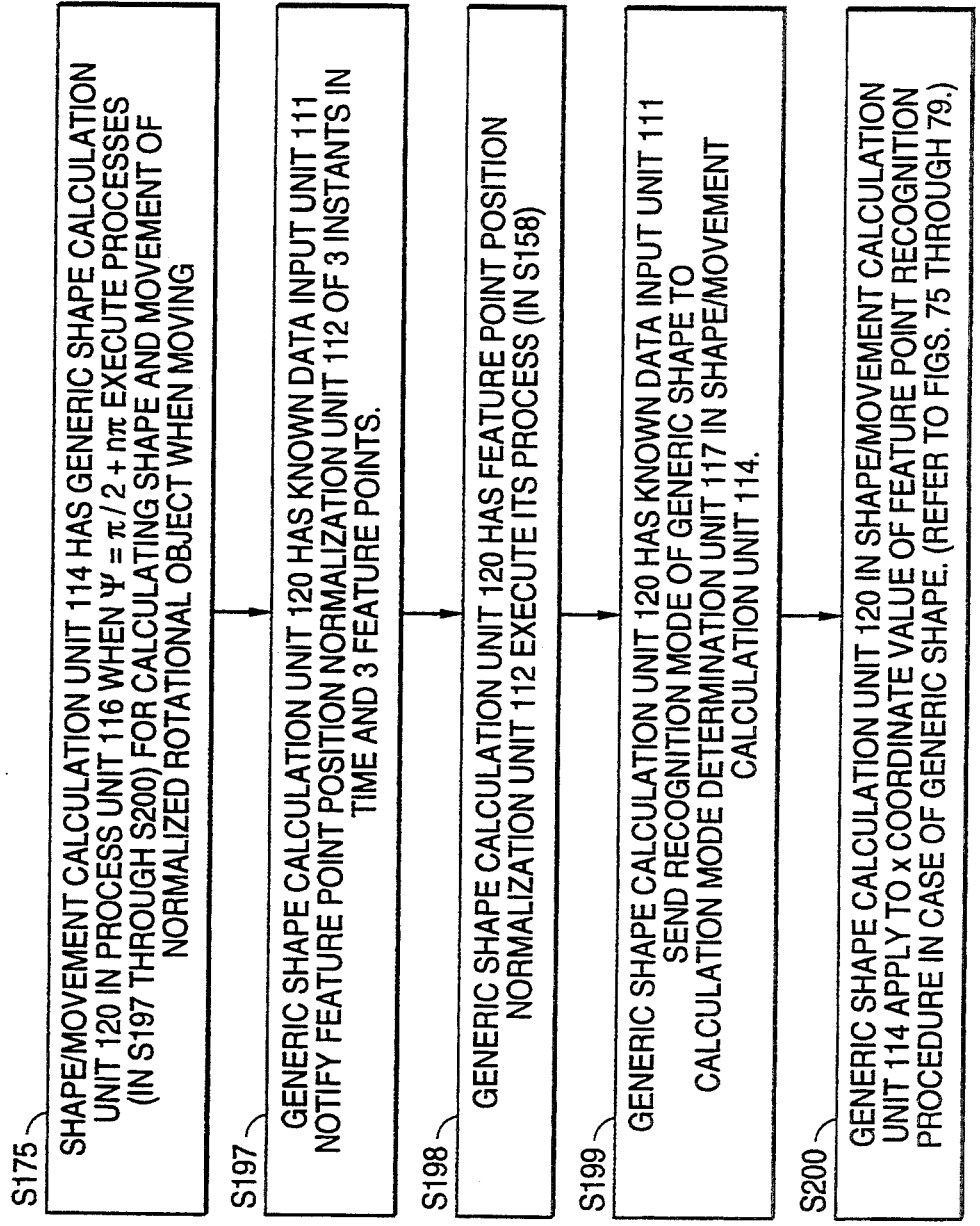
FIG. 62 is an eleventh flowchart of processes executed by a shape/movement recognition unit pursuant to the third embodiment.

FIG. 62 is an eleventh flowchart of processes executed by a shape/movement recognition unit pursuant to the third embodiment.

Operations of the shape/movement recognition unit 74 of the third embodiment are set out according to the step numbers shown in FIGS. 52 through 62. (Refer to FIG. 50 as necessary.)

S151, S152 and S153: The shape/movement recognition unit 74 determines whether PSI inputted in the known data input unit 111 is $\pi/2+n\pi$ (where n is an integer). A positive determination invokes processes of PSI=$\pi/2+n\pi$. A negative determination invokes processes of PSI$\pm\pi/2+n\pi$.

S155, S156 and S157: The shape/movement recognition unit 74 has the known data input unit 111 store in the feature point position storage unit 75 information that the shape of an object cannot be recognized. Further, the shape/movement recognition unit 74 has the known data input unit 111 notify the feature point position normalization unit 112 of two [2] feature points (the minimum condition necessary for recognizing the shape and movement) captured at two [2] instants in time.

S158: The shape/movement recognition unit 74 has the feature point position normalization unit 112 invoke its processes in S161 and S162.

S159: The shape/movement recognition unit 74 has the shape/movement calculation unit 114 execute its processes, thereby invoking processes in S164 through S170 by the process unit 115 when PSI=$\pi/2+n\pi$. [Processes by the feature point position normalization unit 112]

S161 and S162: The feature point position normalization unit 112 receives from the feature point storage unit 73 the on-screen position data on the specified number of feature points at the specified number of instants in time.

The feature point position normalization unit 112 stores the on-screen coordinate position of feature point 1 and the normalized coordinate positions of other feature points, which are obtained by subtracting the on-screen coordinate value of feature point 0 from the on-screen coordinate position of other feature points such that feature point 0 falls on the coordinate origin. [Processes by the shape/movement calculation unit 114]

S164 through S167: When PSI=$\pi/2+n\pi$, the shape/movement calculation unit 114 has the process unit 115 for PSI=$\pi/2+n\pi$ execute its processes.

S164: The shape/movement calculation unit 114 determines whether the sum of the squares of the x coordinate values and Y coordinate values is zero [0]. That is, the shape/movement calculation unit 114 determines whether $x_i^2+y_i^2=0$ (i=1 or 2) is satisfied or not.

On determining the dissatisfaction of $x_i^2+y_i^2=0$, the shape/movement calculation unit 114 causes the rotation calculation unit 115a to perform processes in S168, 169 and 170.

On determining the satisfaction of $x_i^2+y_i^2 \neq 0$, the shape/movement calculation unit 114 stores in the feature point position reconstruction unit 122 information that the movement cannot be recognized. (That is, the shape/movement calculation unit 114 has the process unit 115 PSI=$\pi/2+n\pi$ notify the recognition impossible determination unit 123 of information that a moving object cannot be recognized. Then, the recognition impossible determination unit 123 stores in the feature point position reconstruction unit 122 information that a moving object cannot be recognized.)

S166 and S167: The feature point position reconstruction unit 122 stores in the feature point position storage unit 75 and the object movement storage unit 76 information that the movement cannot be recognized.

S168, S169 and S170: The shape/movement calculation unit 114 has the rotation calculation unit 115a in the process unit 115 when PSI=$\pi/2+n\pi$ obtain a rotation.

S168: The shape/movement calculation unit 114 has the rotation calculation unit 115a in the process unit 115 when PSI=$\pi/2+n\pi$ obtain the angle of rotation θ of a moving body from the first instant in time to the second instant in time by the following expressions.

$$\cos\theta = (x_1x_2 + y_1y_2)/(x_i^2 + y_i^2)(i=1 \text{ or } 2)$$

$$\sin\theta = (x_1y_2 - x_2y_1)/(x_i^2 + y_i^2)(i=1 \text{ or } 2)$$

S169: The shape/movement calculation unit 114 has the rotation calculation unit 115a in the process unit 115 when PSI=$\pi/2+n\pi$ store in the feature point position reconstruction unit 122 the angle of rotation θ.

S170: The shape/movement calculation unit 114 has the feature point reconstruction unit 122 store in the object movement storage unit 76 the observed coordinate value of feature point 0 in the angle of rotation θ.

S171 and thereafter are processes when PSI$\pm\pi/2+n\pi$, where n is an integer.

S171: The shape/movement calculation unit 114 has the calculation mode determination unit 117 in the process unit 116 when PSI$\pm\pi/2+n\pi$ determine whether or not the known data input unit 111 has received information that the movement of a moving body is constant. A positive determination (i.e. a case in which the movement of a moving body is constant) invokes S172. A negative determination (i.e. a case in which the movement of a moving body is not constant) invokes S173.

S172: The shape/movement calculation unit 114 has the constant movement calculation unit 118 in the process unit 116 when PSI±π/2+n π perform processes in S187 through S190 for calculating the shape and movement of a normalized rotational object when the moving object has a constant movement.

S173: The shape/movement calculation unit 114 determines whether or not the known data input unit 111 has information that the shape of a moving body has a right angle shape. A positive determination (i.e. a case in which the shape of a moving body has a right angle) invokes S174. A negative determination (i.e. a case in which the shape of a moving body does not have a right angle) invokes S175.

S174: The shape/movement calculation unit 114 has the right angle shape calculation unit 119 in the process unit 116 when PSI±π/2+n π execute processes in S192 through S195 for calculating the shape and movement of a normalized rotational object when the moving object has a right angle shape.

S175: The shape/movement calculation unit 114 has the generic shape calculation unit 120 in the process unit 120 when PSI±/2+n π execute processes in S197 through S200 for calculating the shape and movement of a normalized rotational object when the moving object has a generic shape.

S176: The shape/movement calculation unit 114 determines the recognizability in processes for a normalized rotational object (processes of the constant movement calculation unit 118, the right angle shape calculation unit 119 and the generic shape calculation unit 120). A positive determination invokes S178. A negative determination invokes S177.

S177: The shape/movement calculation unit 114 has the recognition impossible determination unit 123 to execute processes in S183, S184 and S185.

S178: The shape/movement calculation unit 114 has the z coordinate value calculation unit 121 calculate z coordinate value z of a feature point of a moving body from z coordinate value z' obtained in the shape/rotation calculation process of the normalized rotational object by z=(y sin PSI+z')/cos PSI.

S179: The shape/movement calculation unit 114 has the z coordinate calculation unit 121 send z coordinate value z of a feature point to the feature point position reconstruction unit 122.

S180: The shape/movement calculation unit 114 has the constant movement calculation unit 118, the right angle shape calculation unit 119, the generic shape calculation unit 120 and the z coordinate value calculation unit 121 send to the feature point position reconstruction unit 122 the angle of rotation obtained in the shape/movement calculation processes (processes by the constant movement calculation unit 118, the right angle shape calculation unit 119, the generic shape calculation unit 120 and the z coordinate value calculation unit 121) of a normalized rotational object as the angle of rotation of a moving object.

S181 and S182: The shape/movement calculation unit 114 has the feature point position reconstruction unit 122 store in the feature point position storage unit 75 the observed coordinate value of feature point 0 and the relative positions of other feature points against feature point 0, and in the object movement storage unit 76 the angle of rotation of a moving body.

S183, S184 and S185: The recognition impossible determination unit 123 executes the recognition impossible process in S177.

S183: The shape/movement recognition unit 74 has the recognition impossible determination unit 123 store in the feature point position storage unit 122 information that a moving body cannot be recognized.

S184: The shape/movement recognition unit 74 has the feature point position reconstruction unit 122 store in the feature point position storage unit 75 information that a moving body cannot be recognized.

S185: The shape/movement recognition unit 74 has the feature point position reconstruction unit 122 store in the object movement storage unit 76 information that a moving body cannot be recognized.

S187 through S190 represent processes by the constant movement calculation unit 118 for calculating the shape of a normalized rotational object when a moving body has a constant movement.

S187: The constant movement calculation unit 118 has the known data input unit 111 notify the feature point position normalization unit 112 of three [3] instants in time and two [2] feature points.

S189: The constant movement calculation unit 118 has the known data input unit 111 notify the calculation mode determination unit 117 in the shape/movement calculation unit 114 of a recognition mode for a case in which the moving body has a constant movement.

S190: The shape/movement calculation unit 114 has the constant movement calculation unit 118 apply to the x coordinate value of a feature point the recognition procedure for a case of constant movement, which is a method for recognizing a moving object set forth in the description of the second embodiment. (Refer to FIGS. 63 through 67.)

S192 through S195 represent processes by the right angle shape calculation unit 119 for calculating a normalized rotational object when a moving body has a right angle shape.

S192: The right angle shape calculation unit 119 has the known data input unit 111 notify the feature point position normalization unit 112 of two [2] instants in time and three [3] feature points.

S193: The right angle shape calculation unit 119 has the feature point position normalization unit 112 execute its processes expressed as S158.

S194: The right angle shape calculation unit 119 has the known data input unit 111 send to the calculation mode determination unit 117 in the shape/movement calculation unit 114 the recognition mode for a case in which a moving body has a right angle shape.

S195: The right angle shape calculation unit 119 in the shape/movement calculation unit 114 apply to the x coordinate value of a feature point the recognition procedure for a case in which a moving body has a right angle shape, which is a method for recognizing a moving object set forth in the description of the second embodiment. (Refer to FIGS. 68 through 74.)

S197 through S200 are processes by the generic shape calculation unit 120 for calculating the shape of a normalized rotational object when a moving body has a generic shape.

S197: The generic shape calculation unit 120 has the known data input unit 111 notify the feature point position normalization unit 112 of three [3] instants in time and three [3] feature points.

S198: The generic shape calculation unit 120 has the feature point position normalization unit 112 execute its process expressed as S158.

S199: The generic shape calculation unit 120 has the known data input unit 111 send the recognition mode of a generic shape to the calculation mode determination unit 117 in the shape/movement calculation unit 114.

S200: The generic shape calculation unit 120 in the shape/movement calculation unit 114 apply to the x coordinate value of a feature point the recognition procedure for a case in which a moving body has a generic shape, which is a method for recognizing a moving object set forth in the description of the second embodiment. (Refer to FIGS. 75 through 79.)

Figure 63:
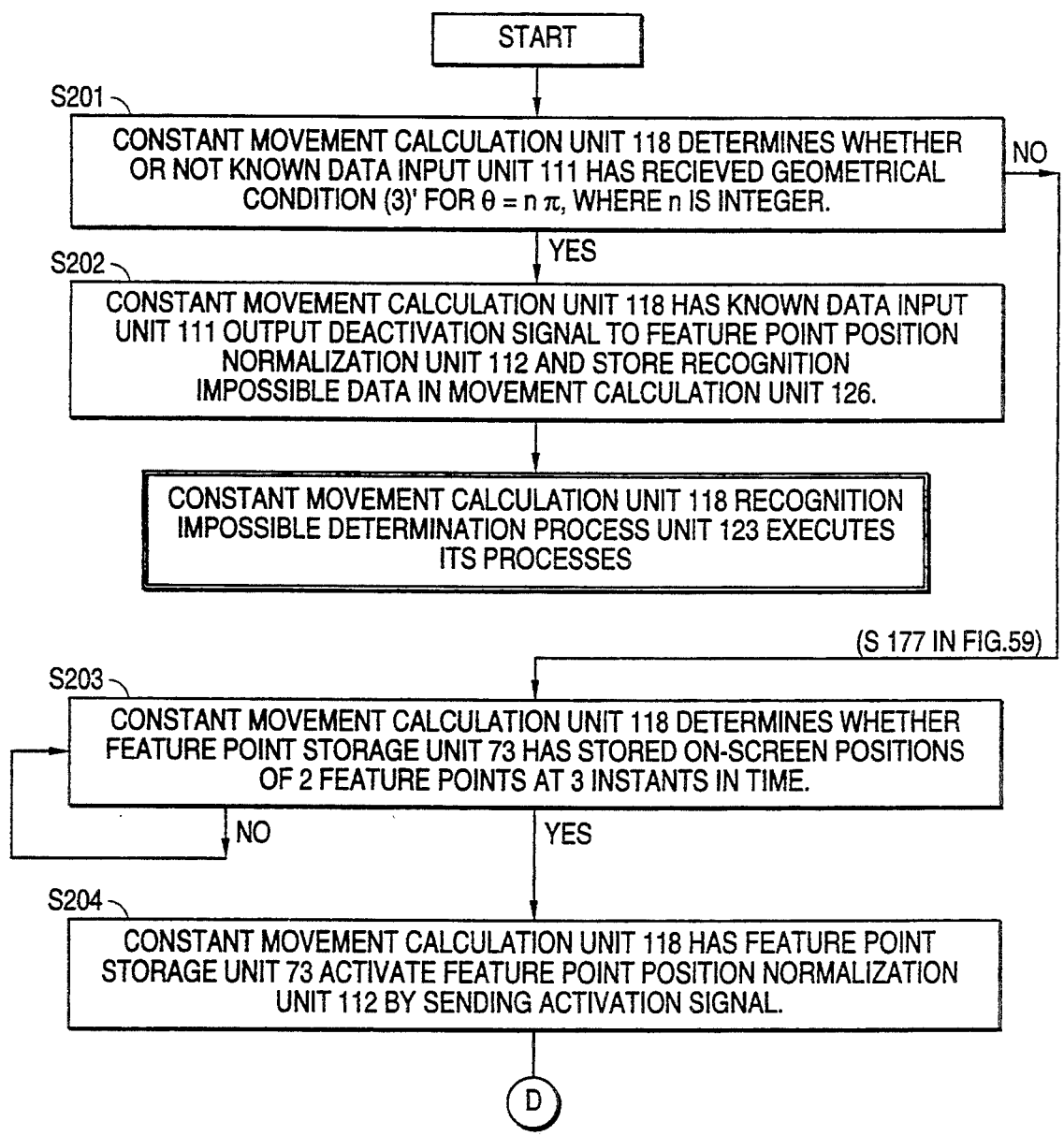
FIG. 63 is a first flowchart of processes executed by a constant movement calculation unit pursuant to the third embodiment.

FIG. 63 is a first flowchart of processes executed by a constant movement calculation unit pursuant to the third embodiment.

Figure 64:
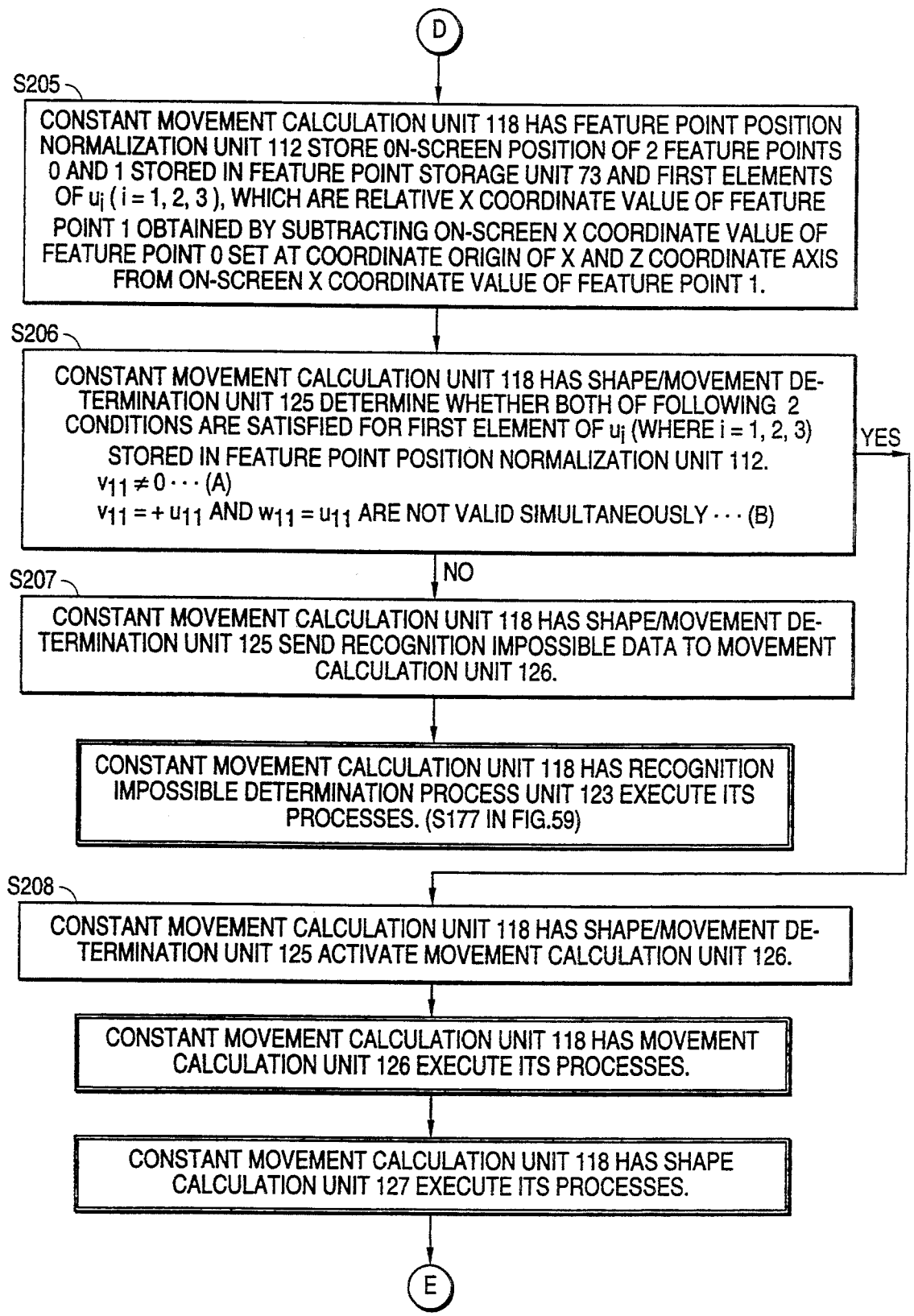
FIG. 64 is a second flowchart of processes executed by a constant movement calculation unit pursuant to the third embodiment.

FIG. 64 is a second flowchart of processes executed by a constant movement calculation unit pursuant to the third embodiment.

Figure 65:
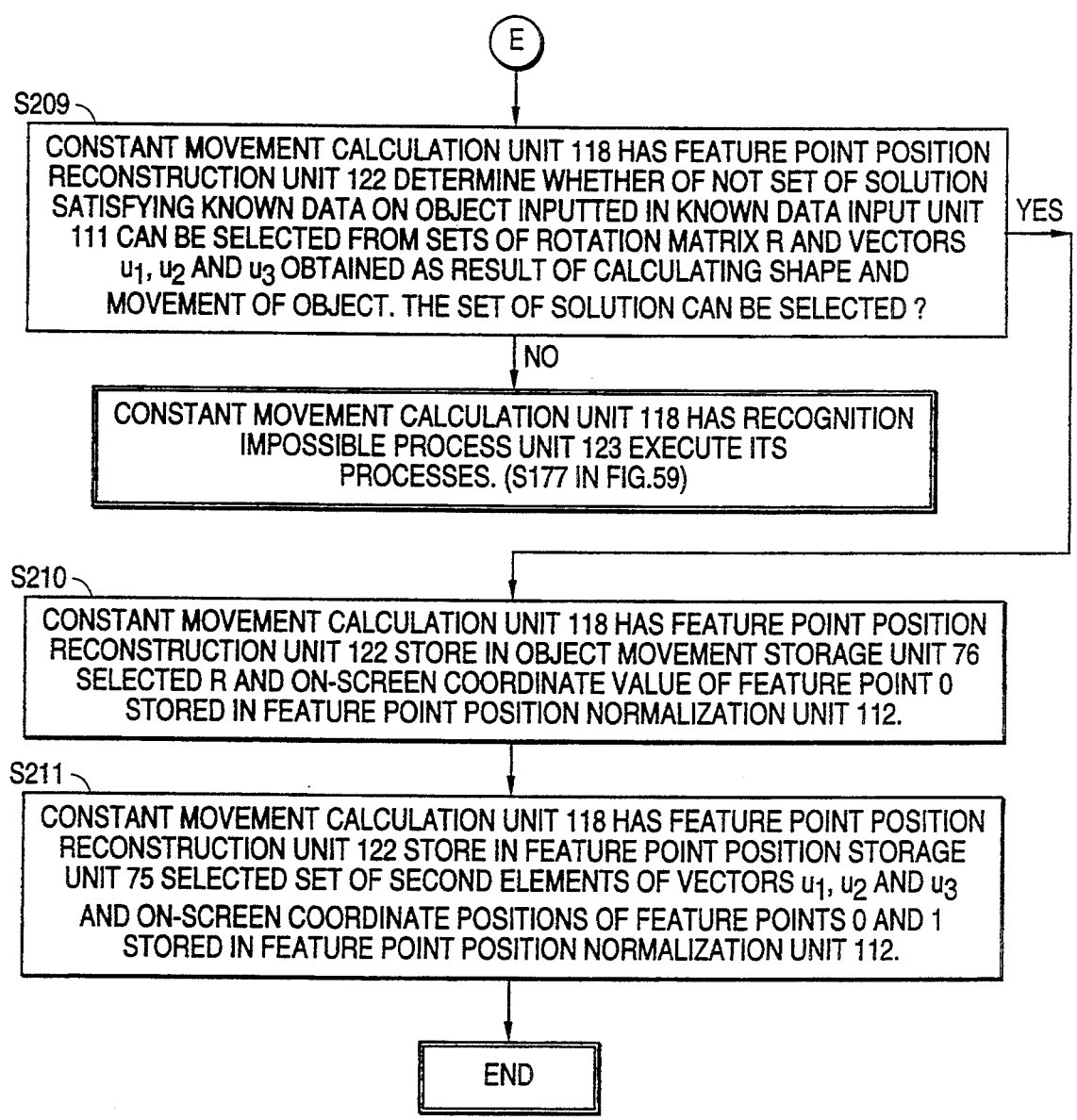
FIG. 65 is a third flowchart of processes executed by a constant movement calculation unit pursuant to the third embodiment.

FIG. 65 is a third flowchart of processes executed by a constant movement calculation unit pursuant to the third embodiment.

Figure 66:
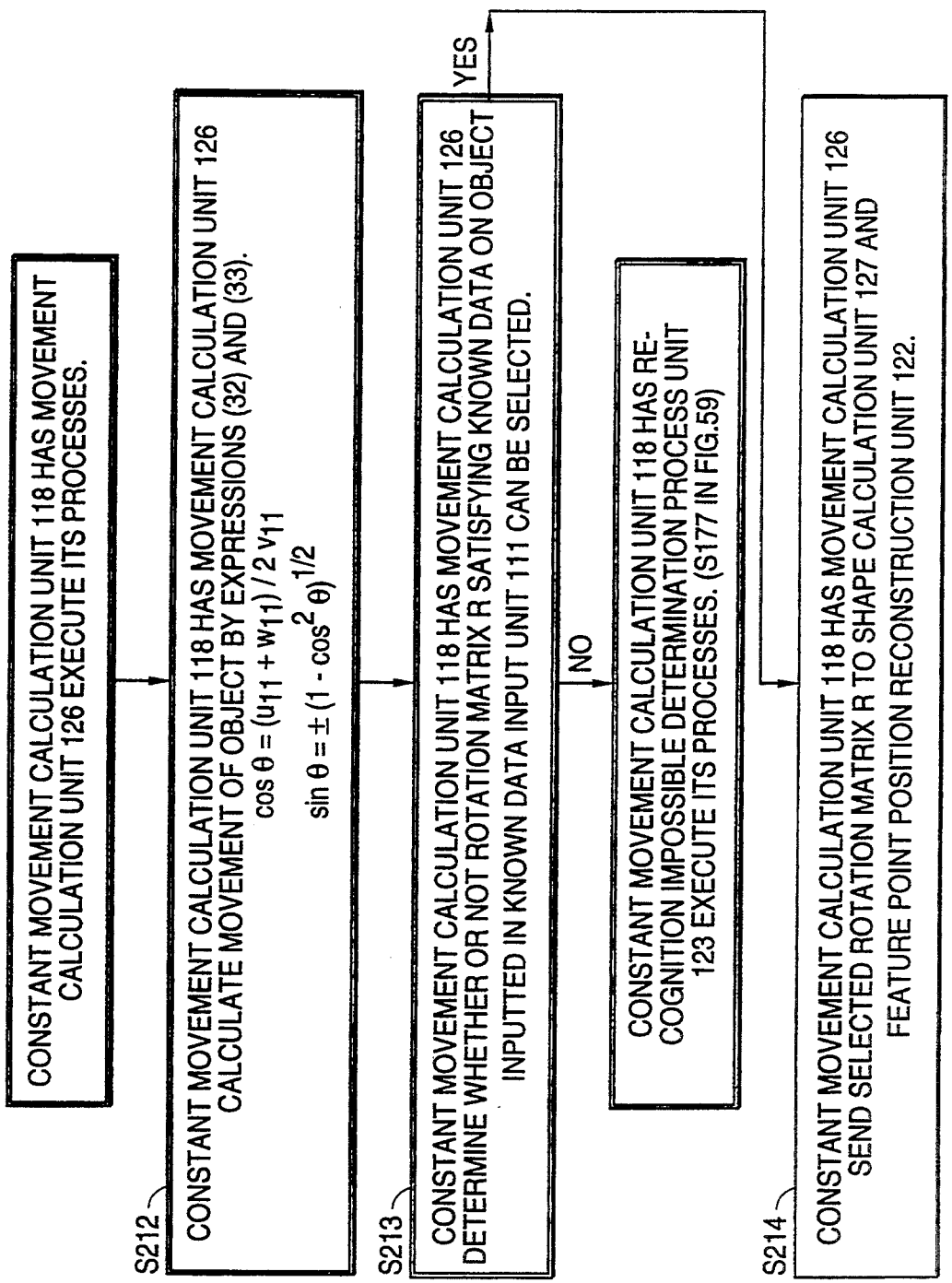
FIG. 66 is a fourth flowchart of processes executed by a constant movement calculation unit pursuant to the third embodiment.

FIG. 66 is a fourth flowchart of processes executed by a constant movement calculation unit pursuant to the third embodiment.

Figure 67:
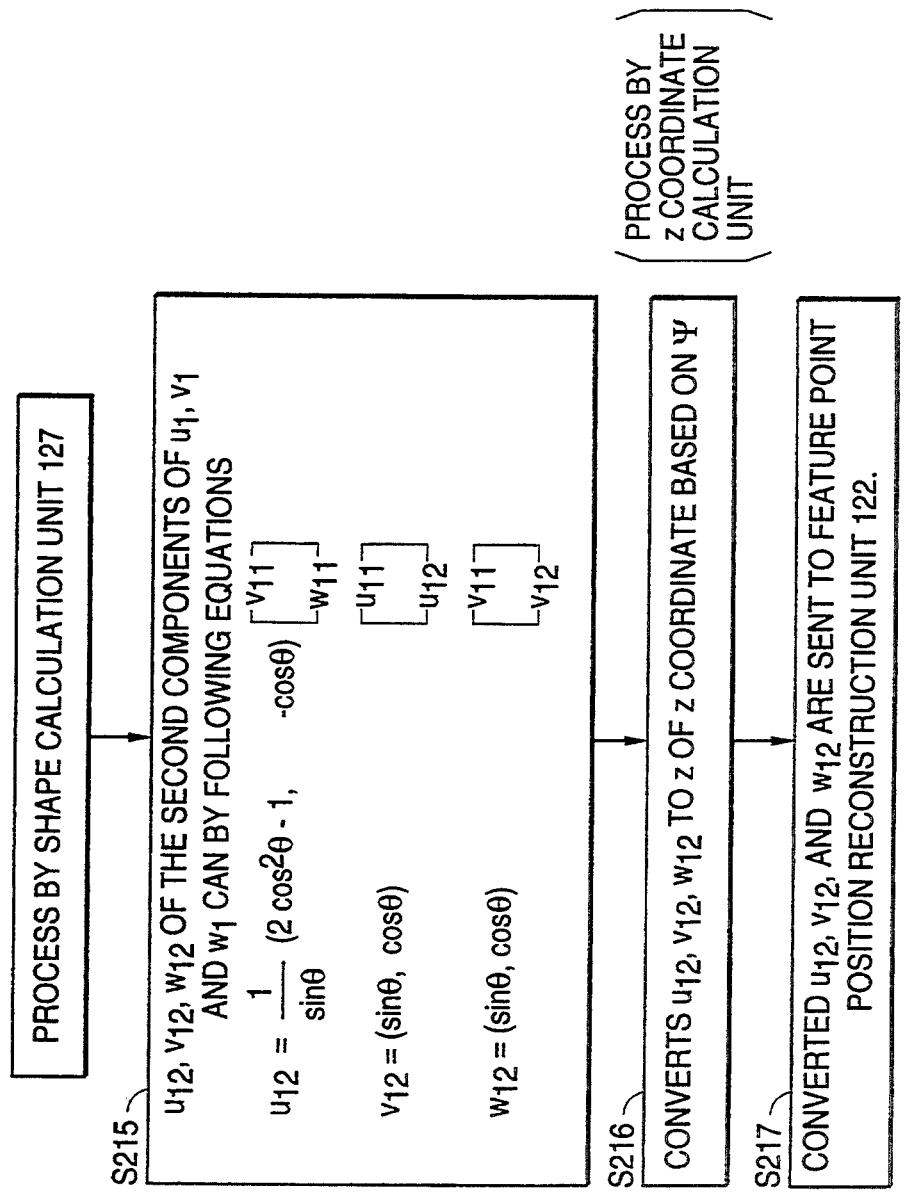
FIG. 67 is a fifth flowchart of processes executed by a constant movement calculation unit pursuant to the third embodiment.

FIG. 67 is a fifth flowchart of processes executed by a constant movement calculation unit pursuant to the third embodiment.

Explained below are steps of FIGS. 63 through 67 showing flows of the constant movement calculation unit 118, including the z coordinate value calculation unit 121 and the feature point position reconstruction unit 122 shown in FIG. 50. (Refer to FIGS. 50 and 51 as necessary.)

S201: The constant movement calculation unit 118 determines whether or not geometrical condition (3)' for PSI=$n \pi$ in the second embodiment is satisfied. A negative determination ($\theta = n\pi$) invokes S202.

S202: The constant movement calculation unit 118 inputs to the movement calculation unit 126 information that a moving body cannot be recognized, thereby invoking a recognition impossible process shown as S177 in FIG. 59.

The prime sign (e.g. appeared as (3)' in S201) expresses the dissatisfaction of an original condition (which is geometrical condition (3) in this case).

A positive determination in S201, i.e. when geometrical condition (3) is satisfied, invokes S203 and S204.

S203 and S204: The constant movement calculation unit 118 activates the feature point position normalization unit 112.

S205: The constant movement calculation unit 118 has the feature point position normalization unit 112 execute its process.

S206: The constant movement calculation unit 118 has the shape/movement determination unit 125 (shown in FIG. 51) determine whether determinant condition (5) is satisfied. Although this determination process uses the same determinant condition as the process in S201, whereas the determination in S201 is based on known data e.g. from a sensor, the determination in S206 is based on the normalized coordinate value of a feature point.

A negative determination in S206 (i.e. a dissatisfaction of determinant condition (5)) invokes S207. A positive determination in S206 (i.e. a satisfaction of determinant condition (5) invokes a process of the shape/movement calculation unit 114 by the movement calculation unit 126 and the shape calculation unit 127.

[Processes by the movement calculation unit 126]

S212: The movement calculation unit 126 calculates the movement of an object by expressions (32) and (33), which are $r_{11} = \cos \theta$ and $r_{12} = -\sin \theta$.

S213: The movement calculation unit 126 determines whether or not there is a solution satisfying the known data (e.g. the convexity and concavity of an object) on the object inputted in the known data input unit 111. A negative determination invokes a recognition impossible process shown as S177 in FIG. 59. A positive determination invokes S214.

S214: The movement calculation unit 126 sends the selected rotation matrix R to the shape calculation unit 127 and the feature point position reconstruction unit 122.

[Processes by the shape calculation unit 127]

S215: The shape calculation unit 127 calculates vectors $r_2$ (sin $\theta$, cos $\theta$), $u_1$ ($u_{11}$, $u_{12}$), $v_1$ ($v_{11}$, $v_{12}$) and $w_1$ ($w_{11}$, $w_{12}$) by expressions (34) and (35).

S216: By setting the obtained vector elements $u_{12}$, $v_{12}$ and $w_{12}$ as $z'$, these vector elements are transformed by $z = (y \sin PSI + z')/\cos PSI$, thereby obtaining the z coordinate value. The y coordinate values are already obtained on the XY plane (image capturing plane).

S217: The shape calculation unit 127 sends to the feature point position reconstruction unit 122 the transformed vector elements $u_{12}$, $v_{12}$ and $w_{12}$.

[Processes by the feature point position reconstruction unit 122] (Refer to FIG. 65.)

S209: The feature point position reconstruction unit 122 selects from sets of rotation matrix R and vectors $u_1$, $u_2$ and $u_3$ obtained as the result of calculating the shape and movement of an object a set of solutions satisfying the known data on the object inputted in the known data input unit 111. If no such set of solutions exists, the feature point position reconstruction unit 122 invokes a recognition impossible process shown as S177 in FIG. 59. If such a set of solutions does exist, the feature point position reconstruction unit 122 invokes S210.

S210 and S211: The feature point position reconstruction unit 122 stores the movement and the feature point position respectively in the object movement storage unit 76 and the feature point position storage unit 75.

Figure 68:
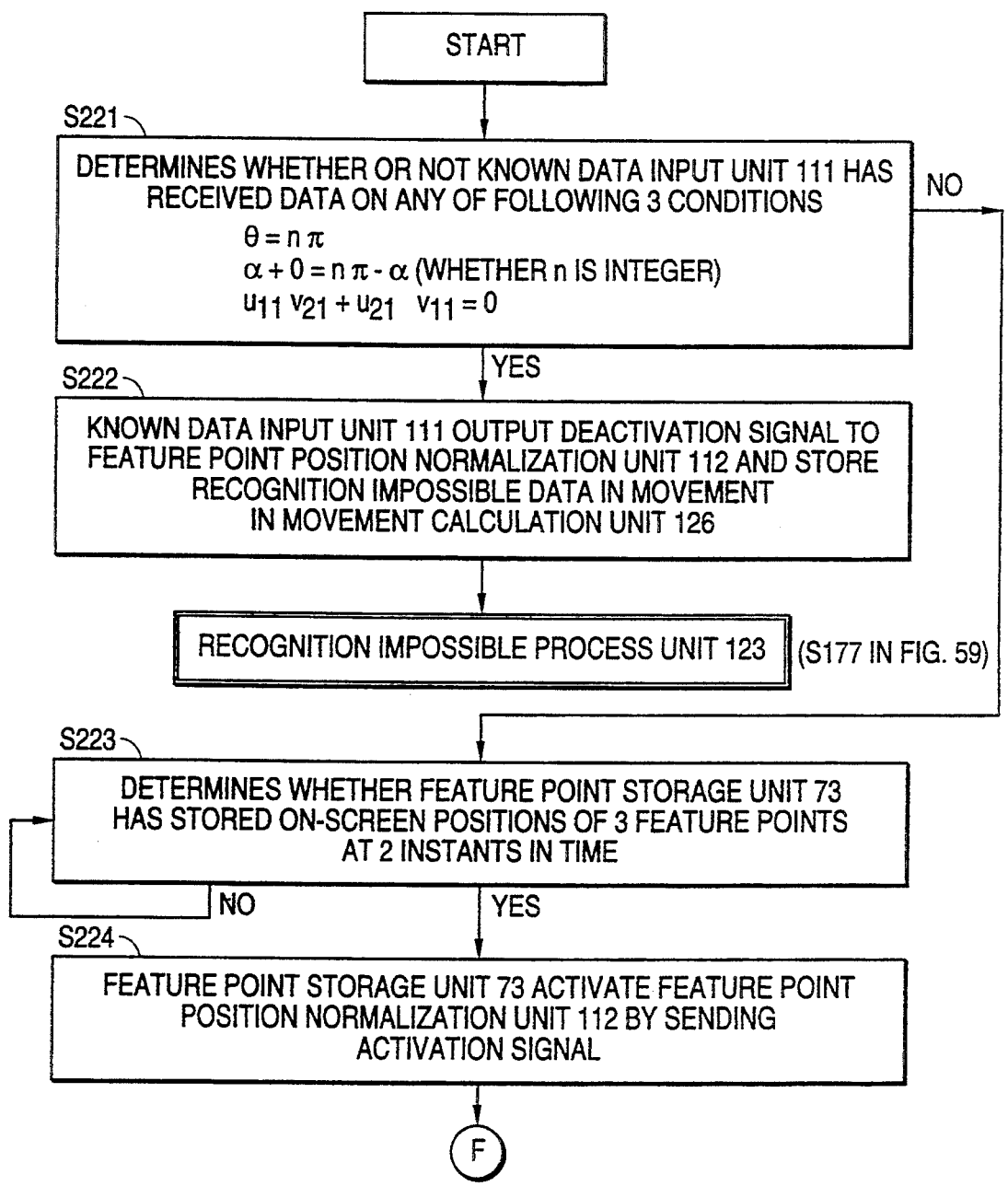
FIG. 68 is a first flowchart of processes executed by a right angle shape calculation unit pursuant to the third embodiment.

FIG. 68 is a first flowchart of processes executed by a right angle shape calculation unit pursuant to the third embodiment.

Figure 69:
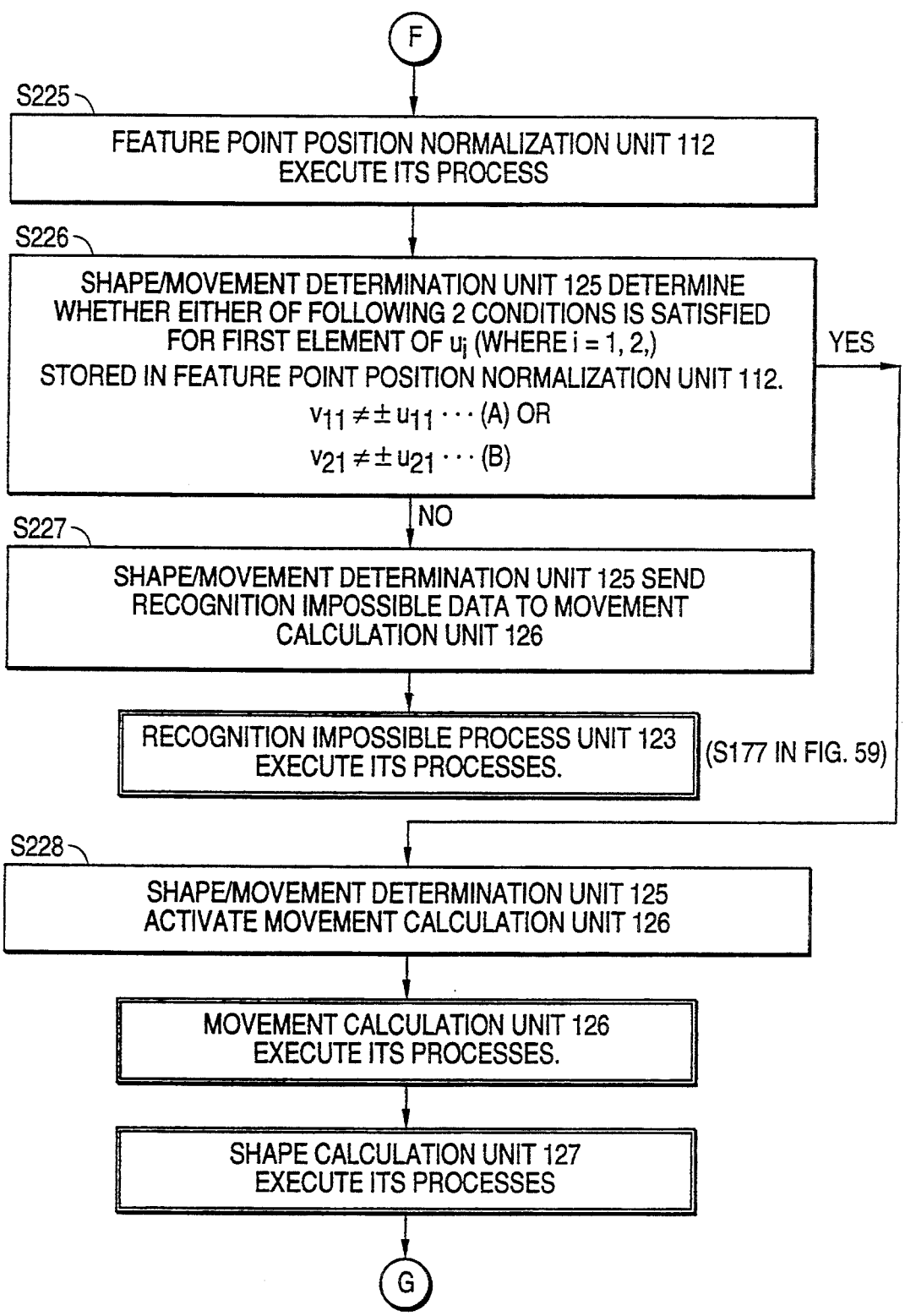
FIG. 69 is a second flowchart of processes executed by a right angle shape calculation unit pursuant to the third embodiment.

FIG. 69 is a second flowchart of processes executed by a right angle shape calculation unit pursuant to the third embodiment.

Figure 70:
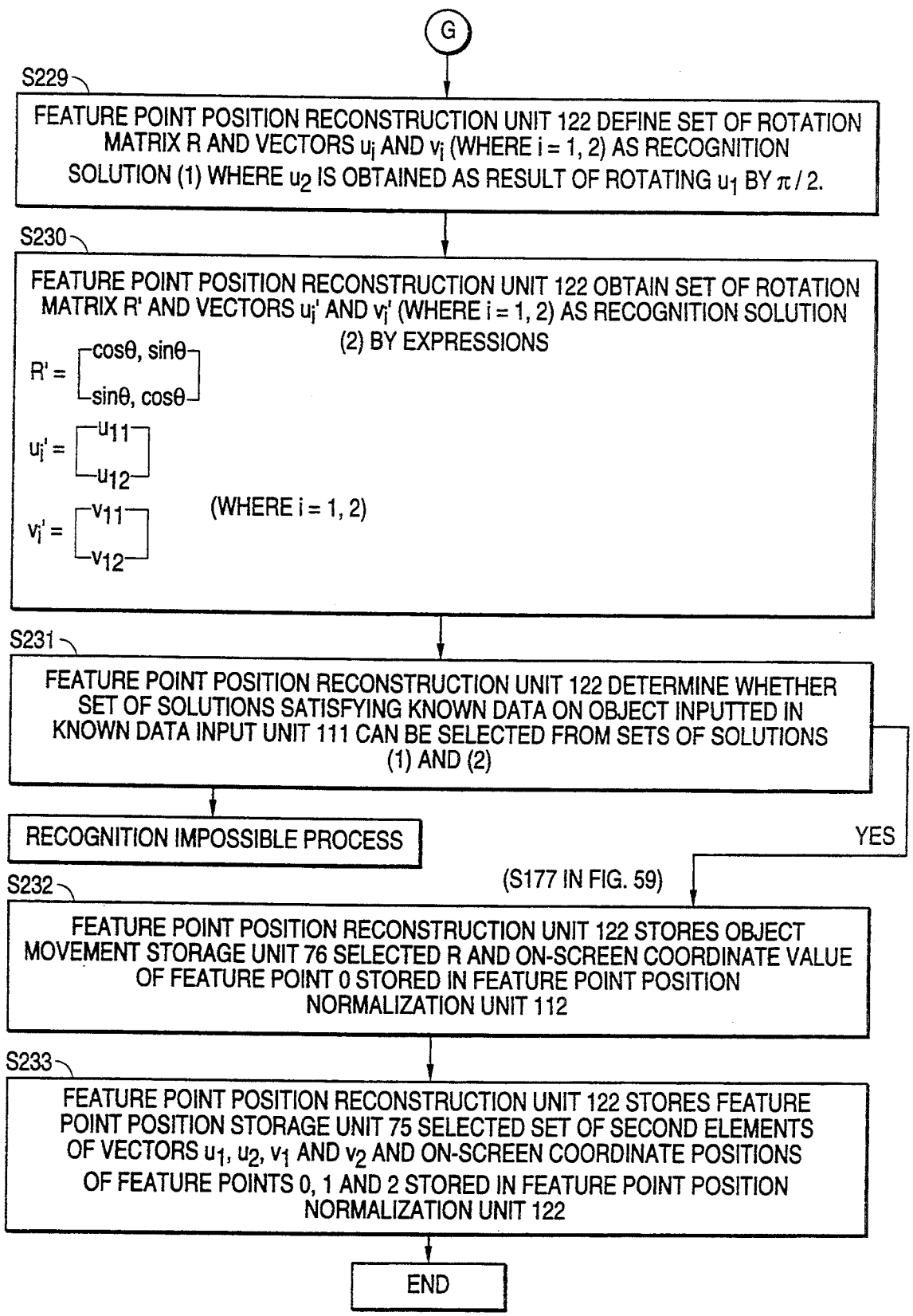
FIG. 70 is a third flowchart of processes executed by a right angle shape calculation unit pursuant to the third embodiment.

FIG. 70 is a third flowchart of processes executed by a right angle shape calculation unit pursuant to the third embodiment.

Figure 71:
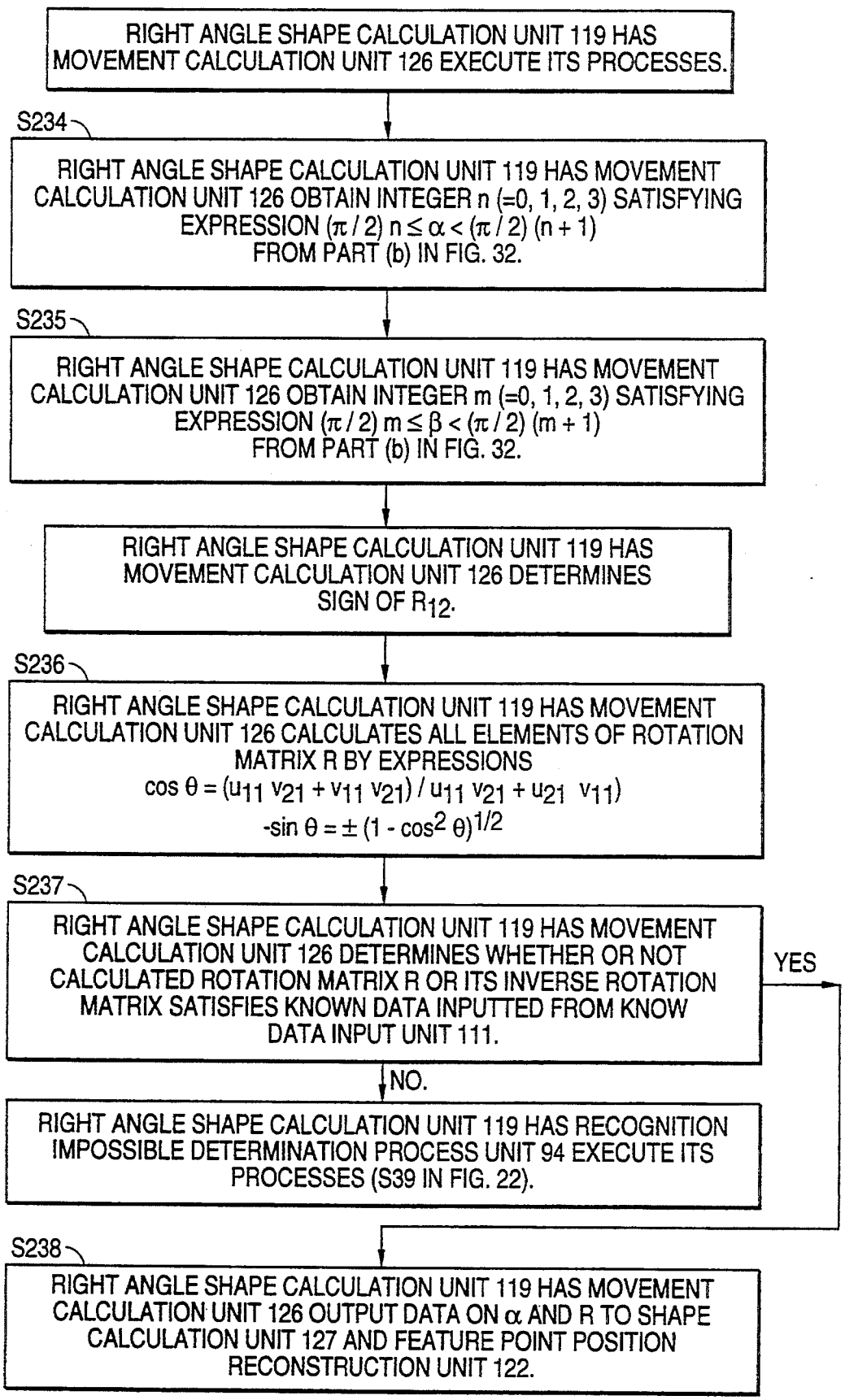
FIG. 71 is a fourth flowchart of processes executed by a right angle shape calculation unit pursuant to the third embodiment.

FIG. 71 is a fourth flowchart of processes executed by a right angle shape calculation unit pursuant to the third embodiment.

Figure 72:
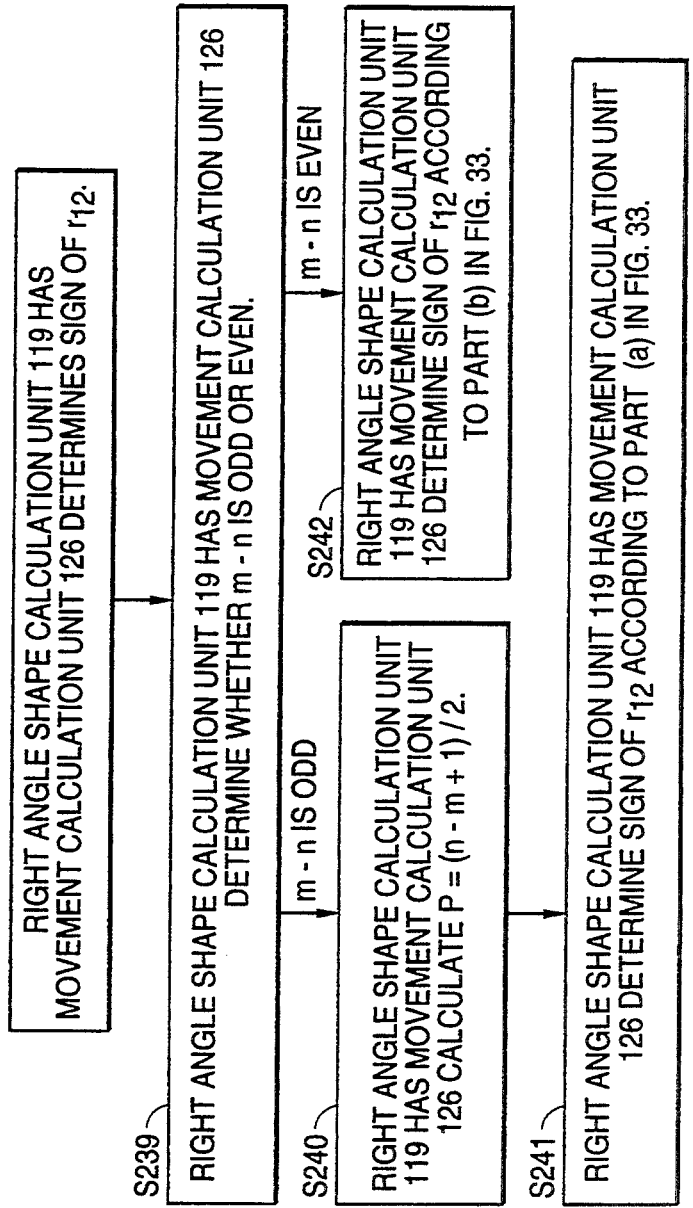
FIG. 72 is a fifth flowchart of processes executed by a right angle shape calculation unit pursuant to the third embodiment.

FIG. 72 is a fifth flowchart of processes executed by a right angle shape calculation unit pursuant to the third embodiment.

Figure 73:
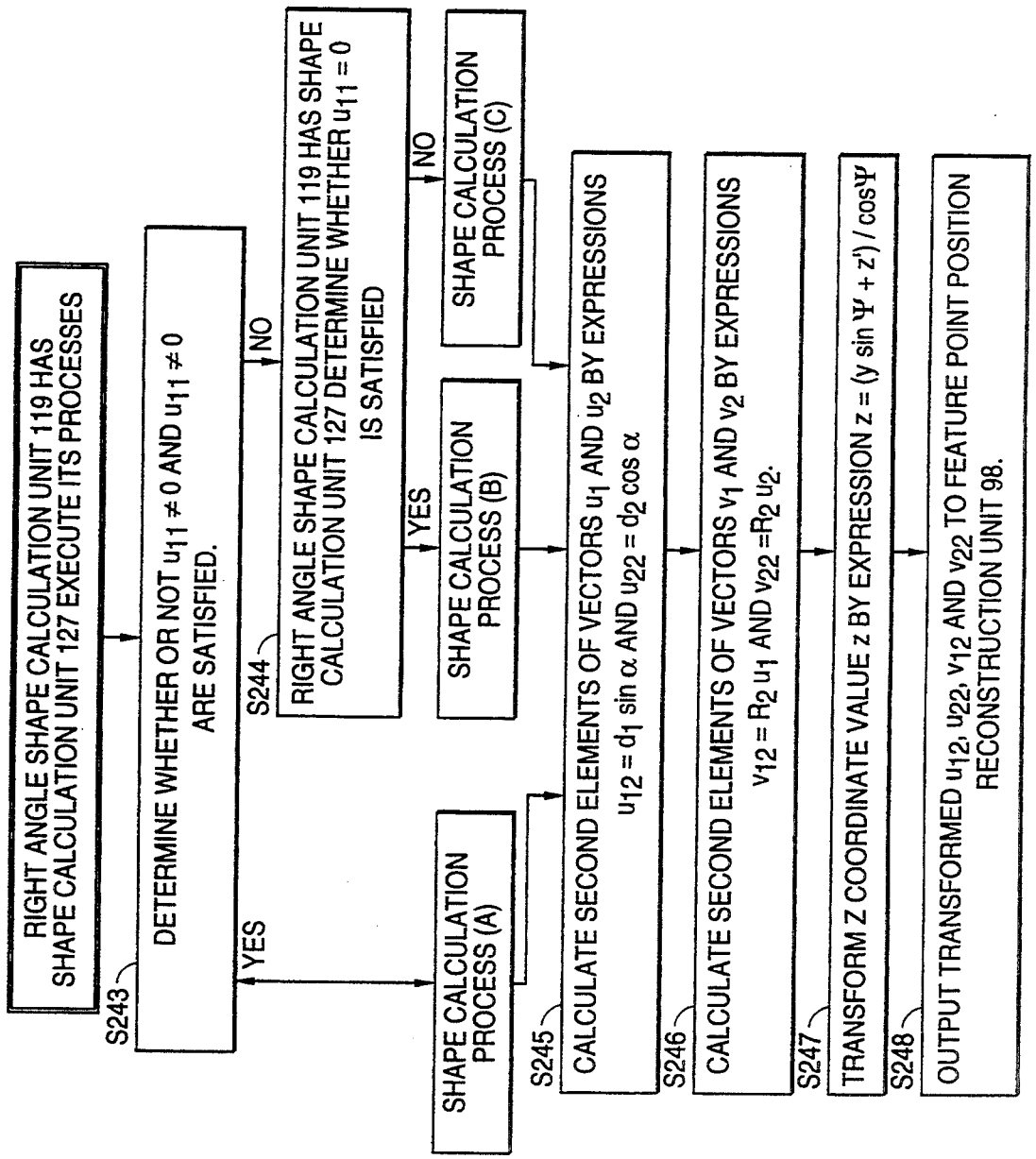
FIG. 73 is a sixth flowchart of processes executed by a right angle shape calculation unit pursuant to the third embodiment.

FIG. 73 is a sixth flowchart of processes executed by a right angle shape calculation unit pursuant to the third embodiment.

Figure 74:
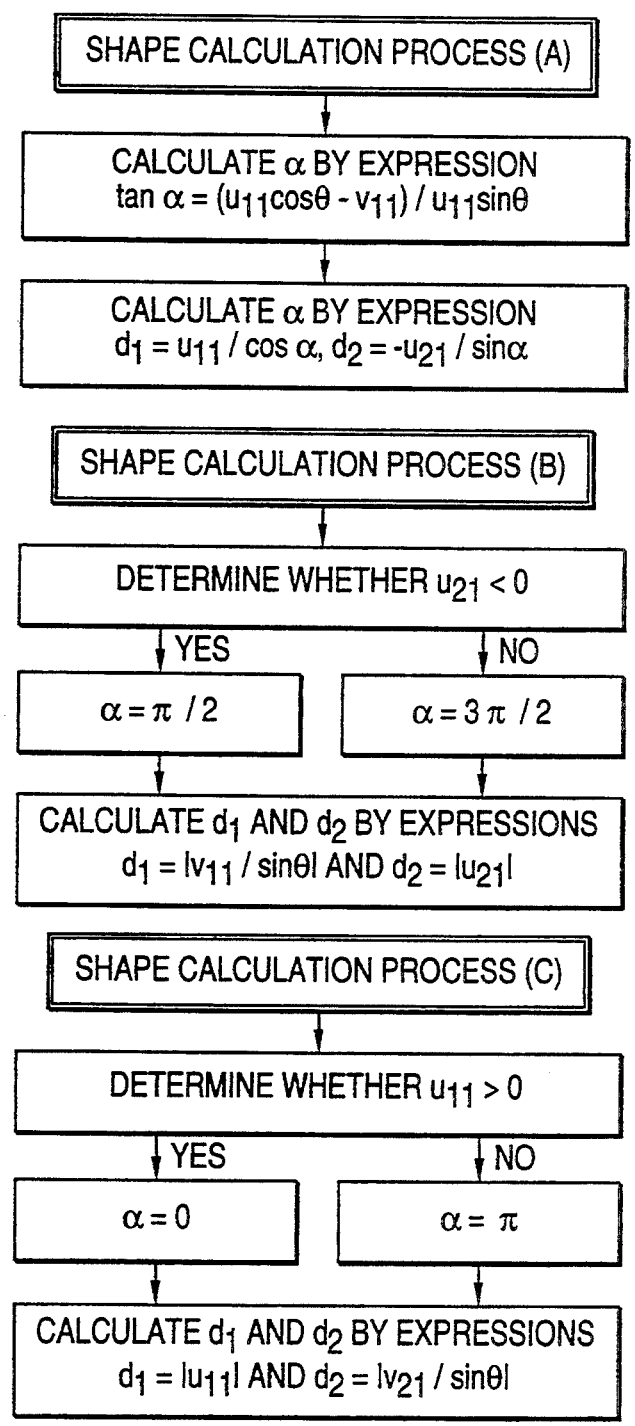
FIG. 74 is a seventh flowchart of processes executed by a right angle shape calculation unit pursuant to the third embodiment.

FIG. 74 is a seventh flowchart of processes executed by a right angle shape calculation unit pursuant to the third embodiment.

More specifically, FIGS. 68 through 74 also include the flows of the z coordinate value calculation unit 121 and the feature point position reconstruction unit 122 in addition to the right angle shape calculation unit 119.

The flows will be explained according to the steps. (Refer to FIG. 51 as necessary.)

S221: The right angle shape calculation unit 119 determines, based on the known data inputted from a sensor, whether or not geometrical conditions (F), (G) and determinant condition (I) are satisfied.

A negative determination in S221 (when neither geometrical conditions (F), (G) nor determinant condition (I) is satisfied) invokes S222. A positive determination in S221 (when both geometrical conditions (F), (G) and determinant condition (I) are satisfied) invokes S223.

S222: The right angle shape calculation unit 119 inputs to the movement calculation unit 126 information that a moving body cannot be recognized, thereby invoking a recognition impossible process shown as S177 in FIG. 59.

S223, S224 and S225: The right angle shape calculation unit 119 initiates the normalization process and activates the feature point position normalization unit 122.

S226: The right angle shape calculation unit 119 determines whether determinant condition (H) is satisfied, based on the normalized coordinate value of a feature point. A negative determination invokes S227, while a positive determination activates the movement calculation unit 126 for calculating the movement and shape.

S227: The right angle shape calculation unit 119 inputs recognition disablement data to the movement calculation unit 126 for executing a recognition impossible process shown as S177 in FIG. 59.

[Processes by the movement calculation unit 126]

S234 and S235: The movement calculation unit 126 determines the range of $\alpha$ and $\beta$ from parts (a) and (b) of FIG. 32.

Then, the movement calculation unit 126 determines the sign of $r_{12}$.

[Determination of the sign of $r_{12}$]

S239 through S242: The movement calculation unit 126 determines the sign of $r_{12}$.

S239: The movement calculation unit 126 determines whether n−m is odd or even. If n−m is odd, the sign of $r_2$ is determined according to part (a) of FIG. 33. If n−m is even, the sign of $r_{12}$ is determined according to part (b) of FIG. 33.

S236: The movement calculation unit 126 calculates rotation matrix R from expressions (39) and (40), which are $r_{11}=\cos\theta$ and $r_{12}=-\sin\theta$.

S237: The movement calculation unit 126 sends to the feature point position reconstruction unit 122 data on $\alpha$ and R, if there is a solution satisfying known data.

Then, the shape calculation unit 127 executes its processes.

[Processes by the shape calculation unit 127]

S243: The shape calculation unit 127 determines whether $u_{11} \ne 0$ and $u_{21} \ne 0$ are satisfied. A positive determination (when neither $u_{11}$ nor $u_{21}$ is zero [0]) invokes S249. A negative determination invokes S251, if $u_{11}=0$. A negative determination invokes S254, if $u_{21}=0$.

S249: The shape calculation unit 127 calculates a by expression (41).

S250: The shape calculation unit 127 calculates $d_1$ and $d_2$ from expression (42).

S251, S252 and S253: The shape calculation unit 127 determines whether $\alpha=\pi/2$ ($u_{21}<0$) or $\alpha=3\pi/2$ ($u_{21}>0$) for calculating $d_1$ and $d_2$ from expression (43).

S254 and S255: The shape calculation unit 127 determines whether $\alpha=\pi/2$ ($u_{21}<0$) or $\alpha=3\pi/2$ ($u_{21}>0$).

S256: The shape calculation unit 127 calculates $d_1$ and $d_2$ from expression (44).

S245 and S246: The shape calculation unit 127 calculates vectors $u_1$, $u_2$, $v_1$ and $v_2$, based on $d_1$, $d_2$ and $\alpha$ obtained in shape calculation processes (1), (2) and (3).

S247: The z coordinate value calculation unit 121 transforms vector elements $u_{12}$, $u_{22}$, $v_{12}$ and $v_{22}$. Each of vector elements $u_{12}$, $u_{22}$, $v_{12}$ and $v_{22}$ set as $z'$ is transformed by $z=(y \sin \mathrm{PSI} + z')/\cos \mathrm{PSI}$, where y is already obtained on the XY plane, which is the image capturing plane (observation plane).

S248: The z coordinate value calculation unit 121 sends the transformed vector elements $u_{12}$, $u_{22}$, $v_{12}$ and $v_{22}$ to the feature point position reconstruction unit 122.

[Processes by the feature point position reconstruction unit 122]

S229 and S230: The feature point position reconstruction unit 122 analyzes sets of solutions forming mirror image inversions.

S229: The feature point position reconstruction unit 122 defines a received set of solutions comprising rotation matrix R and vectors $u_1$, $u_2$, $v_1$ and $v_2$, as the recognition solution (1) when vector $u_2$ is obtained by rotating vector $u_1$ by $\pi/2$.

S230: The feature point position reconstruction unit 122 defines a received set of solutions comprising rotation matrix R and vectors $u_1$, $u_2$, $v_1$ and $v_2$, as the recognition solution (2) when vector $u_2$ is obtained by rotating vector $u_1$ by $-\pi/2$. Then, the feature point position reconstruction unit 122 obtains from the illustration in a drawing the set of solutions comprising rotation matrix $R'$ and vectors $u_1'$, $u_2'$, $v_1'$ and $v_2'$, in correspondence with the set of solutions comprising rotation matrix R and vectors $u_1$, $u_2$, $v_1$ and $v_2$.

S231: The feature point position reconstruction unit 122 determines whether or not there is a set of solutions satisfying the known data of an object inputted in the known data input unit 111. A negative determination invokes a recognition impossible process shown as S177 in FIG. 59. A positive determination invokes S232.

S232 and S233: The feature point position reconstruction unit 122 stores the movement of an object and the feature point position respectively in the object movement storage unit 76 and the feature point position storage unit 75.

Figure 75:
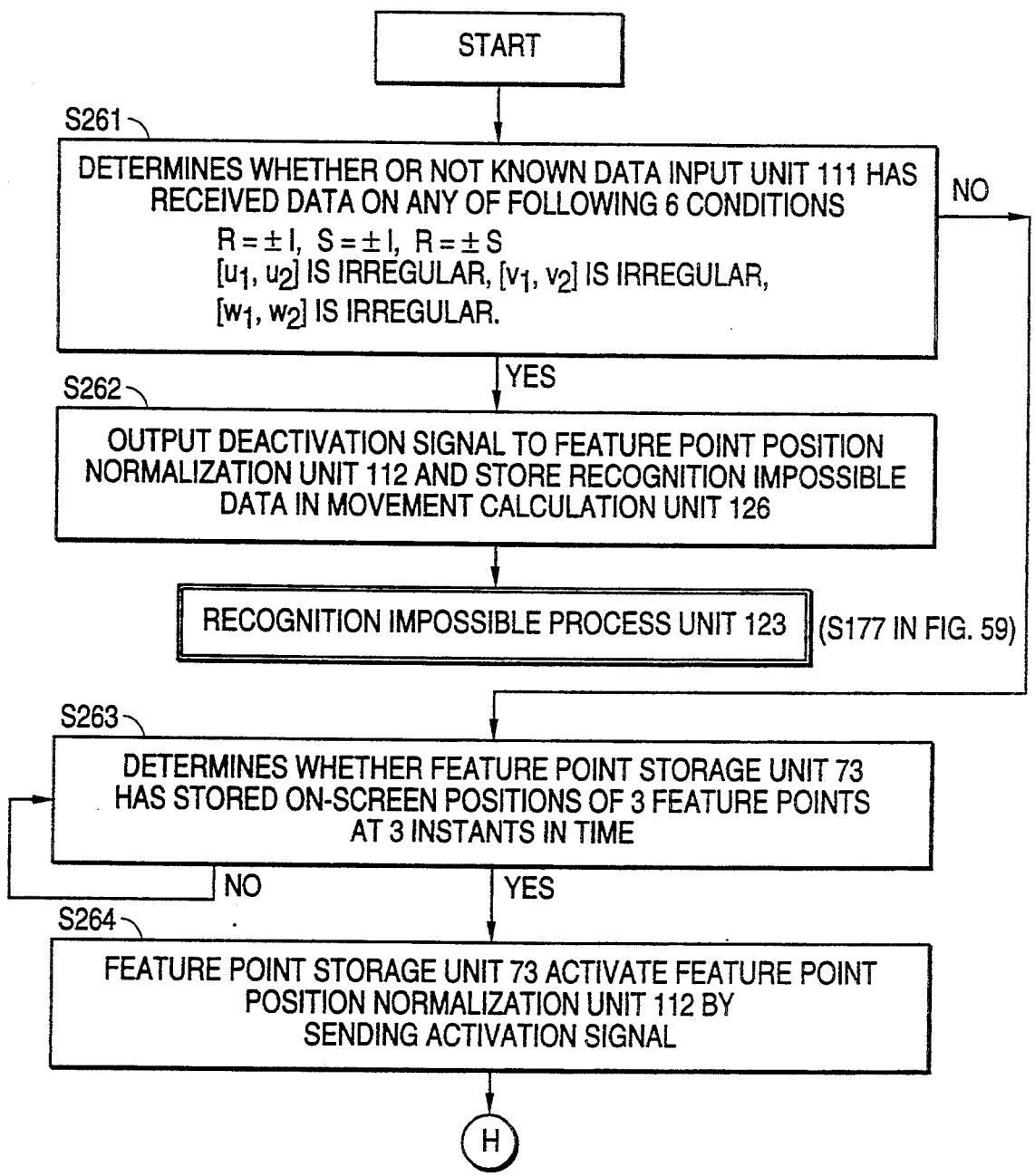
FIG. 75 is a first flowchart of processes executed by a generic shape calculation unit pursuant to the third embodiment.

FIG. 75 is a first flowchart of processes executed by a generic shape calculation unit pursuant to the third embodiment.

Figure 76:
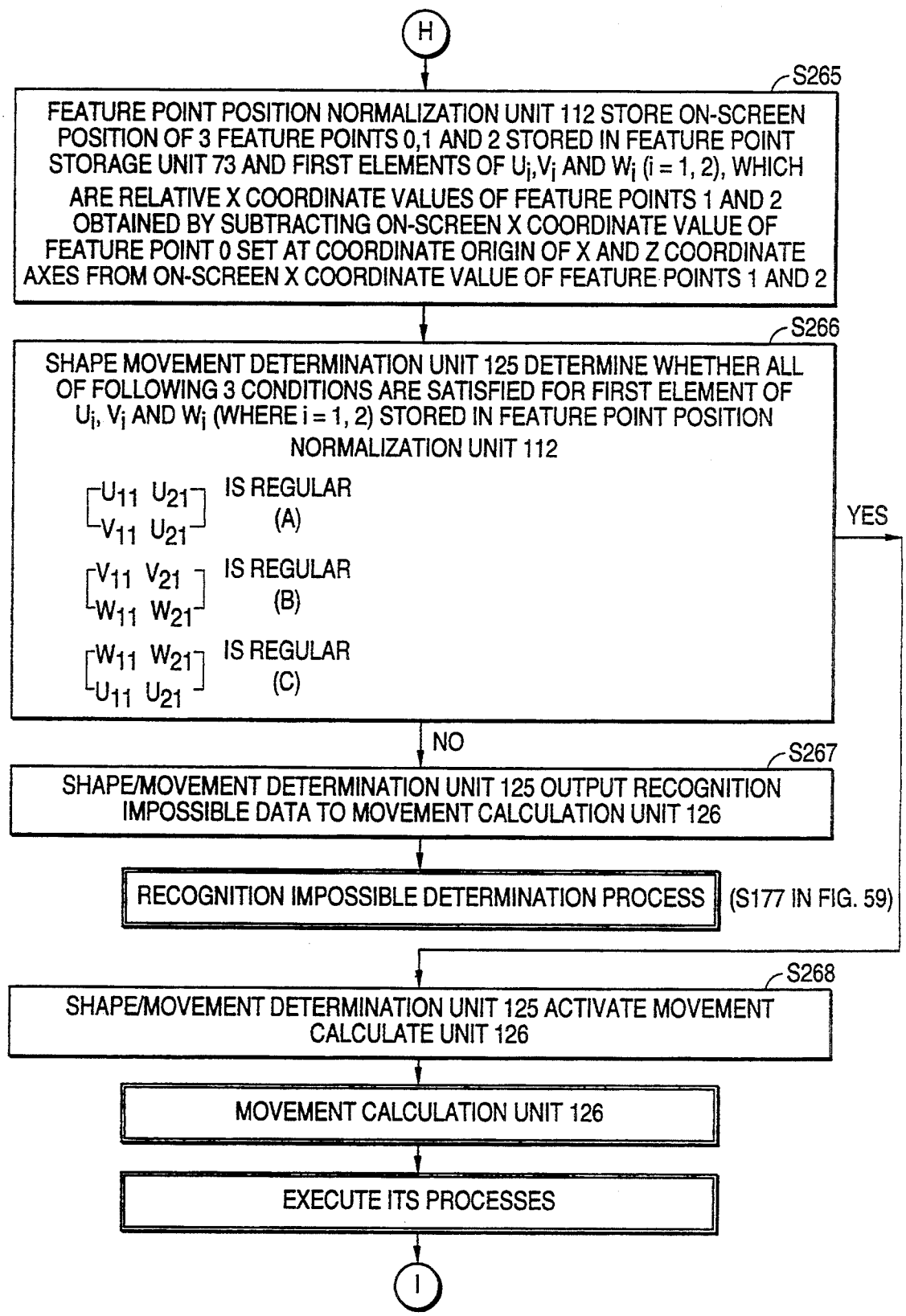
FIG. 76 is a second flowchart of processes executed by a generic shape calculation unit pursuant to the third embodiment.

FIG. 76 is a second flowchart of processes executed by a generic shape calculation unit pursuant to the third embodiment.

Figure 77:
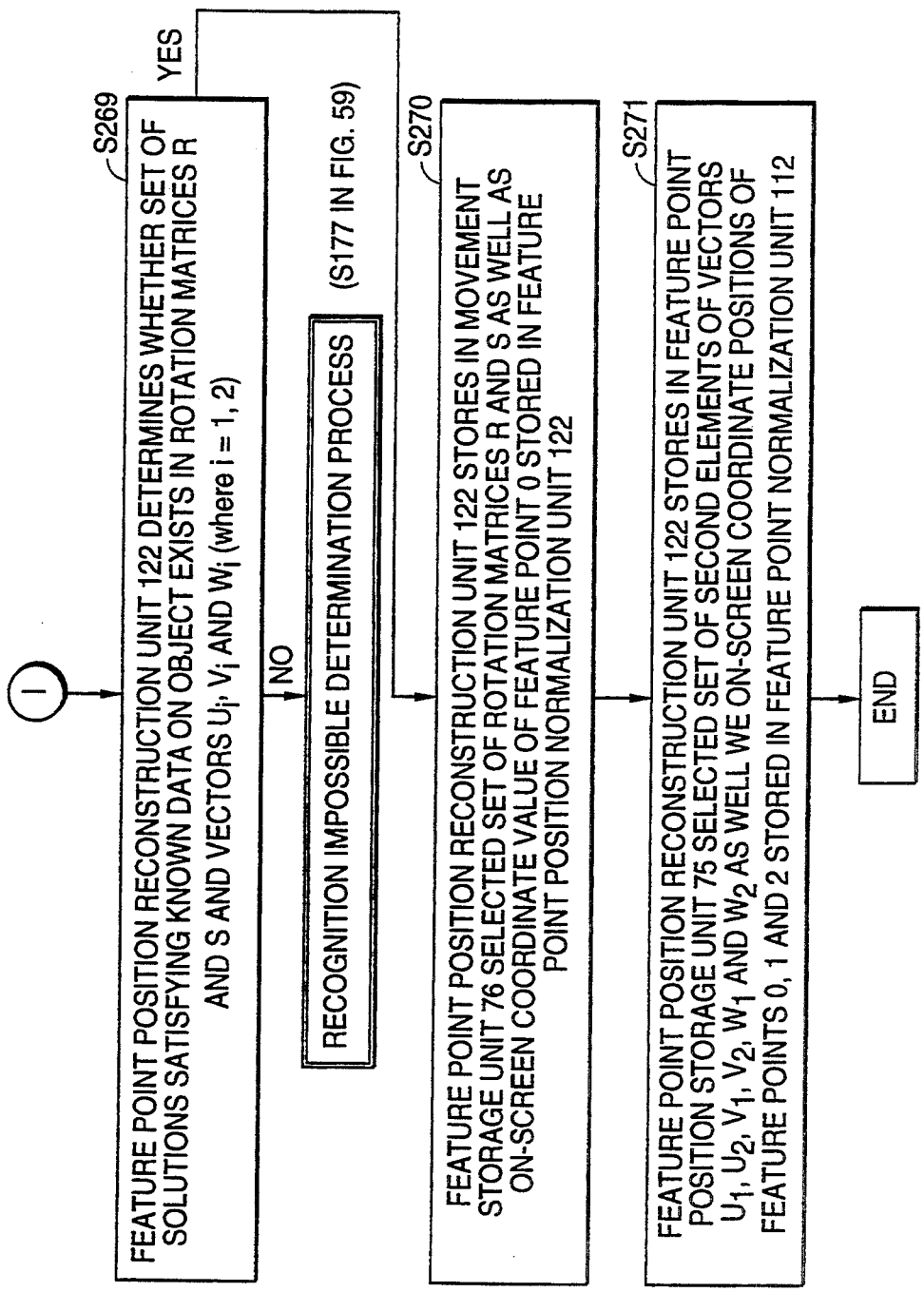
FIG. 77 is a third flowchart of processes executed by a generic shape calculation unit pursuant to the third embodiment.

FIG. 77 is a third flowchart of processes executed by a generic shape calculation unit pursuant to the third embodiment.

Figure 78:
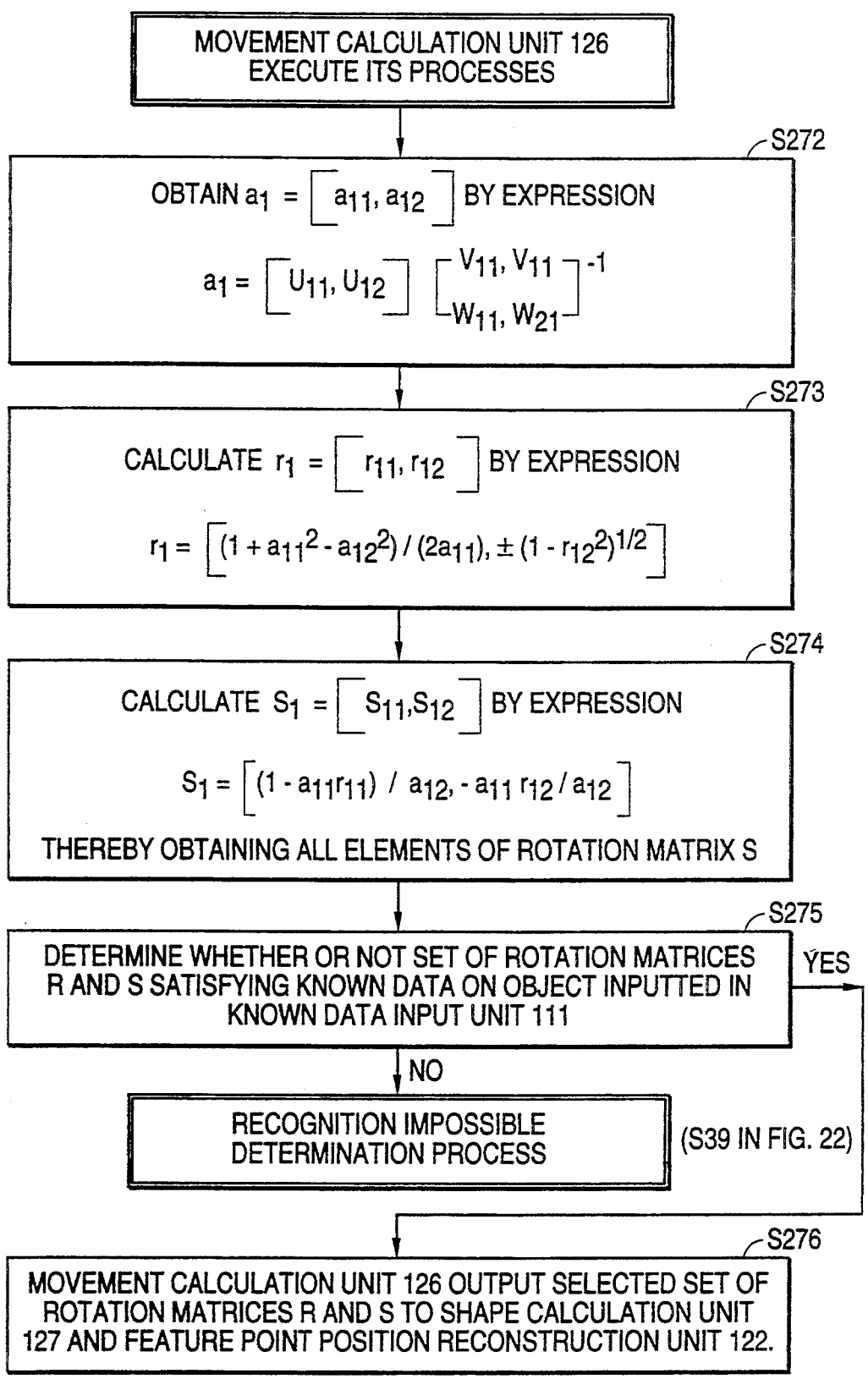
FIG. 78 is a fourth flowchart of processes executed by a generic shape calculation unit pursuant to the third embodiment.

FIG. 78 is a fourth flowchart of processes executed by a generic shape calculation unit pursuant to the third embodiment.

Figure 79:
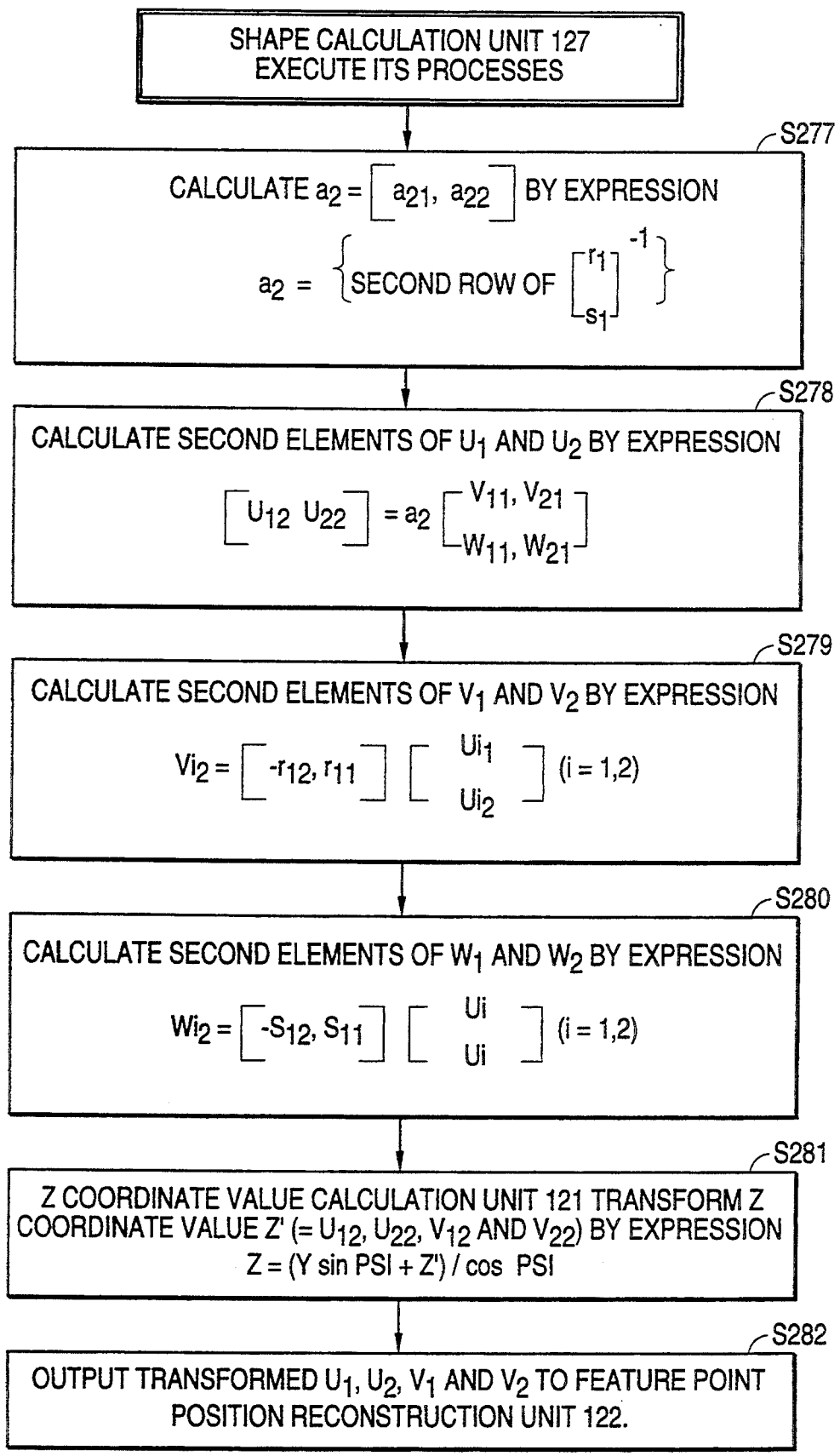
FIG. 79 is a fifth flowchart of processes executed by a generic shape calculation unit pursuant to the third embodiment.

FIG. 79 is a fifth flowchart of processes executed by a generic shape calculation unit pursuant to the third embodiment.

More specifically, FIGS. 75 through 79 also include the flows of the z coordinate value calculation unit 121 and the feature point position reconstruction unit 122 in addition to the generic shape calculation unit 120.

The flows will be explained according to the steps. (Refer to FIG. 51 as necessary.)

S261: The generic shape calculation unit 120 determines, based on the known data e.g. inputted from a sensor, whether or not geometrical conditions (A) and (B), which are equivalent to the regularities of matrices in expression (22), are satisfied. (In FIG. 75, I is a unit matrix.) A negative determination invokes S262. A positive determination invokes S263.

S262: The generic shape calculation unit 120 invokes a recognition impossible process.

S263, S264 and S265: The generic shape calculation unit 120 activates the feature point position normalization unit 112 and the normalizes the coordinate value of a feature point.

S266: The generic shape calculation unit 120 determines whether matrices composed of normalized coordinate values in expression (22) are regular. (Although S266 uses the same determinant as in S261, while the determination in S261 is based on data from a sensor, the determination in S266 is based on the normalized coordinate values.)

A negative determination in S266 (at least one of the matrices being irregular) causes a recognition impossible process shown as S177 in FIG. 59. A positive determination in S266 (all of the matrices being regular) activates the movement calculation unit 126 and the shape calculation unit 127.

[Processes by the movement calculation unit 126]

The movement calculation unit 126 executes processes in S272 through S276.

S272: The movement calculation unit 126 calculates expression (23).

S273: The movement calculation unit 126 calculates expressions (24) and (25).

S274: The movement calculation unit 126 calculates expressions (26) and (27).

S275: The movement calculation unit 126 determines whether or not there is a set of solutions satisfying the known data by comparing the known data with the obtained set of R and S.

A negative determination in S275 (an absence of a set of solutions satisfying known data) invokes the recognition impossible process shown as S177 in FIG. 59. A positive determination in S275 (a presence of a set of solutions satisfying known data) causes the movement calculation unit 126 to send the set of solutions to the shape calculation unit 127 and the feature point position reconstruction unit 122.

[Processes by the shape calculation unit 127]

The shape calculation unit 127 executes processes in S277 through S280.

S277: The shape calculation unit S227 calculates expression (28).

S278: The shape calculation unit S227 calculates expression (29).

S279 and S280: The shape calculation unit S227 calculates expression (30).

S281: The z coordinate value calculation unit 121 transforms vector elements $u_{12}$, $u_{22}$, $v_{12}$ and $v_{22}$. Each of vector elements $u_{12}$, $u_{22}$, $v_{12}$ and $v_{22}$ set as $z'$ is transformed by $z = (y \sin PSI + z')/\cos PSI$, where y is already obtained on the XY plane, which is the image capturing plane (observation plane).

S282: The z coordinate value unit 121 sends the transformed vector elements $u_{12}$, $u_{22}$, $v_{12}$ and $v_{22}$ to the feature point position reconstruction unit 122.

[Processes by the feature point position reconstruction unit 122] (Refer to FIG. 65.)

The feature point position reconstruction unit 122 performs S269, S270 and S271.

S269: The feature point position reconstruction unit 122 selects from sets of rotation matrices R and S and vectors $u_1$, $u_2$, $v_1$ $v_2$, $w_1$ and $w_2$ (including mirror image inversions) obtained as the result of calculating the shape and movement of an object a set of solution satisfying the known data on the object inputted in the known data input unit 111. If no such set of solutions exists, the feature point position reconstruction unit 122 invokes a recognition impossible process shown as S177 in FIG. 59. If such a set of solutions does exist, the feature point position reconstruction unit 122 invokes S270.

S270 and S271: The feature point position reconstruction unit 122 stores the movement and the feature point position respectively in the object movement storage unit 76 and the feature point position storage unit 75.

The third embodiment is such that the rotation (movement) of a feature point on a virtual plane of rotation is obtained and the z coordinate value $z'$ of a feature point is obtained from the rotation. Then, the actual z coordinate value of a feature point is calculated by expression (48) from $z'$ and PSI, thereby obtaining the actual movement and position of a feature point.

However, when the shape of an object is obtained by other methods, the angle of rotation $\theta$ of a feature point of a moving body from a first instant in time to a second instant in time can be obtained by the following expression based on a virtual rotation.

$$\cos \theta = (x_1 x_2 + z_1' z_2')/(x_i^2 + z_i'^2)(i = 1 \text{ or } 2) \tag{51}$$

$$\sin \theta = (x_1 z_2' - x_2 z_1')/(x_i^2 + z_i'^2)(i = 1 \text{ or } 2) \tag{52}$$

Further, as with the second embodiment, when the shape of an object is known, the rotation can be calculated from three [3] feature points of the virtual rotation of a normalized rotational object at two [2] instants in time. When the determinant of a matrix composed of the coordinate values of three [3] feature points at two [2] instants in time is not zero [0], rotation matrix R representing a rotation of the moving body from the first instant in time to the second instant in time can be obtained as:

$$R = \begin{bmatrix} x_{21} & x_{22} & x_{23} \\ y_{21} & y_{22} & y_{23} \\ z_{21} & z_{22} & z_{23} \end{bmatrix} \begin{bmatrix} x_{11} & x_{12} & x_{13} \\ y_{11} & y_{12} & y_{13} \\ z_{11} & z_{12} & z_{13} \end{bmatrix}^{-1}$$

where $$\begin{bmatrix} x_{ij} \\ y_{ij} \\ z_{ij} \end{bmatrix}$$

represents the coordinate value of a j-th feature point at an i-th instant in time (i = 1, 2; j = 1, 2, 3)

Figure 80A:
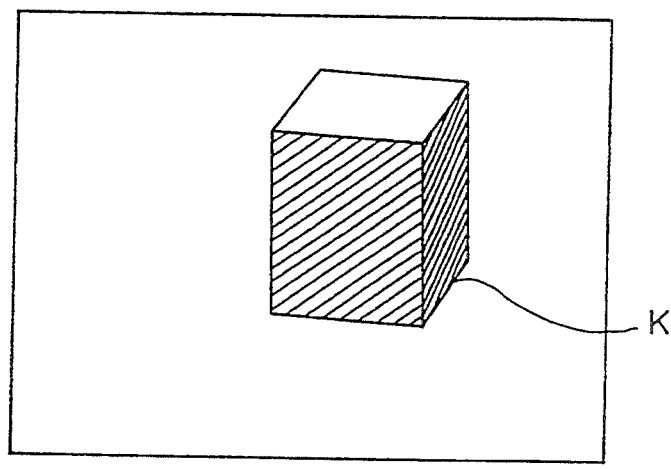
FIGS. 80A and 80B illustrate an exemplary result of a recognition experiment with this invention applied.
Figure 80B:
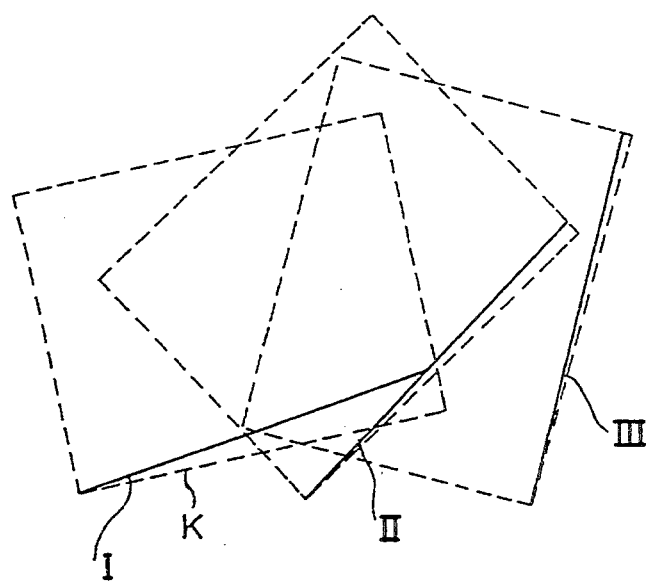

FIG. 80 illustrates an exemplary result of a recognition experiment with this invention applied.

The parameters used in the experiment are as follows: depression angle PSI 18.2°, angle of view 6.7° (640 picture elements), and observation distance/object size=26, where an angle of view is defined as an angle of visibility (in the horizontal direction in this case) captured by a television camera and an object size is defined as the length of side k.

This experiment uses wood blocks of rectangular parallelopiped as objects, and their images are captured at three [3] instants in time I, II, and III.

Part (a) shows an input image, which is one [1] of the input images captured at three [3] instants in time.

Part (b) shows a recognition result.

More specifically, part (b) shows the result of recognizing side k by using this invention when an object is observed straight from the above. The dashed lines indicate the bottom surface of the rectangular parallelopiped including side k.

In part (b), the dashed line indicate the correct values, while the solid line indicate the experiment result. When the object is observed straight from the above with a feature point taken on side k, the shapes of the object are observed at first, second and third instants in time.

This invention enables one [1] image input unit to recognize the shape and movement of an object according to the result of recognizing a depression angle, even when the object is obliquely looked down.

Also, because the numbers of image input units and feature point extraction units are reduced by half compared with a conventional moving image recognition apparatus, the whole apparatus can be miniaturized, thereby broadening the applications of the arts in many fields. Additionally, because the correspondences between feature points of an object captured by two [2] image input units need not be established, the processing can be expedited.

What is claimed is:

1. A moving body recognition apparatus, comprising image input means for receiving an image of a moving body, feature point extraction means for extracting feature points from said image and feature point storage means for storing said extracted feature points, for recognizing a shape and movement of a moving body based on position data of the feature points in an orthogonal projection image of the moving body, comprising:

feature point position normalization means for providing normalized coordinates of the feature points in the XYZ coordinate system stored in the feature point storage means by determining an image plane of the moving body in the image input means as the XY plane, the direction of the orthogonal projection image of a rotation axis of the moving body formed on the image plane as the Y axis and a direction of an image capture operation by the image input means as the Z axis perpendicular to said XY plane; and rotation axis calculation means for calculating an angle between the rotation axis of the moving body and the Y axis as a depression angle PSI based on the output of said feature point position normalization means.

2. The moving body recognition apparatus according to claim 1 further comprising known data input means for inputting known data relating to the shape and movement of the moving body, and wherein said rotation axis calculation means determines a result which is not inconsistent with the known data as the result of the calculation of said depression angle PSI.

3. The moving body recognition apparatus according to claim 1 wherein said feature point position normalization means selects a first feature point from among a plurality of said feature points of the moving body in the image plane as the origin of the XYZ coordinate system and obtains the coordinate values of a second of said feature points and the following said feature points relative to the origin as the normalized coordinates.

4. The moving body recognition apparatus according to claim 3 wherein said rotation axis calculating means comprises:

Y coordinate determination means for comparing normalized Y coordinates of one of said feature points output from said feature point position normalization means at a plurality of instants in time;

first PSI calculation process means for calculating the depression angle PSI when said Y coordinate determination means judges that, with regard to a second feature point of two of said feature points at a second instant in time out of three instants in time, the Y coordinate is the same and the absolute value of the X coordinate is not the same as the second feature point at a first instant in time; and second PSI calculation process means for calculating a value of sin PSI and the sign of cos PSI for the angle PSI and obtaining a value of said angle PSI by using the value of said sin PSI and the sign of said cos PSI when said Y coordinate determination means judges that the Y coordinates of the second feature point are all different at respective three instants in time.

5. The moving body recognition apparatus according to claim 4 further comprising recognition impossible determination process means for making recognition of the angle PSI impossible, thereby performing an impossible recognition determination process, when said Y coordinate determination means judges that the absolute value of the X coordinate and the Y coordinate of the second feature point selected from among the two feature points are the same at least at two instants in time out of three instants in time.

6. The moving body recognition apparatus according to claim 4 wherein said first PSI calculation process means makes said depression angle PSI zero when said Y coordinates are not negative and makes the depression angle PSI 180° when said Y coordinates are negative.

7. The moving body recognition apparatus according to claim 4 wherein said second PSI calculation process means obtains the value of sin PSI and the sign of said cos PSI by using the coordinate ($x_i$, $y_i$) (time point i=1, 2, or 3) of the second feature point at respective three time points and expressing as h wherein h is the component in the rotation axis direction of the position vector from the origin to the second feature point, based on the following equations:

$$\sin PSI = \pm[(y_1-y_2)(y_2-y_3)(y_3-y_1)/\{(x_2^2-x_1^2)(y_3-y_1)-(x_3^2-x_1^2)(y_2-y_1)\}]^{\frac{1}{2}};$$

or $$\sin PSI = \pm[(y_1-y_2)(y_2-y_1)(y_3-y_1)/\{x_1^2(y_2-y_3)+x_2^2(y_3-y_1)+x_3^2(y_1-y_2)\}]^{\frac{1}{2}}$$

and $$h \cos PSI = \{(x_i^2 - x_1^2) \sin^2 PSI + (y_i^2 - y_1^2)\}/\{2(y_i - y_1)\} (i=2, 3).$$

8. The moving body recognition apparatus according to claim 7, wherein:
 (1) cos PSI=0 when sin²PSI=1
 (2) the sign of h cos PSI is determined as the sign of cos PSI when h cos PSI≠0
 (3) the sign of cos PSI is not determined when sin² PSI≠1 and h cos PSI=0,
thereby providing PSI and PSI+$\pi$ as the solution in the case of (3).

9. The moving body recognition apparatus according to claim 4 wherein said second PSI calculation process means obtains the value of sin PSI and the sign of cos PSI by using the coordinates $(x_i, y_i)$ (time point i=1, 2, or 3) of the second feature point at respective three time points and expressing as h wherein h is the component in the rotation axis direction of the position vector from the origin to the second feature point, based on the following equations:

$$\sin PSI = \pm[(y_1-y_2)(y_2-y_3)(y_3-y_1)/\{(x_2^2-x_1^2)(y_3-y_1) - (x_3^2-x_1^2)(y_2-y_1)\}]^{\frac{1}{2}};$$

or $$\sin PSI = \pm[(y_1-y_2)(y_2-y_3)(y_3-y_1)/\{x_1^2(y_2-y_3) + x_2^2(y_3-y_1) + x_3^2(y_1-y_2)\}]^{\frac{1}{2}};$$

and $$h \cos PSI = \{(x_2^2-x_1^2)(y_3^2-y_1^2) - (x_3^2-x_1^2)(y_2^2-y_1^2)\}/2\{(x_2^2-x_1^2)(y_3-y_1) - (x_3^2-x_1^2)(y_2-y_1)\}$$

or $$h \cos PSI = \{x_1^2(y_2^2-y_3^2) + x_2^2(y_3^2-y_1^2) + x_3^2(y_1^2-y_2^2)\}/2\{x_1^2(y_2-y_3) + x_2^2(y_3-y_1) + x_3^2(y_1-y_2)\}.$$

10. The moving body recognition apparatus according to claim 9, wherein:
 (1) cos PSI=0 when sin² PSI=1
 (2) the sign of h cos PSI is determined as the sign of cos PSI when h cos PSI≠0
 (3) the sign of cos PSI is not determined when sin² PSI≠1 and h cos PSI=0,
thereby providing PSI and PSI+$\pi$ as the solution in the case of (3).

11. The moving body recognition apparatus according to claim 4 wherein said second PSI calculation process means obtains the value of sin PSI and the sign of cos PSI by using the coordinates $(x_i, y_i)$ (time point i=1, 2 or 3) of the second feature point at respective three instants in time and expressing as h wherein h is the component in the rotation axis direction of the position vector from the origin to the second feature point, based on the following equations:

$$h \cos PSI = \{(x_2^2-x_1^2)(y_3^2-y_1^2) - (x_3^2-x_1^2)(y_2^2-y_1^2)\}/2\{(x_2^2-x_1^2)(y_3-y_1) - (x_3^2-x_1^2)(y_2-y_1)\};$$

or $$h \cos PSI = \{x_1^2(y_2^2-y_3^2) + x_2^2(y_3^2-y_1^2) + x_3^2(y_1^2-y_2^2)\}/2\{x_1^2(y_2-y_3) + x_2^2(y_3-y_1) + x_3^2(y_1-y_2)\}$$

and $$\sin PSI = \pm[2(y_k-y_1)h \cos PSI - (y_k-y_1)^2\}/\{x_k^2-x_1^2\}]^{\frac{1}{2}} (k=2,3).$$

12. The moving body recognition apparatus according to claim 11, wherein:
 (1) cos PSI=0 when sin² PSI=1
 (2) the sign of h cos PSI is determined as the sign of cos PSI when h cos PSI≠0
 (3) the sign of cos PSI is not determined when sin² PSI≠1 and h cos PSI=0, thereby providing PSI and PSI+$\pi$ as the solution in the case of (3).

13. A moving body recognition apparatus, comprising image input means for receiving an image of a moving body, feature point extraction means for extracting feature points from said image and feature point storage means for storing said extracted feature points, for recognizing the shape and movement of a moving body based on position data of the feature points in an orthogonal projection image of the moving body, comprising:
 feature point position normalization means for providing normalized coordinates of the feature points in the XYZ coordinate system stored in the feature point storage means by determining an image plane of the moving body in the image input means as the XY plane, the direction of the orthogonal projection image of a rotation axis of the moving body formed on the image plane as the Y axis and a direction of an image capture operation by the image input means as the Z axis perpendicular to said XY plane;
 shape and movement calculation means for obtaining the normalized Z coordinate of the feature points of the moving body as the shape of the moving body, and a rotation amount $\theta$ around the rotation axis of the moving body as the movement, based on a depression angle PSI between the rotation axis of the moving body and the Y axis and the output of said feature point position normalization means.

14. The moving body recognition apparatus according to claim 13 wherein said moving body recognition apparatus comprises known data input means for receiving known data relating to the shape and movement of the moving body; and
 said shape and movement calculating means outputs a result which is not inconsistent with the known data input to the known data input means as the calculation result of the shape and movement of the moving body.

15. The moving body recognition apparatus according to claim 13 wherein said feature point position normalization means provides the first feature point out of four of said feature points of the moving body on the image plane as the origin of the XYZ coordinate system and obtains the coordinate values of the second to fourth feature points relative to the origin as the normalized coordinates with regard to two instants in time;
 said shape and movement calculating means calculates a matrix R representing the rotation of tile moving body from the first instant in time to the second instant in time based on the following matrix R, when the value of the matrix with the normalized coordinates of the second to fourth feature points as its elements is not zero:

$$R = \begin{bmatrix} x_{22} & x_{23} & x_{24} \\ y_{22} & y_{23} & y_{24} \\ z_{22} & z_{23} & z_{24} \end{bmatrix} \begin{bmatrix} x_{12} & x_{13} & x_{14} \\ y_{12} & y_{13} & y_{14} \\ z_{12} & z_{13} & z_{14} \end{bmatrix}^{-1} \quad (19)$$

where $$\begin{bmatrix} x_{ij} \\ y_{ij} \\ z_{ij} \end{bmatrix}$$

represents the coordinate value of the j-th feature point at the i-th instant in time (i=1, 2; j=2, 3, 4).

16. A moving body recognition apparatus according to claim 13 wherein said feature point position normalization means provides a first feature point of a plurality of said feature points of the moving body in the image plane as the origin of said XYZ coordinate system and obtains the coordinates of a second said feature point and following said feature points relative to the origin as the normalized coordinates.

17. A moving body recognition apparatus according to claim 16 wherein said moving body recognition apparatus comprises:
known data input means for inputting known data relating to shape and movement of said moving body; and
PSI determination means for determining the value of said depression angel PSI wherein said shape and movement calculating means calculates the shape and movement of the moving body based on the output of said feature point position normalization means in accordance with the recognition mode corresponding to the known data relating to the shape and movement of the moving body which is inputted into said data input means.

18. A moving body recognition apparatus according to claim 17 wherein when the content of the known data inputted into known data input means designates that the moving body moves on a plane, rotating at a constant rotation speed, said shape and movement calculation means comprises a constant calculation means for calculating the shape and movement of the moving body based on the output from the feature point normalizing means of two feature points of the moving body at three equally-spaced instants in time in accordance with the recognition mode for the content of the known data.

19. A moving body recognition apparatus according to claim 17 wherein when the content of the known data inputted into known data input means designates that the moving body has an edge containing a right angle h as its shape data, said shape and movement calculating means comprises the right-angle shape calculating means for calculating shape and movement of the moving body based on the output of the feature point position normalizing means for three feature points which form a right angle on the moving body at two instants in time.

20. A moving body recognition apparatus according to claim 17 wherein said shape and movement calculating means comprises shape and general calculating means for calculating the shape and movement of the moving body based on the output of the feature point normalization means for three of said feature points of the moving body at three instants in time, when the content of the known data input to the known data input means designates that the moving body moves on a plane, rotating at a known constant rotation speed and that the shape does not have an edge including a right angle.

21. A moving body recognition apparatus according to claim 16 further comprising known data input means for inputting known data relating to a depression angle PSI determination means and wherein said PSI determination means determines the value of PSI by using the output of said known data input means and the output of said feature point position normalization means and outputs the determination result PSI to said shape and movement calculating means.

22. A moving body recognition apparatus according to claim 24 wherein said shape and movement calculating means obtains the rotation amount $\theta$ of the moving body with regard to a rotation around said rotation axis when the value of $x_i^2$ is not 0, by using normalized coordinate value ($x_i$, $y_i$) (time point i=1,2) at two instants in time of the second feature point, based on the following equations:

$$\cos \theta = (x_1 x_2 + y_1 y_2)/(x_i^2 + y_i^2)(i=1 \text{ or } 2)$$

$$\sin \theta = (x_1 y_2 - x_2 y_1)/(x_i^2 + y_i^2)(i=1 \text{ or } 2).$$

23. A moving body recognition apparatus according to claim 21 wherein, when said PSI determination means determines that the value of PSI is neither 0° nor 90°, said shape and movement calculating means calculates the component h in the direction of the rotation axis of the position vector from the origin to the second feature point when a provided Y coordinate $y_1$ and $y_2$ are not equal, by using normalized coordinates ($x_i$, $y_i$) (time point i=1, 2) of the second feature point at two instants in time which is selected from two of said feature points outputted from said feature point position normalization means and a normalized Z coordinate $z_i$ of the second feature point, based on the following equations:

$$h = \{(x_2^2 - x_1^2) \sin^2 PSI + (y_2^2 - y_1^2)\}/2 \cos PSI(y_2 - y_1),$$
$$[z_1(h - y_1 \cos P)/]z_i = (h - y_i \cos PSI)/\sin PSI(i=1 \text{ or } 2).$$

24. A moving body recognition apparatus according to claim 23 wherein said shape and movement calculating means comprising recognition impossible determination process means determines that the recognition of the shape of said moving body is impossible when a normalized Y coordinates $y_1$ and $y_2$ of the second feature point at two instants in time are equal, thereby performing the recognition impossible determination process.

25. A moving body recognition apparatus according to claim 23 wherein said shape and movement calculating means obtains the rotation amount $\theta$ of the second feature point between two time points by using normalized X coordinate $x_i$ (time point i=1,2) and normalized Z coordinate $z_i$ (i=1, 2) of the second feature point at two instants in time, based on the following equations:

$$z_i' = -y_i \sin PSI + z_i \cos PSI,$$

$$\cos\theta = ((X_1X_2 + Z_1'Z_2')/(x_1x_2 + z_1'z_2'))/(x_i^2 + z_i'^2)$$

($i=1$ or 2)

$$\sin\theta = ((X_1Z_2' + X_2Z_1')/(x_1z_2' + x_2z_1'))/(x_i^2 + z_i'^2)$$

($i=1$ or 2).

26. A moving body recognition apparatus according to claim 23 wherein said shape and movement calculating means obtains a distance d between the second feature point and the rotation axis of the moving body by using the normalized coordinates ($x_i$, $y_i$) at two instants in time of the second feature point, a component h in the direction of said rotation axis of the position vector and the depression angle PSI:

$$d = \{x_i^2 + (y_i - h\cos PSI)^2/\sin^2 PSI\}^{1/8} (i=1, 2).$$

27. A moving body recognition apparatus, comprising image input means for receiving an image of a moving body, feature point extraction means for extracting feature points from said image and feature point storage means for storing said extracted feature points, for recognizing a shape and movement of a moving body based on position data of the feature points in an orthogonal projection image of the moving body, comprising:

feature point position normalization means for providing normalized coordinates of the feature points in the XYZ coordinate system stored in the feature point storage means by determining an image plane of the moving body in the image input means as the XY plane, the direction of the orthogonal projection image of a rotation axis of the moving body formed on the image plane as the Y axis and a direction of an image capture operation by the image input means as the Z axis perpendicular to said XY plane;

shape and movement calculating means for calculating the shape and movement of the moving body in a virtual rotation state of the moving body when the rotation axis of the moving body is made in parallel to the YZ plane to permit the rotation axis of the moving body to match with the Y axis based on the output from the feature point position normalization means and a depression angle PSI between the rotation axis of the moving body and the Y axis, thereby obtaining the shape and movement of the moving body in the actual rotation state of the moving body based on said calculation result.

28. The moving body recognition apparatus according to claim 27 wherein said feature point position normalization means provides a first feature point out of four of the feature points of the moving body at the image plane to the origin of the XYZ coordinate system and obtains the coordinate of the second to fourth feature points for the origin as the normalized coordinate with regard to two instants in time;

shape and movement calculating means the matrix R representing the rotation of the moving body from the first instant in time to the two instants in time when the value of the matrix having the normalized coordinate of the second to fourth feature points as their elements is not zero, based on the following matrix R:

$$R = \begin{bmatrix} x_{22} & x_{23} & x_{24} \\ y_{22} & y_{23} & y_{24} \\ z_{22} & z_{23} & z_{24} \end{bmatrix} \begin{bmatrix} x_{12} & x_{13} & x_{14} \\ y_{12} & y_{13} & y_{14} \\ z_{12} & z_{13} & z_{14} \end{bmatrix}^{-1} \quad (19)$$

where $$\begin{bmatrix} x_{ij} \\ y_{ij} \\ z_{ij} \end{bmatrix}$$

represents the coordinate value of a j-th feature point at an i-th instant in time ($i=1, 2$; $j=2, 3, 4$).

29. The moving body recognition apparatus according to claim 27 further comprises a known data input means for receiving the known data relating to the shape and movement of the moving body; and said shape and movement calculating means calculates shape and movement of the moving body based on the result which is not inconsistent with the known data input to the known data input means.

30. A moving body recognition apparatus according to claim 27 wherein said feature point position normalization means provides a first feature point out of a plurality of said feature points of the moving body on the image plane as the origin of the XYZ coordinate system and obtains the coordinates of a second of said feature points and the following said feature points relative to the origin as said normalized coordinate.

31. The moving body recognition apparatus according to claim 30 further comprising known data input means for inputting known data relating to the depression angle PSI, depression angle PSI determination means for determining a value of the depression angle PSI, wherein said PSI determination means determines the value of the depression angle PSI based on the output of the known data input means and the output of the feature point position normalization means and outputs the determination result of the depression angle PSI to the shape and movement calculating means.

32. The moving body recognition apparatus according to claim 31 wherein, when said PSI determination means determines that the value of the depression angle PSI is not $\pi/2 + n\pi$ (n is an integer), said shape and movement calculating means obtains the normalized Z coordinate z of the feature point in an actual rotation state by using z' as the Z coordinate calculating result of one of said feature points of the moving body in the virtual rotation state, normalized Y coordinate y of the one feature point and the value of the depression angle PSI, based on the following equation:

$$z = (y \sin PSI + z')/\cos PSI.$$

33. The moving body recognition apparatus according to claim 31 wherein, when said PSI determination means determines that the value of the depression angle PSI is not $\pi/2 + n\pi$ (n is integer), said shape and movement calculating means obtains a rotation amount $\theta$ of the moving body from the first instant in time to the second instant in time when the $(x_i^2 + z_i'^2 (i=1 \text{ or } 2)$ is not zero by using $$\cos \theta = ((X_1 X_2 + Z_1' Z_2')/(x_1 x_2 + z_1' z_2'))/((X_i^2 + Z_i'^2)/(x_i^2 + z_i'^2))$$

$(i=1 \text{ or } 2)$ $$\sin \theta = ((X_1 Z_2' - X_2 Z_1')/(x_1 z_2' - x_2 z_1'))/((X_i^2 + Z_i'^2)/(x_i^2 + z_i'^2)) (i=1 \text{ or } 2)$$

and using $z_1'$, $z_2'$ as the z coordinate calculation result of the second feature point out of two of said feature points at two instants in time with regard to the moving body in the virtual rotation state and the two normalized values of the X coordinate $x_1$, $x_2$ of the second feature point.

34. The moving body recognition apparatus according to claim 31 wherein, when said PSI determination means determines that the depression angle PSI is $\pi/2 + n\pi$ (n is an integer), said shape and movement calculating means obtains a rotation amount $\theta$ of the moving body around said rotation axis by using the following equations:

$$\cos \theta = ((X_1 X_2 + Y_1 Y_2)/(x_1 x_2 + y_1 y_2))/((X_i^2 + Y_i^2)/(x_i^2 + y_i^2))$$

$(i=1 \text{ or } 2)$ $$\sin \theta = ((X_1 Y_2 - X_2 Y_1)/(x_1 x_2 - x_2 y_1))/((X_i^2 + Y_i^2)/(x_i^2 + y_i^2))$$

$(i=1 \text{ or } 2)$ when the value of $x_i^2 + y_i^2$ is not zero, by using the normalized coordinate values $(x_i, y_i)$ $(i=1, 2)$ of the second feature point at the two instants in time.

35. The moving body recognition apparatus according to claim 30 further comprising PSI determination means for determining the value of said depression angle PSI and known data input means for inputting the known data relating to the shape and movement of the moving body and wherein said shape and movement calculating means comprises calculation method determination means for determining a calculation method of the shape and movement of the moving body by using the output of the feature point position normalizing means, in accordance with the content of the known data output from the known data input means, when the value of the PSI is not equal to $\pi/2 + n\pi$ (n is an integer).

36. The moving body recognition apparatus according to claim 35 wherein said shape and movement calculating means comprises a movement constant calculating means for calculation which is deviated when said calculating determination means judges that the content of said known data represents that the moving body moves on the plane rotating at a constant rotation and for calculating the shape and movement of the moving body based on the feature point position normalization means for two of said feature points of the moving body at three instants in time with equal time intervals.

37. The moving body recognition apparatus according to claim 35 wherein said shape and movement calculating means comprises the shape rectangular which is activated when said calculating determination method means determines that the content of the known data represents that the moving body has a rectangular h as its shape and moves on the plane while rotating and for calculating the shape and movement of the moving body based on the output of the feature point position normalization means for three of said feature points of the rectangular shape of the moving body at two instants in time.

38. The moving body recognition apparatus according to claim 35 wherein said shape and movement calculating means comprises shape generic calculating means which is activated when the calculation method determination method means determines that the content of the known data represents that the moving body moves around a plane by rotating at a known constant rotating speed and the moving body does not have a rectangular shape and for calculating the shape and the movement of the moving body based on the output of the feature point position normalization means for three of said feature points of the moving body at three instants in time.

39. A moving body recognition apparatus for recognizing a movement of a moving body based on positional data in an image of feature points of the moving body generated by an image input means, comprising;
depression angle recognizing means for obtaining an angle between a rotation axis of the moving body and the Y axis when an image taking plane of the moving body of the image input means is determined as an XY plane and an image taking direction of the image input means is determined as a Z axis; and
movement recognition means for recognizing the movement of the moving body based on a value of the angle obtained by said depression angle recognition means.

* * * * *